US006192399B1

(12) United States Patent
Goodman

(10) Patent No.: US 6,192,399 B1
(45) Date of Patent: **\*Feb. 20, 2001**

(54) TWISTED PAIR COMMUNICATION SYSTEM

(75) Inventor: David D. Goodman, Arlington, VA (US)

(73) Assignees: Inline Connections Corporation, Arlington, VA (US); Cais, Inc., Washington, DC (US)

(*) Notice: Under 35 U.S.C. 154(b), the term of this patent shall be extended for 0 days.

(21) Appl. No.: 09/113,526

(22) Filed: Jul. 10, 1998

Related U.S. Application Data

(63) Continuation of application No. PCT/US98/11197, filed on Jun. 1, 1998
(60) Provisional application No. 60/052,225, filed on Jul. 11, 1997, provisional application No. 60/052,301, filed on Jul. 11, 1997, provisional application No. 60/056,458, filed on Aug. 21, 1997, provisional application No. 60/067,854, filed on Dec. 5, 1997, provisional application No. 60/074,078, filed on Feb. 9, 1998, provisional application No. 60/079,304, filed on Mar. 25, 1998, and provisional application No. 60/079,305, filed on Mar. 25, 1998.

(51) Int. Cl.$^7$ ............................. H64J 1/10; H04N 7/14
(52) U.S. Cl. .......................... 709/217; 348/12; 348/13; 370/447; 379/90.1; 379/93.09
(58) Field of Search .................... 348/12, 13; 379/93.08, 379/93.09, 212, 207, 220, 90.1, 217; 370/489–498, 445–448

(56) References Cited

U.S. PATENT DOCUMENTS

| 3,723,653 | 3/1973 | Tatsuzawa | 179/2 TV |
| 3,937,889 | 2/1976 | Bell, III et al. | 179/2 DP |
| 3,974,337 | 8/1976 | Tatsuzawa | 179/2 TV |

(List continued on next page.)

FOREIGN PATENT DOCUMENTS

| 0 062 442 | 10/1982 | (EP) . |
| 0 408 236 | 1/1991 | (EP) . |
| 0 408 236 A2 | 1/1991 | (EP) . |

(List continued on next page.)

OTHER PUBLICATIONS

"Commtek Corporation Announces First Commercially Available Transmission of Real–Time Video and Voice on Unshielded Twisted Pair Telephone Lines," News Realease, Commetek Corp., 4 pages, 1992.

Hofmann, "Cable, Television, and the Consumer Electronic Bus," The Int'l T.V. Symposium—Montreux, Switzerland, pp. 165–173, 1987.

(List continued on next page.)

*Primary Examiner*—Andrew I. Faile
*Assistant Examiner*—Reuben M. Brown
(74) *Attorney, Agent, or Firm*—Fish & Richardson P.C.

(57) ABSTRACT

A communication system for passing information between information services and terminal devices over a twisted wire pair network. The information services include a telephone exchange and other services, such as a data network and a television distribution system. The terminal devices include telephones and other devices, such as computers and televisions. The system includes a main information interface coupled to the information services and to the twisted wire pair network, which couples the terminal devices and to the main information interface. The wiring network includes multiple active telephone pairs for passing voice signals between the telephone exchange and telephones. The information interface includes circuitry for combining on the active telephone pairs (a) telephone signals in a telephone frequency band passing between the telephone exchange and the one or more telephones and (b) high frequency signals in a high band of frequencies higher that those of the telephone frequency band passing information between the other information services and one or more of the terminal devices.

9 Claims, 39 Drawing Sheets

U.S. PATENT DOCUMENTS

| | | | |
|---|---|---|---|
| 3,992,589 | 11/1976 | Kuegler | 179/15 FS |
| 4,054,910 | 10/1977 | Chou et al. | 358/86 |
| 4,328,579 | 5/1982 | Hashimoto et al. | 370/111 |
| 4,509,211 | 4/1985 | Robbins | 455/603 |
| 4,546,212 | 10/1985 | Crowder, Sr. | 179/2 C |
| 4,608,686 | 8/1986 | Barsellotti | 370/69.1 |
| 4,646,293 * | 2/1987 | Okada et al. | 370/85 |
| 4,670,874 | 6/1987 | Sato et al. | 370/110.1 |
| 4,679,227 | 7/1987 | Hughes-Hartogs | 379/98 |
| 4,709,412 | 11/1987 | Seymour et al. | 455/603 |
| 4,757,497 | 7/1988 | Beierle et al. . | |
| 4,766,402 | 8/1988 | Crane | 333/25 |
| 4,785,448 | 11/1988 | Reichert et al. | 370/76 |
| 4,785,472 | 11/1988 | Shapiro | 379/96 |
| 4,807,225 | 2/1989 | Fitch . | |
| 4,829,570 | 5/1989 | Schotz | 381/3 |
| 4,849,811 | 7/1989 | Kleinerman | 358/133 |
| 4,882,747 | 11/1989 | Williams | 379/102 |
| 4,885,803 | 12/1989 | Hermann et al. | 455/603 |
| 4,890,316 | 12/1989 | Walsh et al. | 379/98 |
| 4,893,326 | 1/1990 | Duran et al. | 379/53 |
| 4,949,187 | 8/1990 | Cohen | 358/335 |
| 4,953,160 | 8/1990 | Gupta | 370/76 |
| 4,955,048 | 9/1990 | Iwamura et al. | 379/53 |
| 4,985,892 | 1/1991 | Camarata . | |
| 4,994,909 * | 2/1991 | Graves et al. | 455/5 |
| 5,010,399 | 4/1991 | Goodman et al. | 358/85 |
| 5,025,443 | 6/1991 | Gupta . | |
| 5,089,886 | 2/1992 | Grandmougin | 358/86 |
| 5,283,637 | 2/1994 | Goolcharan . | |
| 5,546,385 | 8/1996 | Caspi et al. | 340/58.2 |
| 5,579,308 | 11/1996 | Humpleman | 370/58.1 |
| 5,592,540 * | 1/1997 | Beveridge | 348/7 |
| 5,594,726 * | 1/1997 | Thompson et al. | 370/485 |
| 5,774,664 * | 6/1998 | Hidary et al. | 709/217 |
| 5,818,935 * | 7/1998 | Maa | 380/20 |
| 5,881,131 * | 3/1999 | Farris et al. | 379/27 |
| 5,930,340 * | 7/1999 | Bell | 370/93.08 |
| 5,999,612 * | 12/1999 | Dunn et al. | 348/12 |

FOREIGN PATENT DOCUMENTS

| | | |
|---|---|---|
| 2 166322 | 4/1986 | (GB) . |
| 2 166328 | 4/1986 | (GB) . |
| 1-27358 | 1/1989 | (JP) . |
| WO 88/05979 | 8/1988 | (WO) . |
| WO 91/07018 | 5/1991 | (WO) . |
| WO 95/19070 | 7/1995 | (WO) . |
| WO 96/17474 | 6/1996 | (WO) . |
| WO 96/28902 | 9/1996 | (WO) . |

OTHER PUBLICATIONS

Johnson, "Videohub Cuts Costs, Opens Options," Data Communications, *Data Communications,* pp. 109–110, 1992.

Nichols, "Build A Pair of Line–Carier Modems," pp. 87–91, 1988.

Olshansky, "A full service network for the copper plant," *Telephony,* pp. 52–60, 1985.

Propp et al., "The AC Powerline As A Communications Medium for DAC Applications," *IDAC,* pp. 17–25, 1990.

Schwartz, "Commtek Intro Video Over UTP," *Communications Week,* p. 5, 1992.

Sheets and Graf, "Build This Carrier Current Audio Transmitter," Radio Electronics, pp. 55–64, 1989.

Sheets and Graf, "Build This Carrier Current Receiver," Radio Electronics, pp. 55–94, 1989.

"TeleConcepts . . . Introduces the 'Just Plug It In' Intercom System," TeleConcepts brochure, Newington, CT, 2 pages undated.

"Remote Extender Owner's Manual," Windmaster Manufacturing brochure, DeFuniak Springs, FL, 7 pages, undated.

"Model 4000 Series," Lightwave Systems, Inc. brochure, 6 pages, undated.

"IBM races to the desktop," 1 page, undated.

"Video Transmission System—Send video over ordinary wire—no coax required," Javelin brochure, 2 pages undated.

Tele Video brochure, 2 pages, undated.

\* cited by examiner

TWISTED PAIR COMMUNICATION SYSTEM

CROSS REFERENCE TO RELATED APPLICATIONS

This is a continuation of International Application "Twisted Pair Communication System," No. PCT/US98/11197 filed at the U.S. Receiving Office on Jun. 1, 1998.

This application also claims the benefit of U.S. application "Techniques for High-Speed Distribution of Data over Ordinary Twisted Pair Telephone Wires," Ser. No. 09/087,527 filed May 29, 1998, which claims the benefit of U.S. Provisional Application No. 60/047,936 filed May 30, 1997.

This application also claims the benefit of the following U.S. Provisional Applications:

"Techniques for High-Speed Distribution of Data over Ordinary Twisted Pair Telephone Wires," No. 60/052,225 filed Jul. 11, 1997;

"Digital Communication over Residential Telephone Wiring Using Ethernet Standards," No. 60/052,301 filed Jul. 11, 1997;

"Adapting Ethernet Technology to Communicate Signals over a Single Twisted Pair in Harmony with ordinary Telephony," No. 60/056,458 filed Aug. 21, 1997;

"Comprehensive Twisted Pair Communication System for Residences," No. 60/067,854 filed Dec. 5, 1997;

"Ethernet Communication Hub with Security Features," No. 60/074,078 filed Feb. 9, 1998;

"Communication of 10BaseT Ethernet and Other Broadband Signals Over a Single, Active Voice Line," No. 60/079,304 filed Mar. 25, 1998; and "Communication of 10BaseT Ethernet Signals over Extended Distances," Ser. No. 60/079,305 filed Mar. 25, 1998.

The above referenced U.S. application and U.S. Provisional Applications are incorporated herein in their entirety by reference.

BACKGROUND

This invention relates to communication of information, such as computer data or video, over unshielded twisted-wire pairs (UTP) such as those used for telephone communication within a building.

Referring to FIG. 1, in a typical situation in which a building 100a is coupled to a variety of external information systems, communication within the building may use different wiring networks. The information systems can include public switched telephone network (PSTN) 120, television distribution system 124 and a data network 122. Building 100a can be a single family dwelling or a multiple unit dwelling or office building.

PSTN 120 is coupled to building 100a with one or more UTP cables 121. UTP cables 121 include wire pairs that each provides an outside telephone line to the building. Television distribution system 124 can be a cable or satellite television system which provides multiple channels of television signals over a broadband connection 125, typically a coaxial cable.

Data network 122, such as the Internet, is coupled to building 100a in one of several different ways, providing a high-speed connection (e.g., 1 Mb/s or higher rates). Data network 122 can be coupled through PSTN 120, either using one or more UTP cables 121 to pass data back and forth to building 100a. For instance, the two wire pairs can carry data in a T1 or partial-T1 format in which those wire pairs are used exclusively for data. Alternatively, data network 122 can be coupled to building 100 over some UTP cables 121 using a digital subscriber loop (DSL) signaling technique in which the data communication is passed in a different frequency range than voice telephone communication passing over the same wires.

Data network 122 can also be coupled to building 100a through television distribution system 124. For instance, bi-directional data communication can pass over a cable television distribution system concurrently with television programming.

In building 100a, UTP cables 121 terminate at a telephone interface 132, such as a main wiring block. Similarly, broadband connection 125 terminates at a television interface 152. Data network 122 is coupled to devices in building 100a through a data interface 142. If data network 122 is coupled through PSTN 120, data interface 142 provides an interface appropriate to the type of signaling used (e.g., T1, DSL). If data network 122 is coupled through television distribution system 124, data interface 142 can be a cable modem coupled to broadband connection 125 through television interface 152.

Within building 100a, separate networks are typically used for telephone, data, and television signals. A telephone wiring network 130 couples telephones 134 to telephone interface 132 and to PSTN 120. If no telephone switching equipment is deployed in building 100, telephone wiring network 130 and UTP cables 121 provide a continuous electrical path from each telephone 134 to telephone switch in PSTN 120. Multiple telephones 134 can be connected to the same conductive path when they are extensions of the same telephone line.

A data wiring network 140 couples one or more computers 144 to data network 122 through data interface 142. A common form of data wiring network used within building adheres to one of the Ethernet standards (IEEE STD 802.3, 802.12), such as 10BaseT, 10Base2, 100BaseT4, or 100VG.

In 10BaseT, each data communication paths consisting of two UTP coupling a computer 144 to data interface 142. Communication is at a rate of 10 Mb/s. If more than one computer 144 is connected to data wiring network 140, data wiring network 140 can include a hub (not shown) that is connected to data interface 142 and to each of the computers 144. Each of the computers 144 includes a network interface controller (NIC) that provides an appropriate electrical interface to data wiring network 140. According to the IEEE 802.3 standard, 10BaseT communication paths should be no longer than 330 feet without an intervening hub.

The two UTP which couple two communicating devices consist of one UTP for communication in each direction. The two UTP are not intended for simultaneous communication in both directions. There are however occasions when both devices inadvertently transmit at the same time.

In 10BaseT, a device should not transmit when it is receiving a signal from the other device. As a result, the circumstance where both sides transmit at once only occurs when each side begins a transmission before it receives the signal sent from the opposite end. This creates a condition called a "collision."

When a collision occurs, each device is required to suspend its transmission and wait until they are not receiving a signal. After a period of quiet, each device can attempt to transmit again.

As a result, when a 10BaseT device is transmitting on its outbound wire pair, it must monitor the inbound wire pair only to determine whether or not the other end has sent a signal causing a collision. The device does not need to interpret the information sent in the signal causing the collision.

The signal transmitted by a device to send a binary data stream is a Manchester coding of the binary data stream. A Manchester coding of a data stream is a bi-level signal that has at least one transition per input bit. For 10 Mb/s data stream, the spectrum of the coded data stream extends approximately from 3 MHz to 15 MHz.

In 10Base2, a second 10 Mb/s IEEE 802.3 standard, data communication paths consist of a single transmission line, typically a coaxial cable (e.g., RG-58), coupling a computer 144 to data interface 142. Data wiring network 140 can in this case be arranged in a star configuration or can be run in a daisy-chained arrangement coupling multiple computers 144 to data interface 142. When a 10Base2 device applies signals to the transmission line, it uses a similar Manchester coding used in 10BaseT. The multiple 10Base2 devices receive signals from the same line.

In 10Base2, when two devices transmit at the same time causing a collision, the devices detect the collision by monitoring the DC level of the received signal. When one device transmits, it applies a DC offset to the transmission line. A second device can detect this offset, even while it is transmitting.

The IEEE standard calls for the same transmission levels for 10Base2 and 10BaseT, but the minimum receive level is lower by 6 dB for 10Base2 than for 10BaseT.

Circuitry for converting between the signaling used in the 10BaseT and the 10Base2 standards is available from many vendors. The circuitry is typically called a "media converter." One integrated circuit media converter is a available from Level One Corp., the LXT906 integrated circuit.

In 100 BaseT4, a 100 Mb/s IEEE 802.3 (u) standard, communication is over four UTP. When transmitting, a device sends 33.3 Mb/s on each of three of the four UTP. When receiving, the device receives 33.3 Mb/s on three of the four UTP, including the UTP that it does not use for transmission. The UTP that is not used for transmission is used for collision detection as in the 10BaseT two wire pair standard. Each of the 33.3 Mb/s data stream is block coded resulting in a signal that does not have significant energy in the voice band and extends to approximately 25 MHz.

In 100VG, a 100 Mb/s IEEE 802.12 standard, communication is also over four UTP. When transmitting data, a device sends 25 Mb/s on each of the four UTP. Rather than relying on a collision detection approach, in 100VG, the hub grants permission to transmit to a single device at a time between data transmissions. A non-return-to-zero (NRZ) signaling approach is used to transmit data, resulting in the coded data extending to approximately 15 MHz.

Television wiring network 150 is a coaxial network (e.g., RG-6) which couples each television 154 through television interface 152 to television distribution system 124. Television wiring network typically provides the same broadband signal to multiple televisions 154 which tune to the desired channel. A television 154 can be coupled to television wiring network 150 through a "set-top box" (not shown) which provides tuning capabilities. Some set-top boxes also provide a means of sending control information back to television distribution system 124, for example to order pay-per-view movies or to provide interface television (ITV) functionality.

A computer 146 can also be coupled to data network 122 through a dialed telephone connection using a telephone modem 147 connected to telephone wiring network 130. Telephone modem can use analog signaling within the voice frequency band. Analog telephone modems support relatively low data rates below 56 kb/s. Computer 146 can also be coupled through a cable modem 148 to television wiring network 150.

SUMMARY

Most buildings have existing telephone wiring networks, and may not have data wiring or television wiring networks. In a general aspect, the invention provides a method and apparatus for using an existing telephone wiring network in such a building for bi-directional communication of data and television signals, as well as telephone communication, thereby reducing the cost of deploying such communication capability within the building. Furthermore televisions and computers connect to the telephone wiring network without necessarily using complex interface electronics and without interfering with existing telephone services. The invention can also feature new communication media converters and data hubs having extended range, increased security, and reduced wiring requirements. The existing telephone wiring network can also be fitted with devices which incorporate filters and terminators to improve the communication capacity of the wiring network.

The invention has applicability in numerous circumstances, including adding data and television communication capabilities in a multiple unit building, such as an apartment building or a hotel, which has an existing telephone wiring network.

In one aspect, in general, the invention is a communication system for passing over a twisted wire pair network communication between multiple terminal devices, including one or more telephones, and multiple information services, including a telephone exchange and other information services. The system includes a main information interface coupled to the information services and a twisted pair wiring network coupled to the terminal devices and to the main information interface. The wiring network includes multiple active telephone pairs for passing voice signals between the telephone exchange and the one or more telephones. The information interface includes circuitry for combining on the active telephone pairs (a) telephone signals in a telephone frequency band passing between the telephone exchange and the one or more telephones and (b) high frequency signals in a high band of frequencies higher that those of the telephone frequency band passing information between the other information services and one or more of the terminal devices.

Aspects of the invention include one or more of the following features.

The other information services can include a data network and the terminal devices can include a computer. The main information interface then further includes a data hub for passing information between the computer and the data network.

The other information services can include a television distribution service.

The twisted pair wiring network can include multiple cables coupled to the main information interface and to the terminal devices, and the cables form branching paths from the main information interface to the terminal devices, and the wiring network includes junctions at branch points of the cables for reducing degradation of signals in the high frequency band.

The terminal devices can include a television receiver and an associated remote control device, and the main information interface can include a video selector that is coupled to one of the information services and that includes a receiver for accepting control information sent from the remote control device over the twisted pair wiring network in the high frequency band and a transmitter for providing a television signal to the television receiver over the twisted pair wiring network in the high frequency band in response to the control information. The video selector can include a tuner for selecting a television broadcast. The video selector can also include a computer coupled to a data network, and the control information includes information identifying a source of video information on the data network.

The communication system can include privacy circuitry for preventing information passing between a terminal device and an information service from passing to another terminal device. The privacy circuitry can include a data hub that has multiple ports coupled to terminal devices and a port coupled to the data network and the data hub includes circuitry for inhibiting transmission of data received on one port that is coupled to a terminal device to ports coupled to other terminal devices. The hub can further include circuitry for inhibiting transmission of data addressed to a terminal device that is received on the port coupled to the data network to ports other than the port to which the addressed terminal device is coupled.

The system can include circuitry for reducing degradation of signals passing over the wiring network. The circuitry can includes circuitry for amplifying signals, and circuitry for equalizing signals. The circuitry can also include circuitry for reducing crosstalk between wire pairs.

The system can include a media converter, wherein the media converter is coupled to an information service over a number of conductors and is coupled to the wiring network over a fewer number of conductors, and the media converter includes circuitry for receiving information from the information service over the number of conductors and transmitting that information onto the wiring network over the fewer number of conductors. The media converter can convert 10BaseT signals received over two wire pairs to a signal transmitted onto one wiring pair.

DESCRIPTION

1 Overview (FIGS. 2–5)

The systems that are described below, in general, couple multiple external information services to various devices through bi-directional communication links within a building. The external information services include telephone, data, and television systems and the devices include telephones, computers, and televisions. Within the building, the communication links share a common infrastructure centered on an unshielded twisted-wire pair (UTP) network of a type used for telephone communication. Although described in terms of communication within a building, versions of the systems can also be used to link devices within a campus of multiple buildings. Also, in some versions of the systems, communication is supported between the devices within a building in addition to, or instead of, communication between the devices and external information services. For example, multiple computers in the building can communicate with one another without necessarily being coupled to an external data network.

Figure 1:
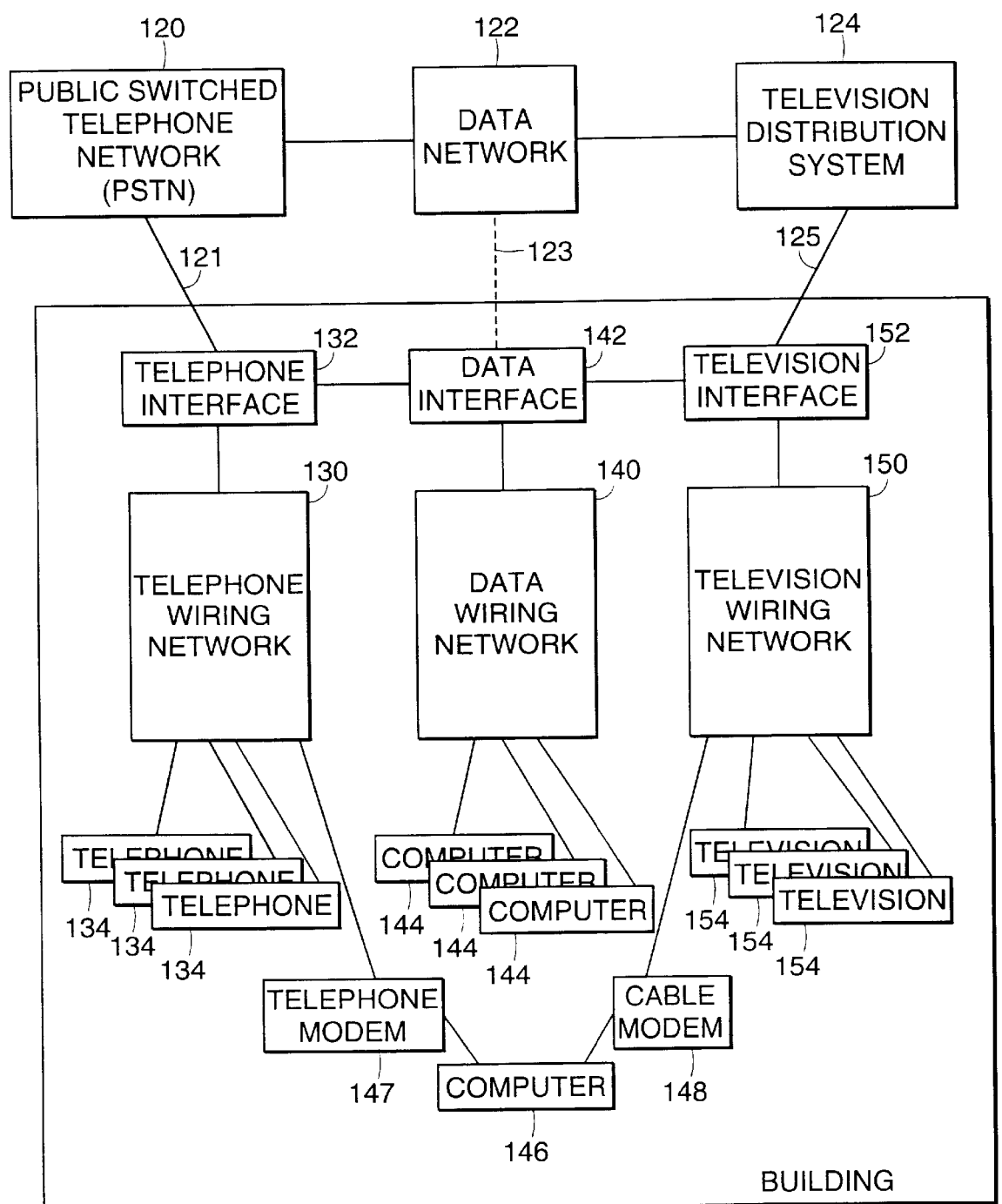
FIG. 1 shows telephones, computers, and televisions coupled through separate wiring networks in a building to a telephone network, a data network, and a television distribution system.
Figure 2:
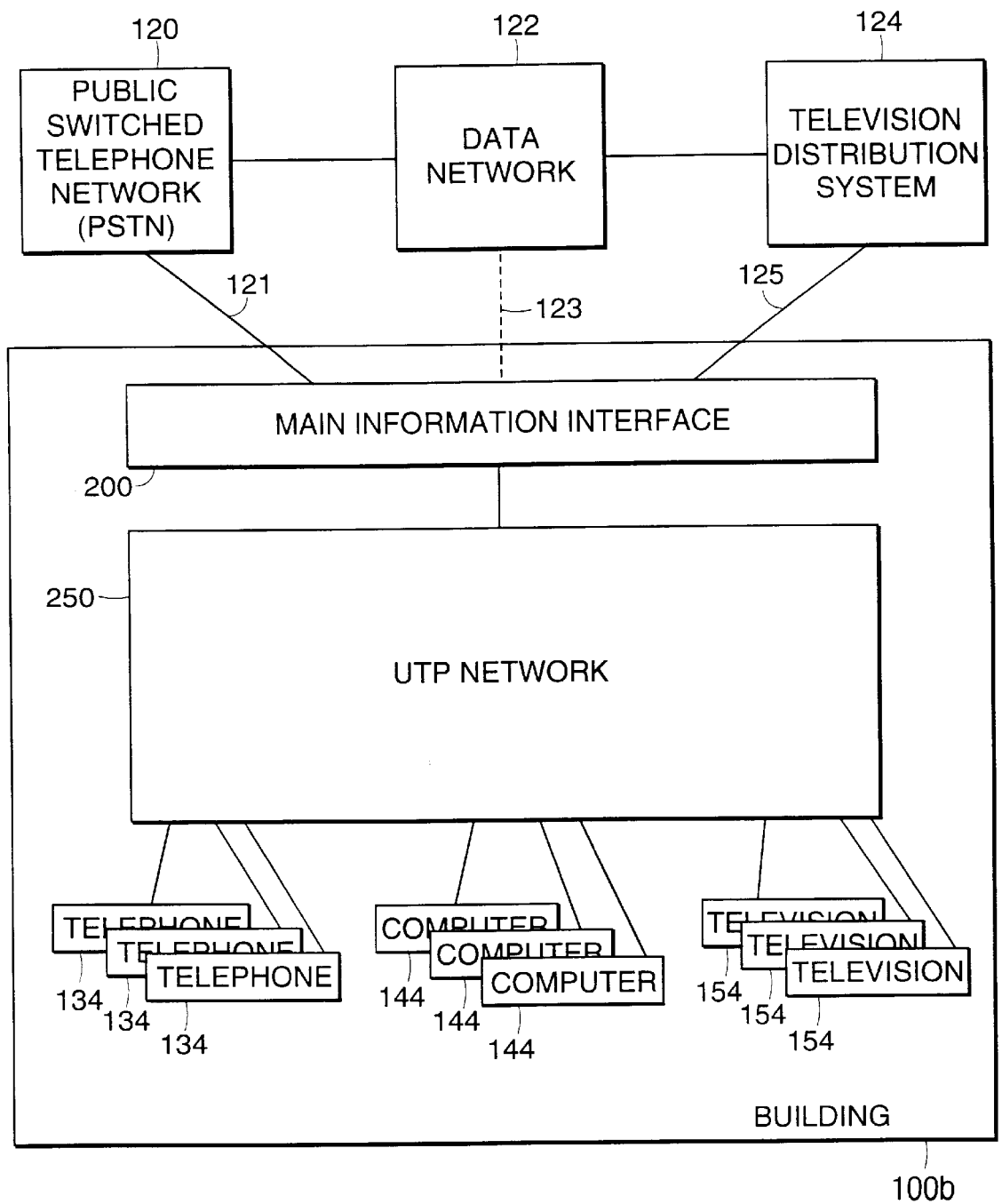
FIG. 2 shows telephones, computers, and televisions coupled through common UTP network in a building to a telephone network, a data network, and a television distribution system.

Referring to FIG. 2, several external information services are coupled to a building 100b. These services include public switched telephone network 120, data network 122, such as the Internet, and television distribution system 124, such as a cable television system. These services connect to a main information interface 200 in the building. In this instance, main information interface 200 is coupled to PSTN 120 over UTP cables 121, and to television distribution system over broadband connection 125, such as a coaxial or optical cable. A main information interface 200 is coupled to data network 122 either through PSTN 120 or through television distribution system 124, shown as a logical connection 123.

Main information interface 200 is coupled to a UTP network 250 within building 100b. In accordance with the invention, UTP network 250 provides a common communication link to telephones 134, computers 144, and televisions 154 which are distributed around the building.

Note that "telephones" can be any of a variety of devices meant to connect to a telephone line, including telephone sets, answering machines, and fax machines. "Computers" can be any device that has a data communication interface. In addition to desktop and laptop computers these devices can include appliances or other devices that have data communication capabilities. "Televisions" can include television receivers as well as the combination of a television receiver, a wireless remote control, and a set-top box that can provide interactive television (ITV) services to a user. In such ITV services, commands from the wireless remote control are passed back to the television distribution system to affect the television signal provided to the user.

Figure 3:
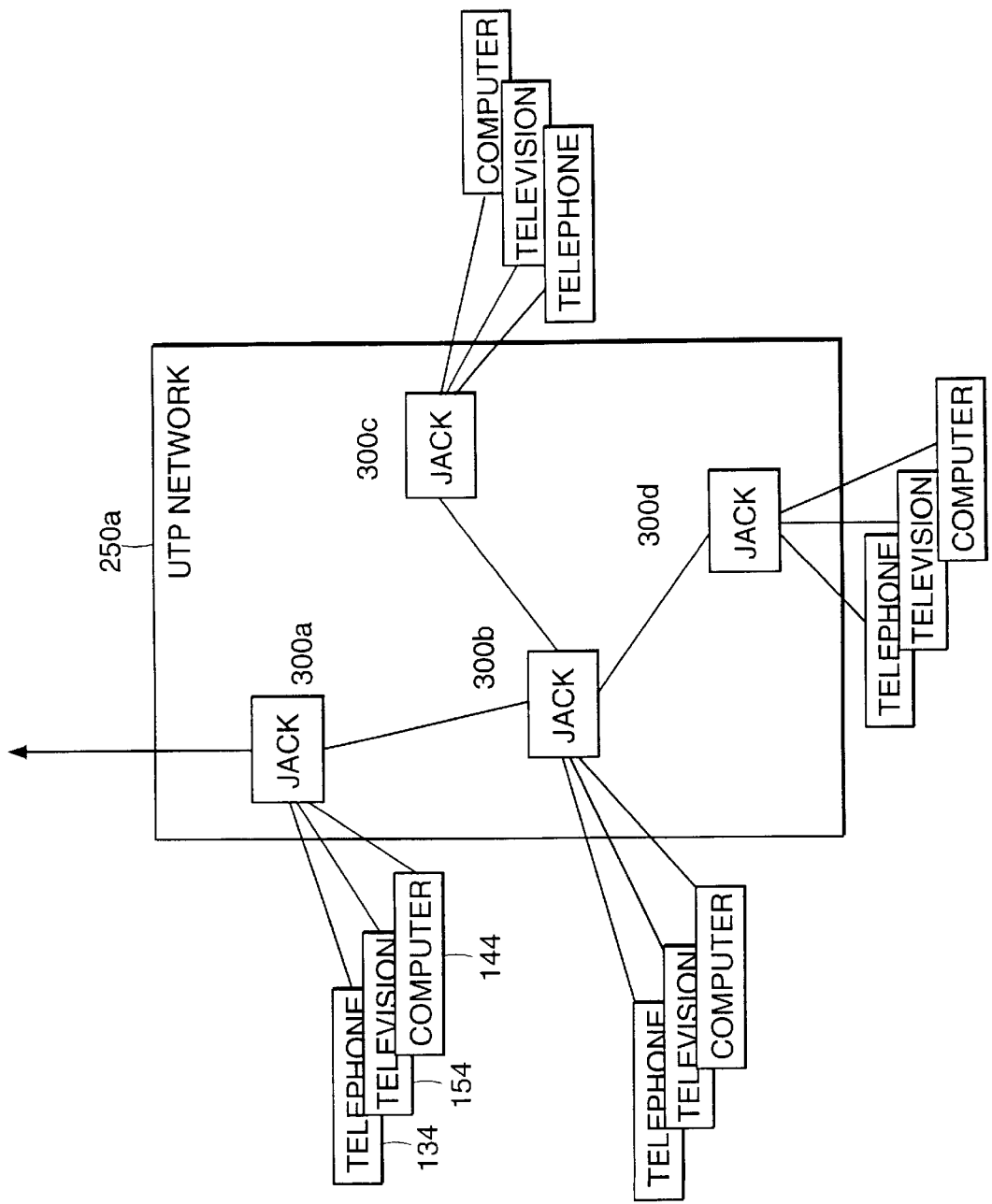
FIG. 3 shows a UTP network which includes a branching wiring path and telephones, computers, and televisions coupled to the jacks in the wiring path.

Referring to FIG. 3, UTP network 250a (an instance of UTP network 250 in FIG. 2) illustrates a branching structure as might be found in a single family residence. In this example, a UTP cable (a bundle of one or more wire pairs, typically one or two pairs in a residence) provides wiring connections to main information interface 200. In order to provide service at multiple wall jacks 300a–c, the cable may be daisy chained to the jacks, and may split at one or more points along its path forming a branching tree structure. In FIG. 3, jack 300a is a jack which provides a daisy chained connection. Jack 300b is at a split point in the cable. Jacks 300c are at termination points in the cable. Telephones 134, computers 144, and televisions 154 are coupled to jacks 300a–c.

Figure 4:
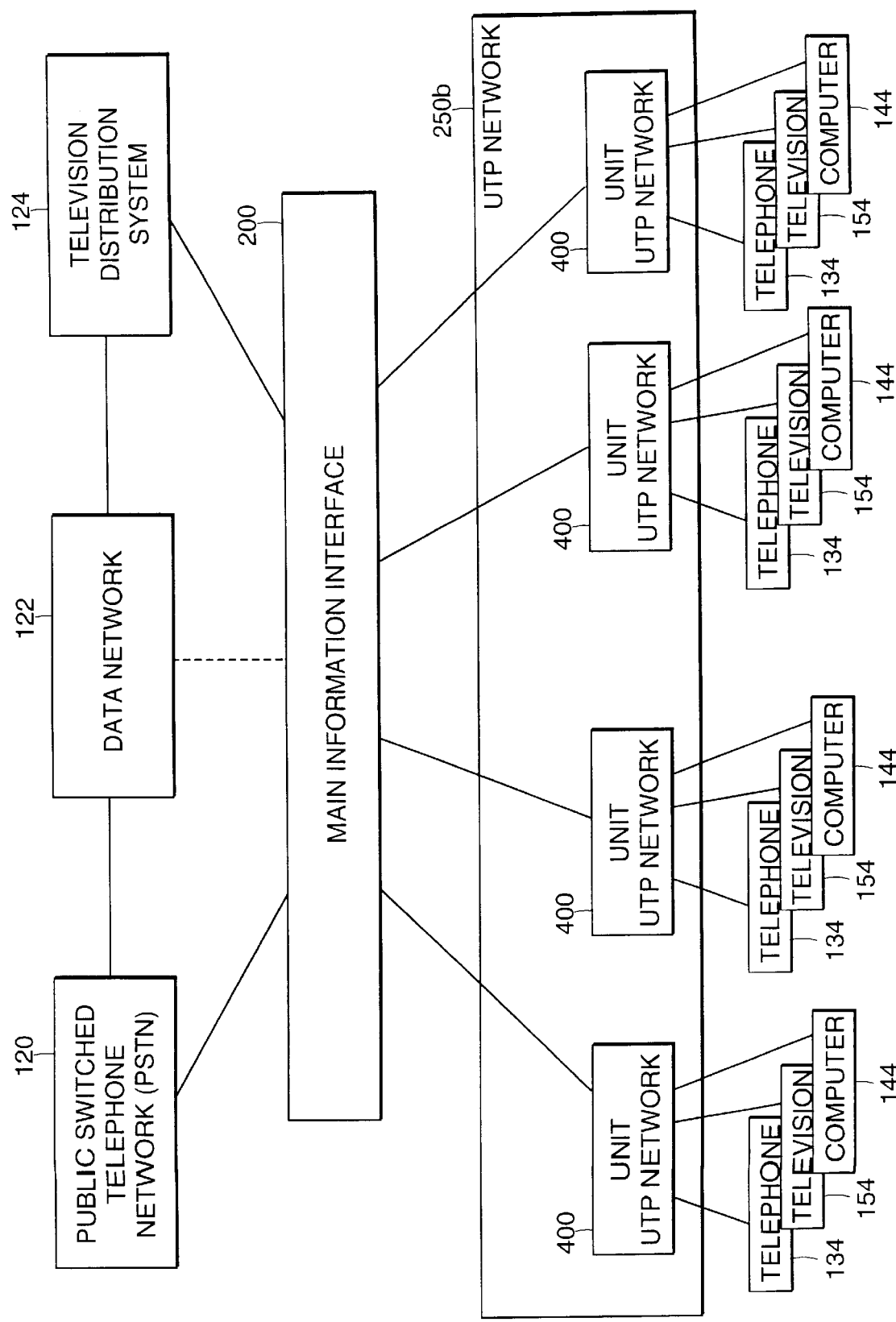
FIG. 4 shows a UTP network including multiple unit wiring networks, each of which is coupled directly to a main information interface.

Referring to FIG. 4, another UTP network 250b is a type of wiring network that might be found in a small multiple unit dwelling. Each unit has its own unit UTP network 400 that is coupled directly to main information interface 200. Each unit UTP network 400 has a structure similar to that shown in FIG. 2 with daisy chained jacks, and splits in the cable path.

Figure 5:
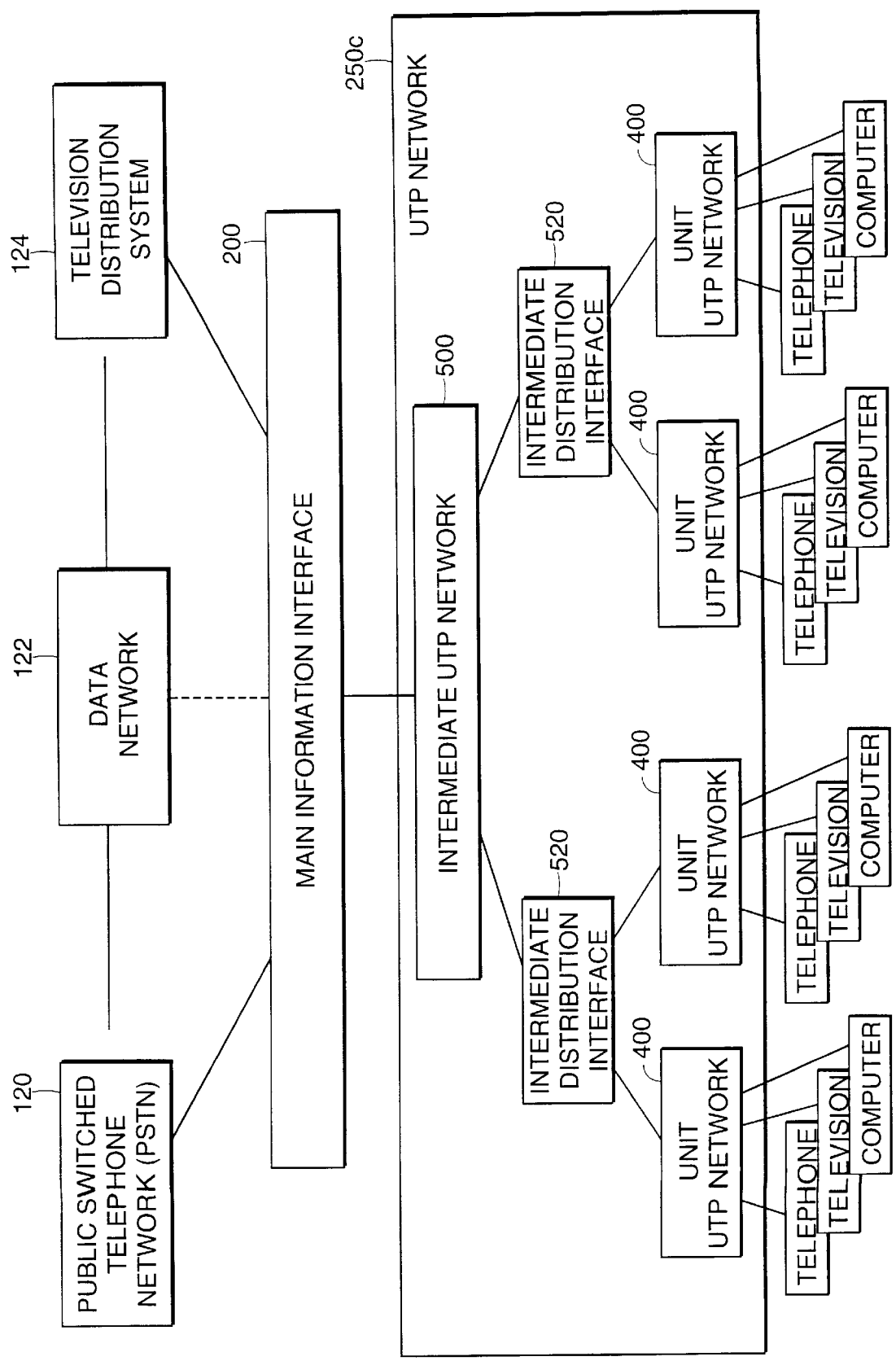
FIG. 5 shows a UTP network in which multiple unit wiring networks are coupled through an intermediate wiring network and multiple intermediate distribution interfaces to a main information interface.

Referring to FIG. 5, another UTP network 250c illustrates a type of wiring network that might be found in a larger building, such as a hotel or an apartment building. Separate unit UTP networks 400 provide service to separate units. In this case, each unit UTP network 400 is coupled to an intermediate distribution interface 520. The intermediate distribution interfaces 520 are then coupled through an intermediate UTP network 500 to main information interface 200. For instance, an intermediate distribution interface 520 can be located on each floor of the building and provide service to units on that floor. Intermediate distribution interface 520 provides a point at which a physical connection can be made between a cable leading to a unit UTP network 400 and a cable leading through intermediate UTP network 500 to main information interface 200.

2 SIGNALING (FIGS. 6–7)

The general approach to signaling on UTP network 250 (FIG. 2) is to multiplex signals on UTP cables used for telephone communication (i.e., active UTP). The signals are multiplexed in a high frequency band of frequencies higher than the frequencies used for ordinary telephone communication. The band of frequencies used for ordinary telephone communication extends up to approximately 3.3 kHz. The high frequency band can extend from the telephone band to 32 MHz or higher while still providing adequate signal transmission within the building. UTP cables that are not used for telephone communication can also be used, if they are available, in addition to, or instead of, UTP cables used for telephone communication.

Figure 6:
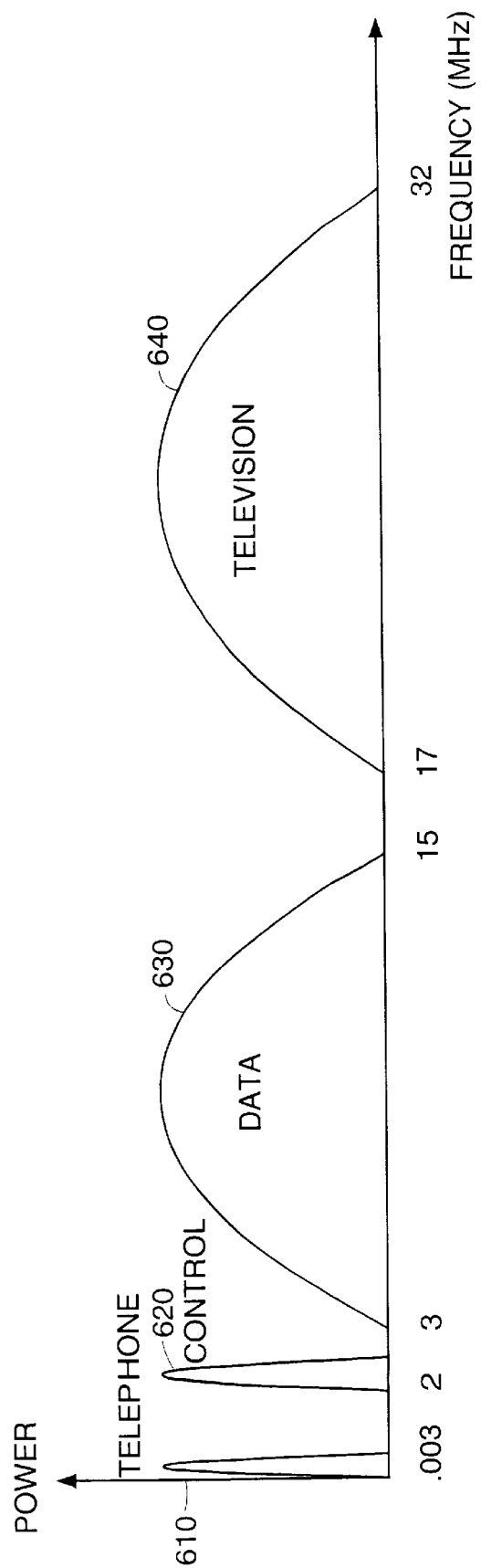
FIG. 6 shows an allocation of bandwidth on wire pairs.

Referring to FIG. 6, a preferred allocation of frequency bands used in this system on active UTP is as follows:

0–3.3 kHz: the telephone band 610 used for bi-directional communication between telephones 134 and PSTN 120.

2–2.5 MHz: a control band 620 used for passing control signals from terminal devices, such as from the remote control of a television, to main information interface 250.

3–15 MHz: a data band 630 used for bi-directional communication between computers 144 and main information interface 250.

17–32 MHz: a television band 640 for passing a modulated television signal, such as an FM modulated NTSC composite signal, from main information interface 250 to televisions 154.

On inactive UTP, a portion of telephone band 610 can also be used as part of data band 630. In particular, certain data signaling approaches (e.g., 10Base2), described below, use low frequencies for collision detection.

2.1 Data Signaling (FIG. 7)

In various versions of the system, signaling in data band 630 is based on the IEEE 802.3 "Ethernet" standard or on the related 802.12 standard. In particular, signaling on one UTP or two UTP is related to the 10BaseT and 10Base2 standards which provide for 10 Mb/s data communication between devices such as computers and data communication hubs and routers. Signaling on more than two UTP is related to the 100BaseT4 and 100VG 100 Mb/s standards.

2.1.1 10 Mb/s Over One UTP

Versions of the system can use one of several signaling approaches to transfer 10 Mb/s data over a single UTP. These approaches include:

Standard 10Base2 signaling;

Modified 10Base2 signaling inhibiting transmission in the telephone band; and

Modified 10Base2 signaling inhibiting transmission in the telephone band and in which each device sends a transmission notification tone in the data band.

Figure 7A:
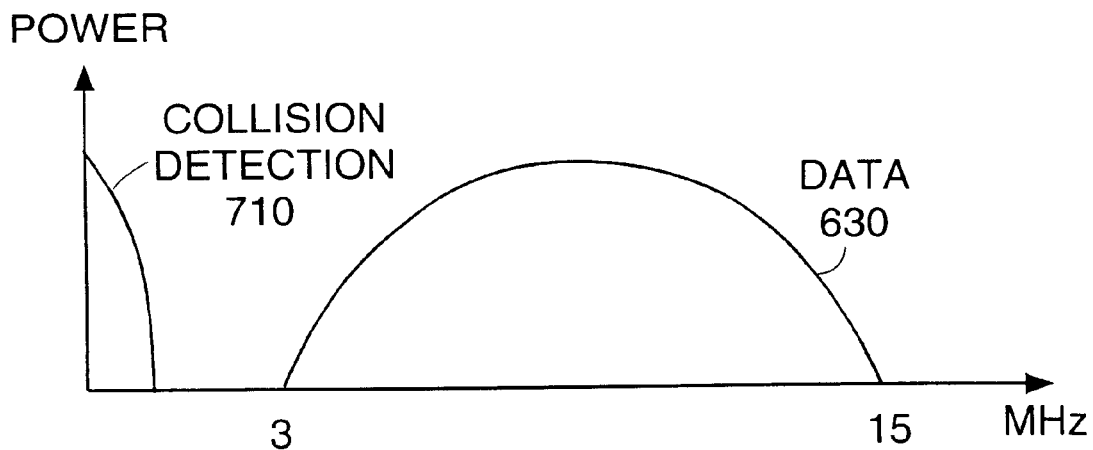
FIGS. 7a–c illustrate the spectrum for three approaches to 10 Mb/s signaling on one UTP.

Referring to FIG. 7a, in the first approach, data is passed over a single UTP using signaling defined by the 10Base2 standard. According to the standard, low frequencies 710 near DC are used for collision detection. This approach to signaling is useful on UTP that are not also used for telephone communication, since low frequencies 710 would interfere with the telephone communication.

Figure 7B:
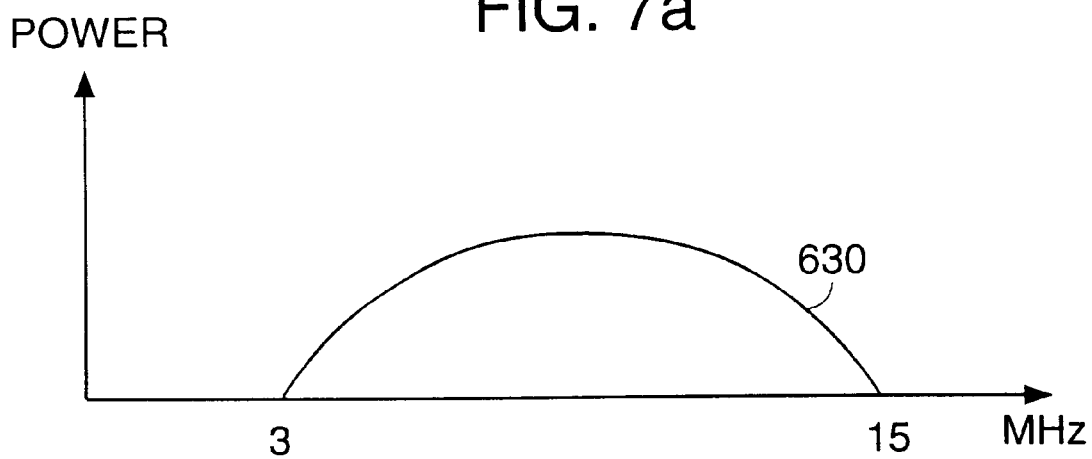

Referring to FIG. 7b, a modified 10Base2 signaling approach inhibits transmission at low frequencies. As is described fully below, the collision detection approach with this signaling approach uses only signals in data band 630. Since this modified signaling does not use the telephone band, it can be used on an active UTP.

Figure 7C:
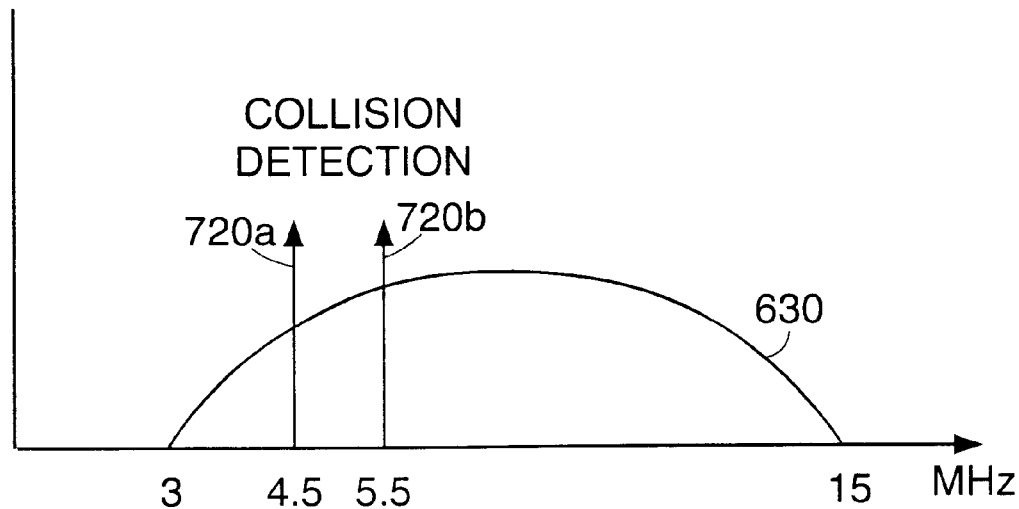

Referring to FIG. 7c, another signaling approach that can be used on active UTP uses tones within data band 630 for collision detection. When two devices communicate using this modified 10Base2 signaling, each uses a tone (or some other narrow band signal) to indicate that it is transmitting.

The two devices are assigned different frequencies for their tones, in this system, 4.5 MHz 720a and 5.5 MHz 720b. A device transmits on one of the two frequencies and listens on the other of the two frequencies to determine if a collision has occurred.

Although the transmission tone frequencies of 4.5 MHz and 5.5 MHz are within the frequency band of the coded data that is transmitted by the devices, these frequencies are chosen because inexpensive ceramic filters are available at these frequencies. The filters have bandwidths of approximately 0.3 MHz. Since this is a relatively narrow bandwidth, filtering out this bandwidth at the two tone frequencies does not significantly affect the coded data signal.

In some versions of the system that use this modified 10Base2 signaling, two or more devices, share the same transmission tone frequency. For example, multiple computers in a unit might use one tone frequency and a distant hub may use the other frequency. In such systems, the devices that share the same transmission tone frequency must concurrently transmit a tone at that frequency and detect possible transmission of a tone at that same frequency by another device.

As an alternative to using transmission tone frequencies within data band 630, the tone frequencies can be chosen below 3 MHz to avoid overlapping with the data band.

2.1.2 10 Mb/s Over Two UTP

Data communication over two UTP uses standard 10BaseT signaling. According to the 10BaseT standard, collision detection is accomplished without use of any low frequency signals, therefore the data communication on each of the two UTP does not interfere with the telephone voice band on either UTP.

2.1.3 100 Mb/s Over Three or More UTP

With both standard 100BaseT4 and 100VG signaling, four UTPs are needed for communication between two devices. Unfortunately, the wiring in multi-unit buildings seldom includes more than three UTP reaching each unit, and some structures include only two. According to the invention, versions of the system use one of two 100 Mb/s signaling approaches that use fewer than four UTP.

In standard 100BaseT4 systems in which two device (i.e., a computer and a hub) communicate, only three UTP are used at any time to transmit data from one device to the other, and a different subset of three UTP are used to receive data from the other device. When transmitting, the device listens on the fourth UTP to detect a collision.

In the first 100 Mb/s signaling approach, only three UTP are used for data transmission as well as collision detection. When transmitting, a device transmits data on three UTP in data band 630 according to the signaling approach used in 100BaseT4. The device also applies a DC offset on one of three UTP and detects whether the other device has also applied a DC offset to that same UTP. The other two UTP can use the telephone band for telephone communication since the 100BaseT4 data signaling on each UTP does not interfere with the telephone band.

An alternative to using a DC offset for collision detection uses a transmission tone approach similar to that used in one of the modified 10Base2 signaling approaches described above.

The second 100 Mb/s signaling approach is based on the 100VG (IEEE 802.12) standard. In 100VG systems, four differential signals are transmitted on four UTP. In our second 100 Mb/s approach, only three UTP are used. The four differential signals are encoded using a combination of the differential and common mode signals on the three UTP. In one instance of this signaling approach, one differential signal is transmitted as the difference between the common mode signals on two of the UTP. The remaining three differential signals are transmitted unmodified as differential signals on the three UTP. Note that in principle, up to five different signals can be transmitted on the six wires making up the three UTP, and only four signals are needed. According to the 100VG standard, the telephone band is not used and therefore the three UTP used for this 100 Mb/s signaling can also be used as active telephone lines.

2.1.4 10 Mb/s Over Multiple UTP

The general approach of splitting a data stream for transmission on multiple UTP can also be used to send a 10 Mb/s signal over a long distance. In general, the approach involves splitting a standard 10 Mb/s data stream into N parallel streams. These streams are then send over a communication path consisting of N+1 UTP. N of the UTP are used to send the split data stream. Due to the lower data rate, a lower frequency range is needed for transmission, thereby increasing the range and robustness of the signaling. During transmission, the N+1st UTP is monitored to detect collisions. For instance, using five UTP, a 10 MB/s data stream is demultiplexed 1:4 into four 2.5 Mb/s streams and transmitted on four separate UTP using a Manchester coding scheme similar to that used in 10BaseT or 10Base2. Due to the reduced data rate, the spectrum extends, in this 1:4 demultiplexing approach, to approximately 3.75 MHz.

2.2 Television Signaling

Referring again to FIG. 6, signaling in television band 640 uses an FM modulation approach of a composite NTSC signal. The composite NTSC signal includes a video signal with a spectrum up to approximately 4.5 MHz as well as a modulated audio signal near 4.75 MHz. The composite signal is FM modulated spreading the resulting spectrum approximately over the range 17 MHz to 32 MHz. The lower end of this range, 17 MHz, is chosen to provide sufficient separation form the data band which extends to approximately 15 MHz. The upper end of this range, 32 MHz, is chosen to avoid conflicting with US FCC regulations.

Alternative television signaling can also be used. In particular, digitally encoded television signals can be used. For example, using a Quadrature Amplitude Modulation (QAM) approach, a coded digital television signal can occupy a frequency band from 1 MHz to 3 MHz. Therefore, as an alternative to using a television band at higher frequencies than the data band, a digital television band can be at frequencies between the telephone band and the data band, thereby not interfering with either of these other bands.

Figure 8:
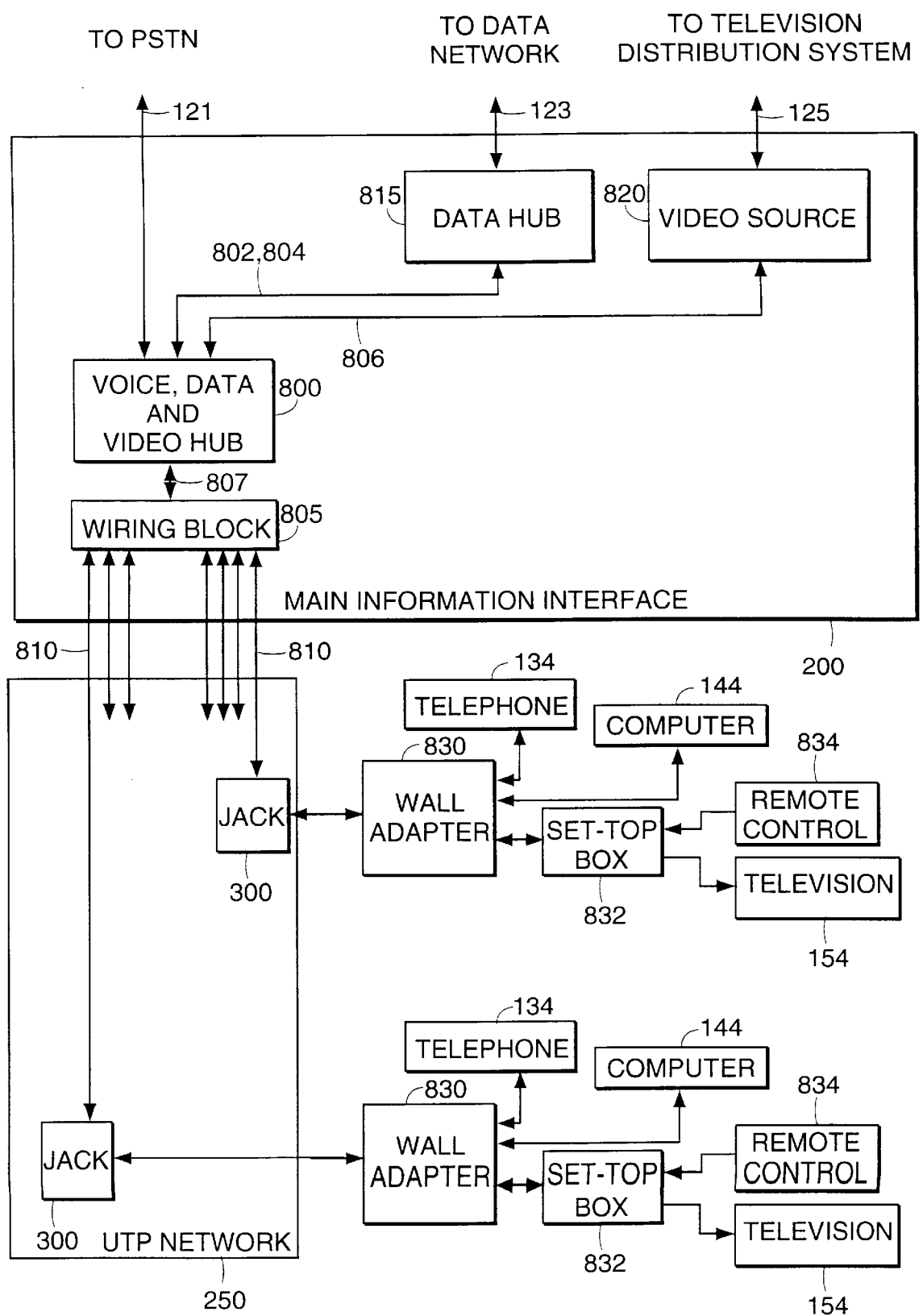
FIG. 8 shows a voice, data, and video hub which couples telephones, computers, and televisions to external information services.
Figure 9:
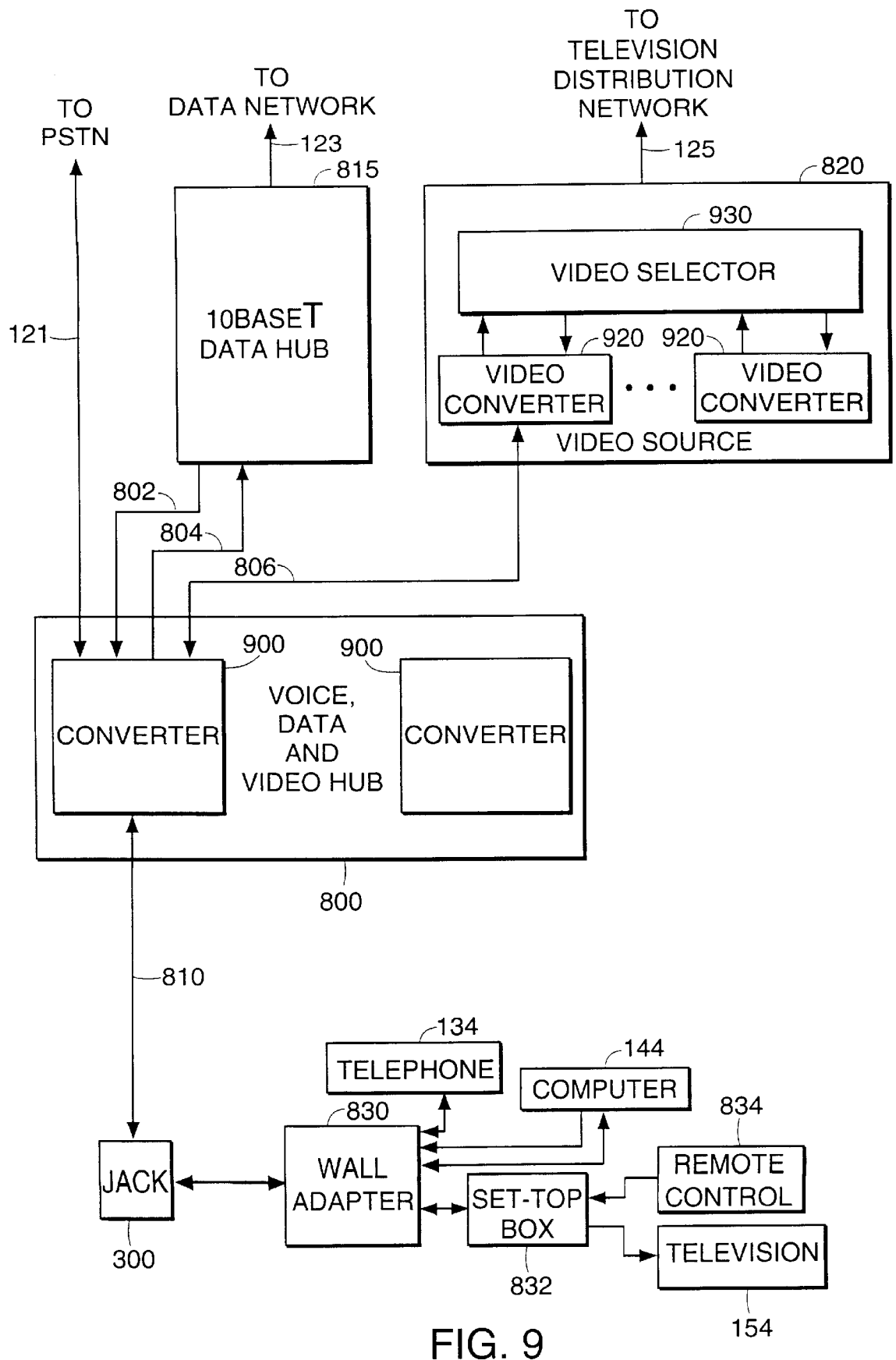
FIG. 9 shows one voice, data, and video signal paths for one UTP connection.
Figure 10:
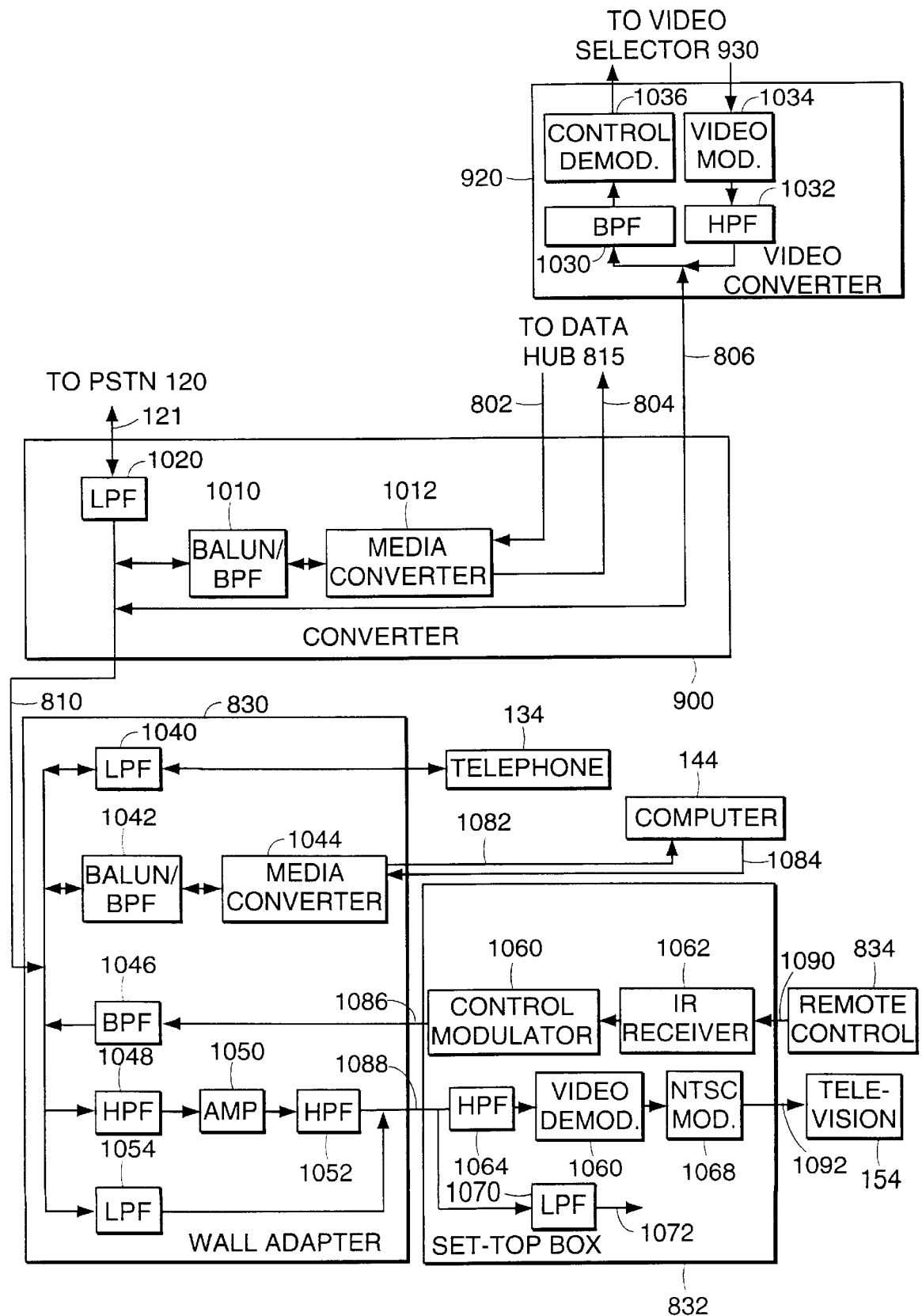
FIG. 10 shows the detailed signal paths for one UTP connection.

3 Signal Distribution (FIGS. 8–10)

According to preferred embodiments of the system, telephone, data, and video signals are frequency multiplexed using the signaling approaches described above. The multiplexed signals are distributed from main information interface 200 over UTP wiring network 250 (FIG. 2).

3.1 Single Pair Distribution

Referring to FIG. 8, a preferred embodiment of the system uses a single UTP to distribute the multiplexed signals. Main information interface 200 includes a voice, data and video hub 800 which couples telephone, data, and video services to UTP network 250. Hub 800 is connected to UTP network 250 through a wiring block 805. In UTP network 250, jacks 300 provide points at which terminal devices are coupled to UTP network 250. Terminal devices, including telephones 134, computers 144, televisions 154, as well as remote controls 834, are connected to jacks 300 through wall adapters 830 and set-top boxes 832. Hub 800, wall adapters 830, and set-top boxes 832 work together to perform media conversion and frequency multiplexing and demultiplexing functions to provide communication services to the terminal devices.

Voice, data and video hub 800 has three connections to external telephone, data, and television services. Hub 800 is connected to UTP cables 121 which provide telephone services from PSTN 120. Hub 800 is also connected to a data hub 815 and to a video source 820. Data hub 815 allows computers 144 to communicate over data network 122. In some versions of the system, data hub 815 also allows computers 144 to communicate with one another. In other versions of the system, data hub 815 inhibits data communication between computers 144 as a security measure. Video source 820 accepts control information that originates at remote controls 834 and provides television signals that are displayed on corresponding televisions 154.

In this version of the system, computers 144 and data hub 815 have standard 10BaseT data interfaces. Also, data communication within UTP network 250 uses a single active UTP for data communication with each computer.

Referring to FIG. 9, voice, data and video hub 800 includes separate converters 900, one for each active telephone line 810. In this version of the system, converter 900 communicates with a particular wall adapter 830. For instance, converter 900 is coupled to wall adapter 830 and is coupled to one UTP 121 providing telephone communication to PSTN 120. Converter 900 is connected to a pair of 10BaseT UTP, receive UTP 802 and a transmit UTP 804, providing 10BaseT communication with 10BaseT data hub 815. Converter 900 is connected to a UTP 806 for accepting video signals from video source 820 and providing control signals to the video source.

Referring still to FIG. 9, video source 820 includes video converters 920, each connected over UTP 806 to a corresponding converter 900. Signals pass in both directions over UTP 806. Each video converter 920 accepts control information from the corresponding converter 900 and provides the control information to a video selector 930, which in turn provides a television signal back to the video converter.

Referring to FIG. 10, the detailed signal paths for one UTP 810 in UTP network 250 can be followed from converter 900 through wall adapter 830 and set-top box 832. Telephone signals in the telephone band from PSTN 120 pass over UTP 121 to converter 900. The telephone signal passes through a low-pass filter (LPF) 1020 which passes the telephone band. The telephone signal, which is passed by LPF 1020, continues through UTP network 250 and eventually reaches wall adapter 830. In wall adapter 830, the signal passes through a LPF 1040 which passes the telephone signal to telephone 134.

LPF 1020 also passes DC. PSTN 120 provides DC power over UTP 121 and therefore LPF 1020 passes this power through to UTP 810. A LPF 1054 passes very low frequencies allowing recovery of DC power for powering wall adapter 830 and set-top box 832.

Signals from telephone 134 pass to PSTN 120 over the same path in the opposite direction.

Referring still to FIG. 10, computer 144 is coupled to wall adapter 830 by two UTP 1082 and 1084 according to the 10BaseT standard. In wall adapter 830, a media converter 1044 converts this two UTP communication for transmission on a single UTP. In this illustrated embodiment of the system, the single UTP data communication uses transmission notification tones within the data band for collision detection.

The data signal passes from media converter 1044 to a balun/band-pass filter (BPF) 1042. Balun/BPF 1042 passes the data band and balances the signal applied to UTP 810. Within wall adapter 830, the data signal is blocked by LPF 1040, a BPF 1046, a HPF 1040 and LPF 1054.

The data signal passes over UTP 810 to converter 900. In converter 900, the data signal passes through a balun/BPF 1010 to a media converter 1012. Media converter 1012 converts the data signal to a 10BaseT signal and applies it to UTP 804. The 10BaseT signal is received and processed by data hub 815. In converter 900, LPF 1020 prevents the data signal in the data band from passing over UTP 121 to PSTN 120.

Data hub 815 sends a data signal to computer 144 by first sending a 10BaseT signal to media converter 1012 over UTP 802. After media converter 1012 converts the 10BaseT signal to a data signal for signaling on one UTP, it sends the converted signal over the reverse path through balun/BPF 1010, over UTP 810, through balun/BPF 1042 to media converter 1044 where it is converted back into a 10BaseT signal and passed to computer 144 over UTP 1082.

Referring still to FIG. 10, television and control signals pass between remote control 834 and television 154 and video converter 920. A user (viewer) uses remote control 834 to send a control signal, for example, selecting a particular television program. Remote control 834 passes an infra-red (IR) signal 1090 to set-top box 832. At set-top box 832, an IR receiver 1062 accepts the IR signal and converts it to an electrical signal encoding the control information. This signal is applied to a control modulator 1060 which modulates the control signal so that its spectrum is in the control frequency band. This control signal is passed to wall adapter 830 over UTP 1086. In wall adapter 830, the modulated control signal passes through BPF 1046 which passes the control band. The modulated control signal passes over UTP 810 to converter 900. The control signal is blocked by LPF 1020 and by balun/BPF 1010. The control signal is passed to video converter 920 on UTP 806 where it passes through BPF 1030, which passes the control band, to a control demodulator 1036 which recovers the control signal produced by IR receiver 1062. The recovered control signal is passed to video selector 930 (FIG. 9).

In response to receiving a control signal through video converter 920 from a remote control 834, video selector 930 transmits a television signal to video converter 920. Video selector 930 include a set of tuners (not shown) which select particular broadcasts provided over broadband connection 125 from television distribution network 124 based on the received control signals.

Referring still to FIG. 10, video converter 920 accepts a television signal from video selector 930. This signal is in a composite NTSC format. In video converter 920, video modulator 134 frequency modulates the composite NTSC signal so that the resulting signal is in the television band. This FM signal passes through high-pass filter 132, which passes the television band, to converter 900. The signal then passes over UTP 810 to wall adapter 830.

In wall adapter 830, the FM modulated television signal passes through HPF 1048 and is amplified in an amplifier 1050.

Wall adapter 830 provides power to set-top box 832 by applying DC power obtained from UTP 810 through LPF 1054 to the video connection coupling wall adapter 830 and set-top box 832. In particular, the output of amplifier 1050 passes through a HPF 1052 which blocks DC. The output of HPF 1052 is connected to the output of LPF 1054 and passed to set-top box 832 over UTP 1088.

Set-top box 832 accepts the combined FM modulated television signal and DC power over UTP 1088. In set-top box 832, the FM modulated television signal passes through a HPF 1064 which blocks DC. The FM signal is fed to a video demodulator 1066 which recovers the composite NTSC signal. The composite NTSC signal is then AM modulated in NTSC modulator 1068 to a standard television frequency and provided to television 154 which internally recovers the video and audio components of the NTSC signal in its receiver section.

Also in set-top box 832, the DC power signal input over UTP 1088 passes through LPF 1072 to provide power to active components in the set-top box.

3.2 Multiple Pair Data Distribution

Another preferred embodiment of the system uses multiple UTP to distribute multiplexed signals. The arrangement is similar to that shown in FIGS. 8–10.

Figure 11:
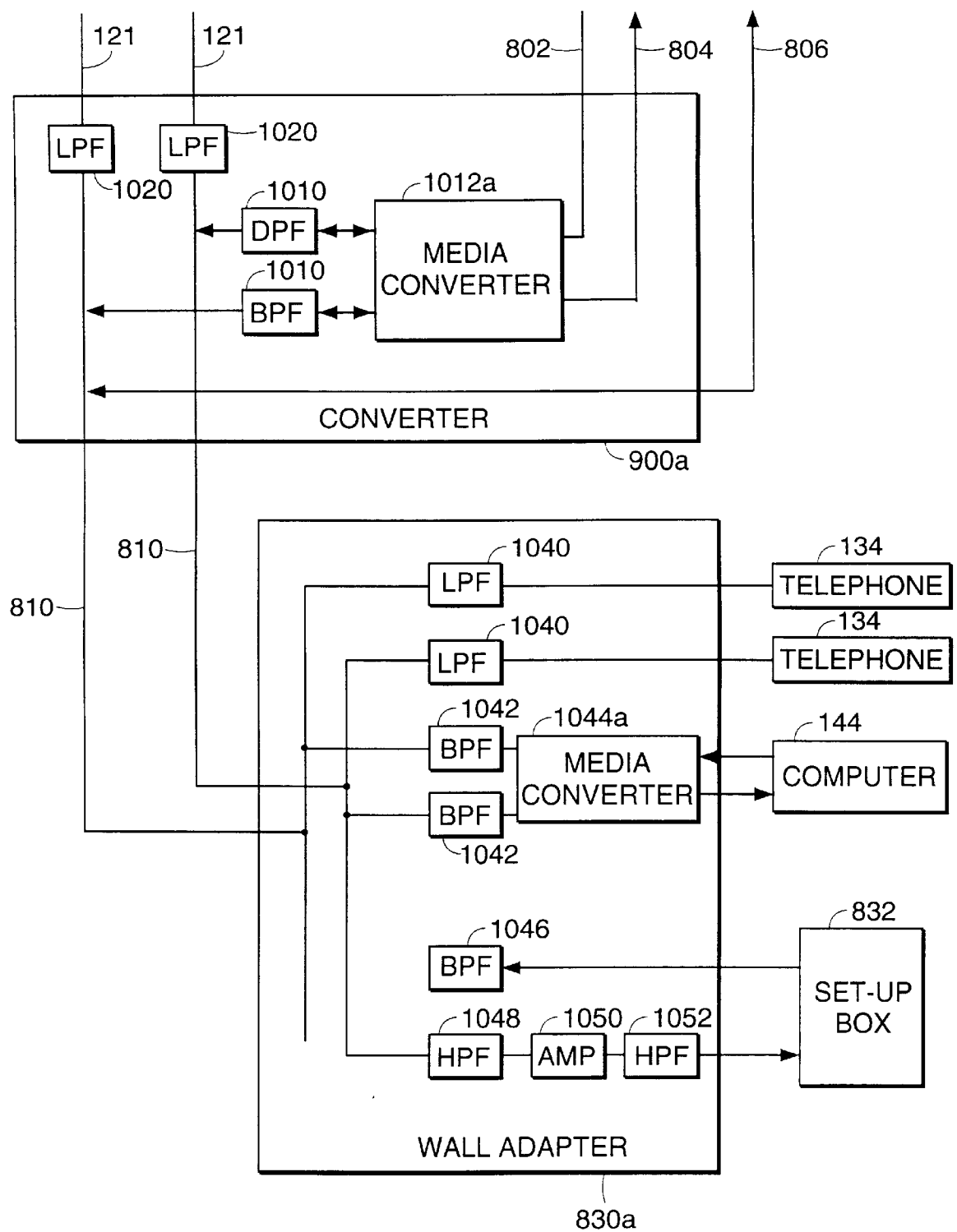
FIG. 11 shows a media converter coupling two UTP 10BaseT signals to a single UTP.

Referring to FIG. 11, two UTP 810 couple a converter 900a and a wall adapter 830a. Converter 900a is similar to converter 900 in FIG. 10 except that media converter 1012a communicates data over two UTP, for instance using standard 10BaseT signaling, while in FIG. 10, media converter 1012 communicates data over a single UTP.

In converter 900a, media converter 1012a is coupled to data hub 820 over UTP 802 and 804. Media converter 1012a is coupled to two UTP 810 through separate BPF 1010. The two UTP 810 are coupled to PSTN 120 through respective LPF 1020.

Wall adapter 830 is connected to both UTP 810. Each UTP 810 can be coupled to a separate telephone 134 through a LPF 1040. Both UTP 810 are connected to a media converter 1044a through two BPF 1042. Media converter 1044a communicates with media converter 1012a and passes 10BaseT signals back and forth with computer 144.

If standard 10BaseT signaling is used, media converter 1044a can be particularly simple—media converter 1044a simply passes signals directly between BPF 1042 and computer 144 without any processing. In this case, BPF 1042 can be located in a wall jack and computer 144 is then connected directly to the wall jack with a two UTP cable. If the jack has a RJ-45 jack wired according to the 10BaseT standard, computer 144 connects to the wall jack exactly as if it were connecting directly to a 10BaseT hub.

Referring still to FIG. 11, set-top box 832 connects to wall adapter 830a in a similar manner as it is connected to wall adapter 830 in FIG. 10. Wall adapter 830 couples set-top box to only one of the two UTP 810 since video and control signals are multiplexed on a single UTP. Video signals pass from one of the two UTP 810, through HFP 1048, amplifier 1050, and HPF 1052 to set-to box 832. Control signals pass from set-top box 832 through BPF 1046 to the same UTP 810.

Other multiple UTP arrangements follow the same approach. For instance, in a three UTP data signaling approach which provides 100 Mb/s data communication with a computer 144, the computer is coupled to a media converter in a wall adapter with four UTP using 100BaseT4 or 100VG signaling. The media converter converts this signaling to a three UTP signaling format. These three signals are coupled over three UTP 810 to a corresponding media converter which is coupled to a 100 Mb/s hub.

4 Media Conversion (FIGS. 12–16)

Referring back to FIG. 10, media converters 1012 and 1044 convert two UTP 10BaseT signals for communication over a single UTP in UTP network 250. Different types of media converters can be used in various versions of the system.

Figure 12:
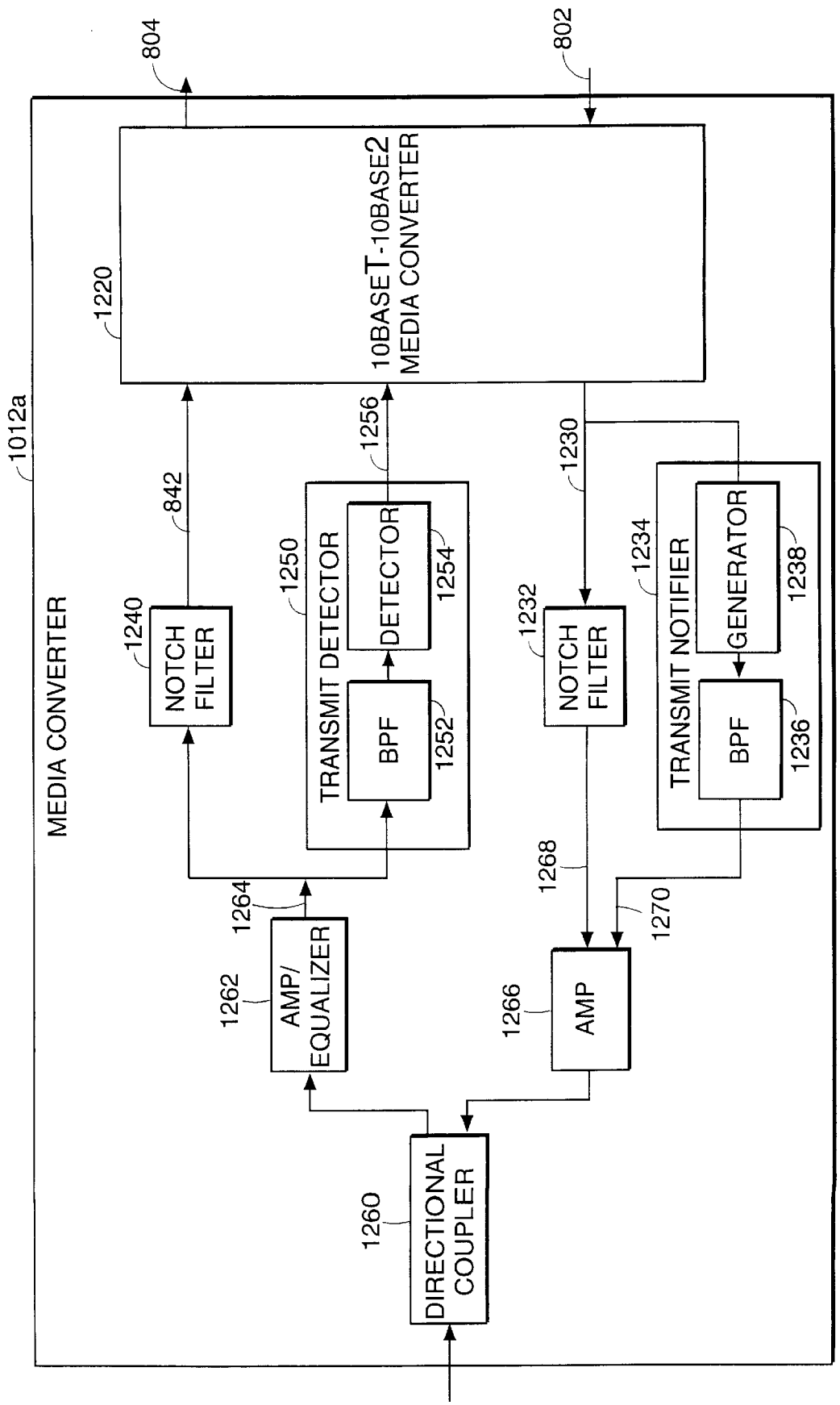
FIG. 12 shows a media converter for converting 10BaseT signals for communication over a single active UTP.

4.1 10BaseT to Single Active UTP Conversion (FIG. 12)

Referring to FIG. 12, a media converter 1012a couples standard 10BaseT transmit UTP 804 and receive UTP 802 to a UTP 1280 which uses the modified 10Base2 signaling shown in FIG. 7c. Internally, media converter 1012a uses a standard 10BaseT-10Base2 media converter 1220, such as integrated circuit part number LXT906 manufactured by Level One Corporation, as well as associated circuitry, to interface with a wire pair 1280.

10BaseT-10Base2 media converter 1220 accepts 10BaseT signals over UTP 802 from data hub 815 which supports 10BaseT communication, and provides 10BaseT signals over UTP 802 to the data hub.

Media converter 1012a applies signals to wire pair 1280 as follows.

10BaseT-10Base2 media converter 1220 accepts a signal over UTP 802 which then passes a 10Base2 compliant signal 1230, encoding the same data stream, to a notch filter 1232. Notch filter 1232 is a ceramic notch filter that blocks transmission of energy within a 0.3 MHz band centered at 4.5 MHz. The remaining energy in the passband of notch filter 1232 continues on to an amplifier 1266.

10Base2 signal 1230 is also passed to a transmit notifier 1234. Transmit notifier 1234 monitors 10Base2 signal 1230. If transmit notifier 1234 detects a transmission from 10BaseT-10Base2 media converter 1220, a generator 1236, which includes a crystal oscillator, creates a 4.5 MHz harmonic. The 4.5 MHz harmonic from generator 1236 passes through band pass filter 1238, a ceramic filter that limits its output energy to a bandwidth of 0.3 MHz around 4.5 MHz. The output of band pass filter 1238 is passed to amplifier 1266 where it is added to the output of notch filter 1232 and amplified.

When it is not transmitting, amplifier 1266 presents and very high output impedance in order to not load wire pair 1280.

When it is transmitting, amplifier 1266 applies its amplified output to directional coupler 1260. Directional coupler 1260 suppresses transmission of signals from amplifier 1266 back to 10BaseT-10Base2 media converter 1220 through an amplifier 1262. Directional coupler 1160 passes the amplified signal to UTP 1180.

Note that the signal passing onto wire pair 1280 always includes a "spike" of energy centered at 4.5 MHz. This harmonic is used by a corresponding media converter (e.g., 1044, FIG. 10), also coupled to wire pair 1280 to detect when media converter 1012a is transmitting.

Media converter 1012a passes signals from wire pair 1280 to 10BaseT wire pair 804 as follows.

Signals from wire pair 1280 pass through directional coupler 1260 to amplifier/equalizer 1262. Amplifier/equalizer 1262 has high input impedance so that it detects signals flowing on wire pair 1280 without loading down that wire pair.

Amplifier/equalizer 1262 tilts the spectrum of the signal it receives to flatten the spectrum. This process is commonly referred to as equalization. Amplifier/equalizer 1262 also boosts the energy of the signal to the level expected by 10BaseT-10Base2 media converter 1220.

The signal from amplifier/equalizer 1262 passes through a notch filter 1240, a ceramic filter that blocks energy in the 0.3 MHz band centered around 5.5 MHz. Notch filter 1240 therefore blocks the "transmission notify" harmonic at 5.5 MHz, which was applied by the transmitting media converter.

The signal from amplifier/equalizer 1262 also passes to a transmit detector 1250. In transmit detector 1250, a ceramic band pass filter 1252 blocks all energy outside of the 0.3 MHz band centered at 5.5 MHz. The "transmission notify" signal from the transmitting media converter passes to detector 1254 which detects the signal.

After a short transient period, detector 1254 determines that a transmission notify signal is present and applies a "signal being received" signal to the collision detect port of 10BaseT-10Base2 media converter 1220.

If 10BaseT-10Base2 media converter 1220 receives the "signal being received" signal at the same time as it is transmitting a signal 1230, it determines that a collision has occurred. When 10BaseT-10Base2 media converter 1220 determines that a collision has occurred, it send an appropriate signal on 10BaseT UTP 804 to signal to the 10BaseT device connected to media converter 1012a that a collision has occurred.

Media converter 1012a is designed to communicate with a companion media converter (1044, FIG. 10) connected at a different point on the same transmission line to which wire pair 1280 is connected. The companion converter uses the opposite frequencies for transmission detection and notification. In particular, in the companion media converter, notch filter 1240 and bandpass filter 1252 are tuned to 4.5 MHz and notch filter 1232, bandpass filter 1238 and generator 1236 are tuned to 5.5 MHz.

Figure 13:
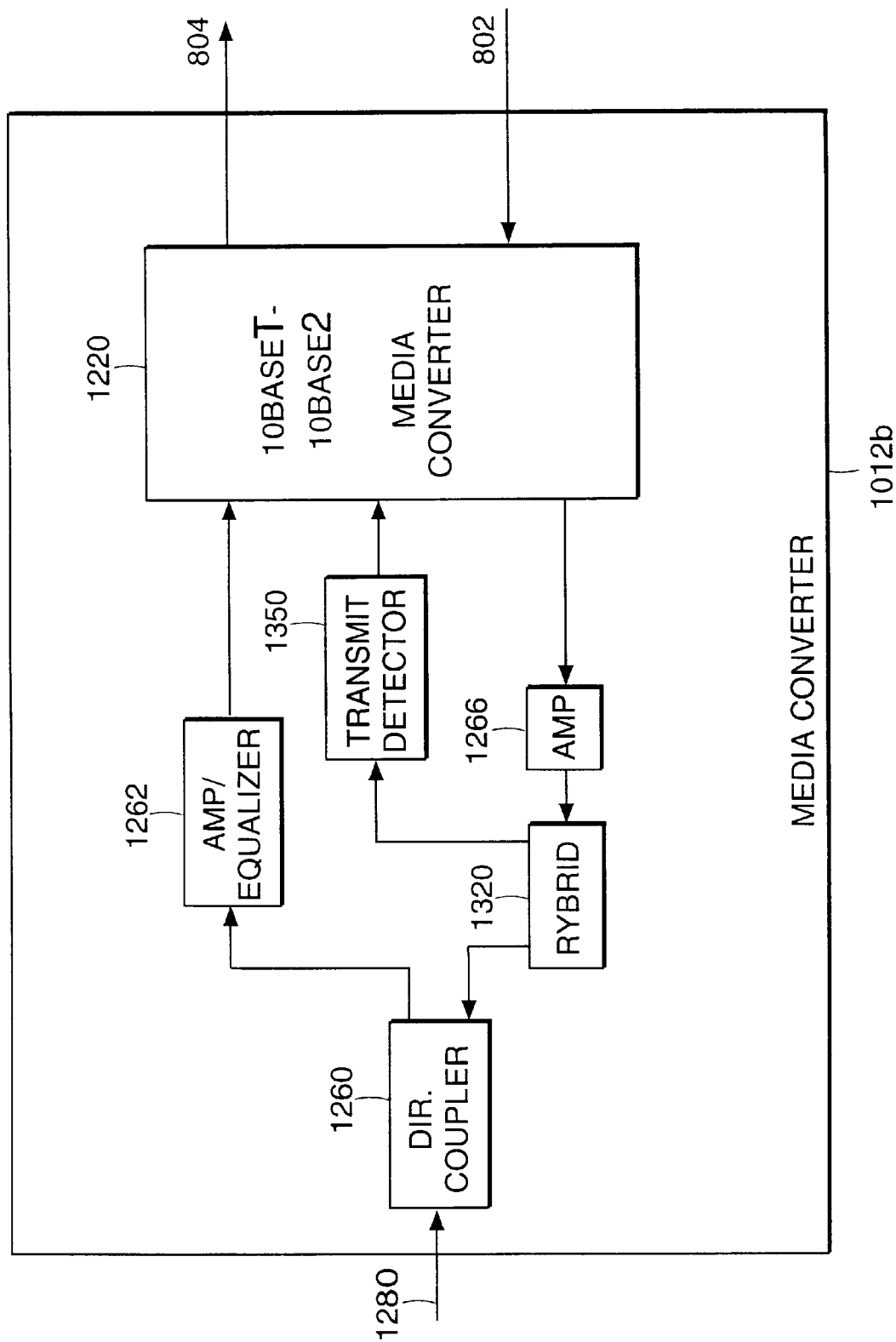
FIG. 13 shows an alternative media converter for converting 10BaseT signals for communication over a single active UTP.

4.2 Alternative 10BaseT to Single Active UTP Conversion (FIG. 13)

Referring to FIG. 13, media converter 1012b is an alternative to media converter 1012a (FIG. 12). Media converter 1012b couples standard 10BaseT transmit UTP 804 and receive UTP 802 to a UTP 1280 which uses the modified 10BaseT signaling shown in FIG. 7b.

Media converter 1012b functions as follows.

Input signals flow from UTP 1280 through directional coupler 1260 to amplifier/equalizer 1262. Amplifier/equalizer 1262 adjusts the energy level of the signal and equalizes the signal across the data band. The resulting signal is passed to the receive port of 10BaseT-10Base2 media converter 1220.

Signals issued from the transmit port of 10BaseT-10Base2 media converter 1220 flow through amplifier 1266. Amplifier 1266 boosts the energy of the signal before applying it through a hybrid 1320. The signal passes through hybrid 1320 to directional coupler 1260 and then to UTP 1280.

Directional coupler 1260 attenuates signals from hybrid 1320 that may cross over to amplifier/equalizer 1262. Some energy may, however, leak across to amplifier/equalizer 1262 and reach the receive port of 10BaseT-10Base2 media converter 1220. When 10BaseT-10Base2 media converter 1220 is transmitting, however, it ignores signals at its receive port. As a result, the transmissions will not be falsely interpreted as incoming data.

When it is transmitting, 10BaseT-10Base2 media converter 1220 must attend to signals arriving at its collision port. Key to the collision detection mechanism is hybrid 1320, which is a 3-port transformer. Signals flow freely through hybrid 1320 between amplifier 1266 and directional coupler 1260.

Hybrid 1320 passes only a narrow band of frequencies of signals input from directional coupler 1260 to transmit detector 1350. Hybrid 1320 attenuates signals input from amplifier 1266.

A narrow band is chosen because if the width of this band is increased while the sharp directionality is retained the cost of hybrid 1320 dramatically increases. In this version of the system, the directional band extends between 5 MHz and 6 MHz. This narrow band is located at the low end of the data band, because crosstalk energy from neighboring wires reduces with decreasing frequencies. Reducing crosstalk is important because the purpose of the hybrid is to pass only the energy transmitted from the converter at the opposite end of the transmission line, and to block any energy crossing over from the transmit port of 10BaseT-10Base2 media converter 1220.

Transmit detector 1350 therefore receives signals in the 5–6 MHz band from hybrid 1320. The received signals are either data signals sent from another media converter or are data signals being sent by this media converter, but attenuated by hybrid 1320. Transmit detector 1350 measures the energy in the received signal, and with a few data bits can detect the presence of a data signal.

Transmit detector 1350 also receives the output of transmit port of 10BaseT-10Base2 media converter 1220. Transmit detector 1350 measures the energy in this signal to determine that 10BaseT-10Base2 media converter 1220 is transmitting a signal.

Whenever transmit detector 1350 detects both a transmission from 10BaseT-10Base2 media converter 1220 and a transmission from the companion converter at the opposite end, it signals the collide port of 10BaseT-10Base2 media converter 1220 that a collision is taking place.

Figure 14:
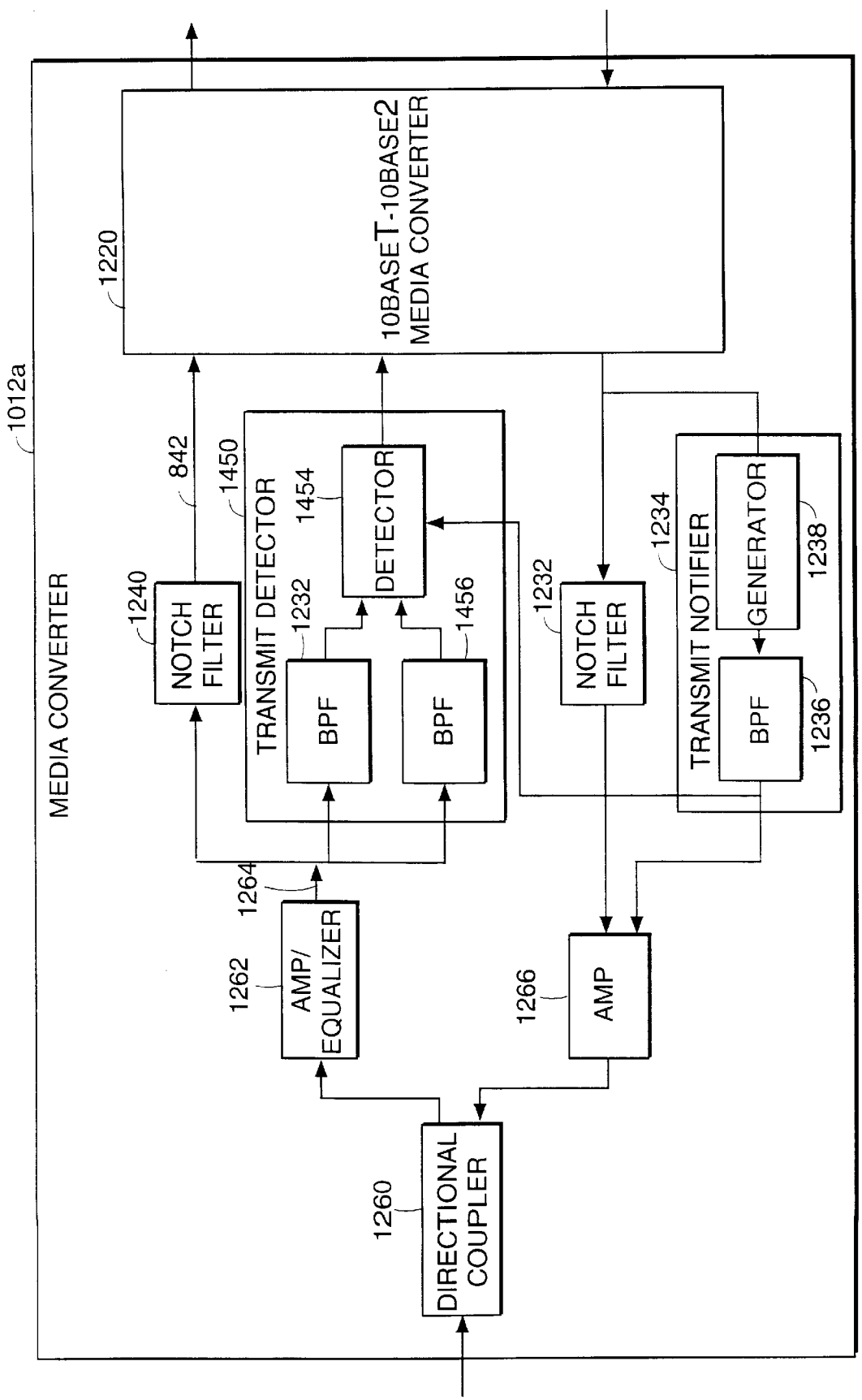
FIG. 14 shows a media converter for converting 10BaseT signals for communication with multiple devices over a single active UTP.

4.3 10BaseT to Single Active UTP Conversion for Multiple Devices (FIG. 14)

Referring to FIG. 14, media converter 1012c is very similar to media converter 1012a shown in FIG. 12. Media converter 1012c has the additional capability of detecting a collision with a transmission from another media converter that has the same transmit tone frequency. This allows, for example, for several devices in a unit to share the same transmit tone frequency and the data hub to have a second transmit tone frequency.

Media converter 1012c differs in one respect from media converter 1012a. Media converter 1012c includes a transmit detector 1450 which processes signals at both transmit tone frequencies. BPF 1252 passes tones at 5.5 MHz to a detector 1454, while a BPF 1456 passes tones at 4.5 MHz, the transmit tone frequency of media converter 1012c. Detector 1454 also receives the output of transmit notifier 1234.

When media converter 1012c transmits a signal onto UTP 1280, the 4.5 MHz transmit tone is passed from amplifier 1266 to directional coupler 1260. Since directional coupler 1260 does not completely attenuate the tone, the attenuated 4.5 MHz tone generated by transmit notifier 1234 is passed through BPF 1456 to detector 1454. The 4.5 MHz tone also passes directly from transmit notifier 1234 to detector 1454.

If a second station transmits at 4.5 MHz, however, the energy level at the output of BPF 1456 increases while the output of transmit notifier 1234 does not. Therefore detector 1454 can detect the presence of the second transmitting device and declare that a collision has occurred.

Figure 15:
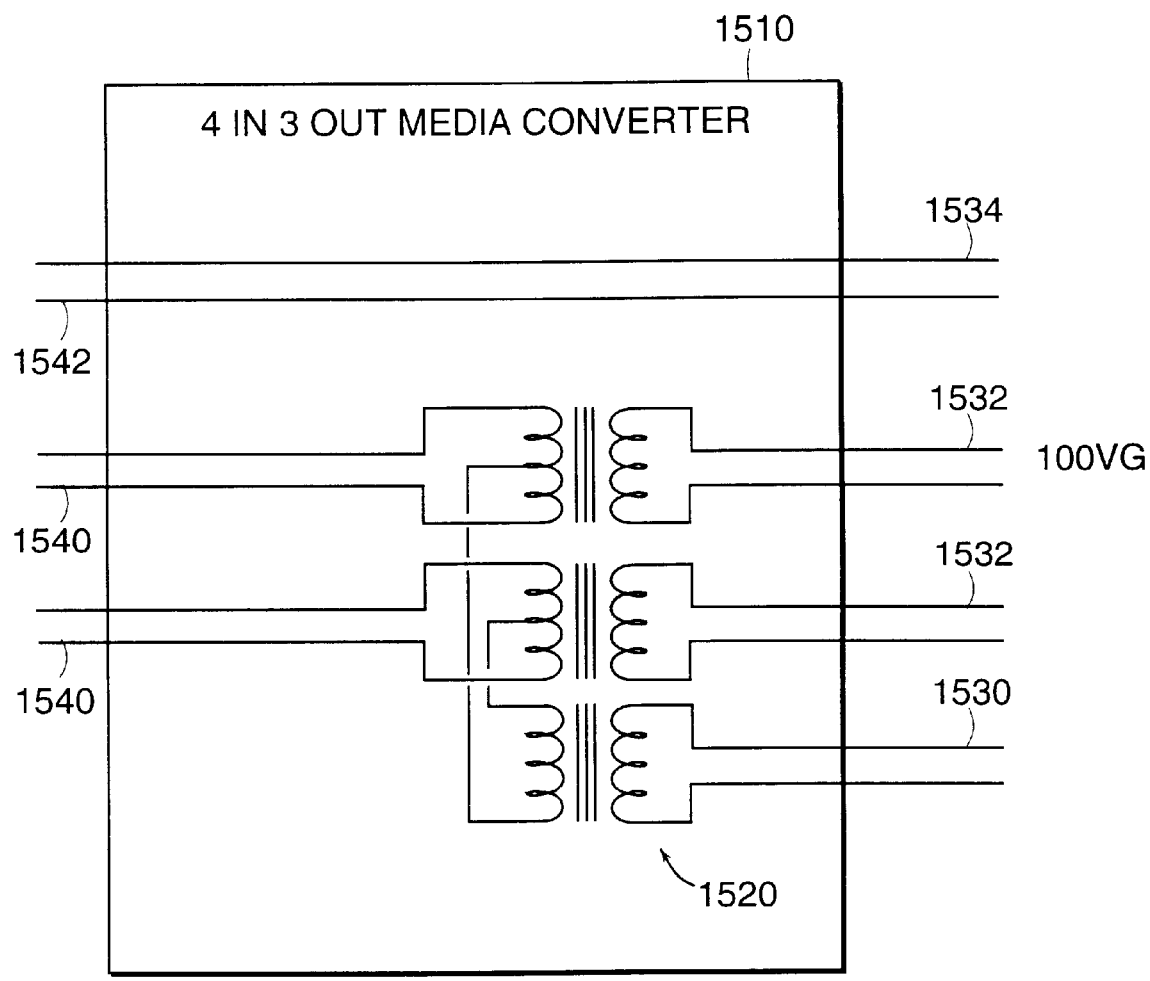
FIG. 15 shows a media converter for converting 100VG signals to three active UTP.
Figure 16:
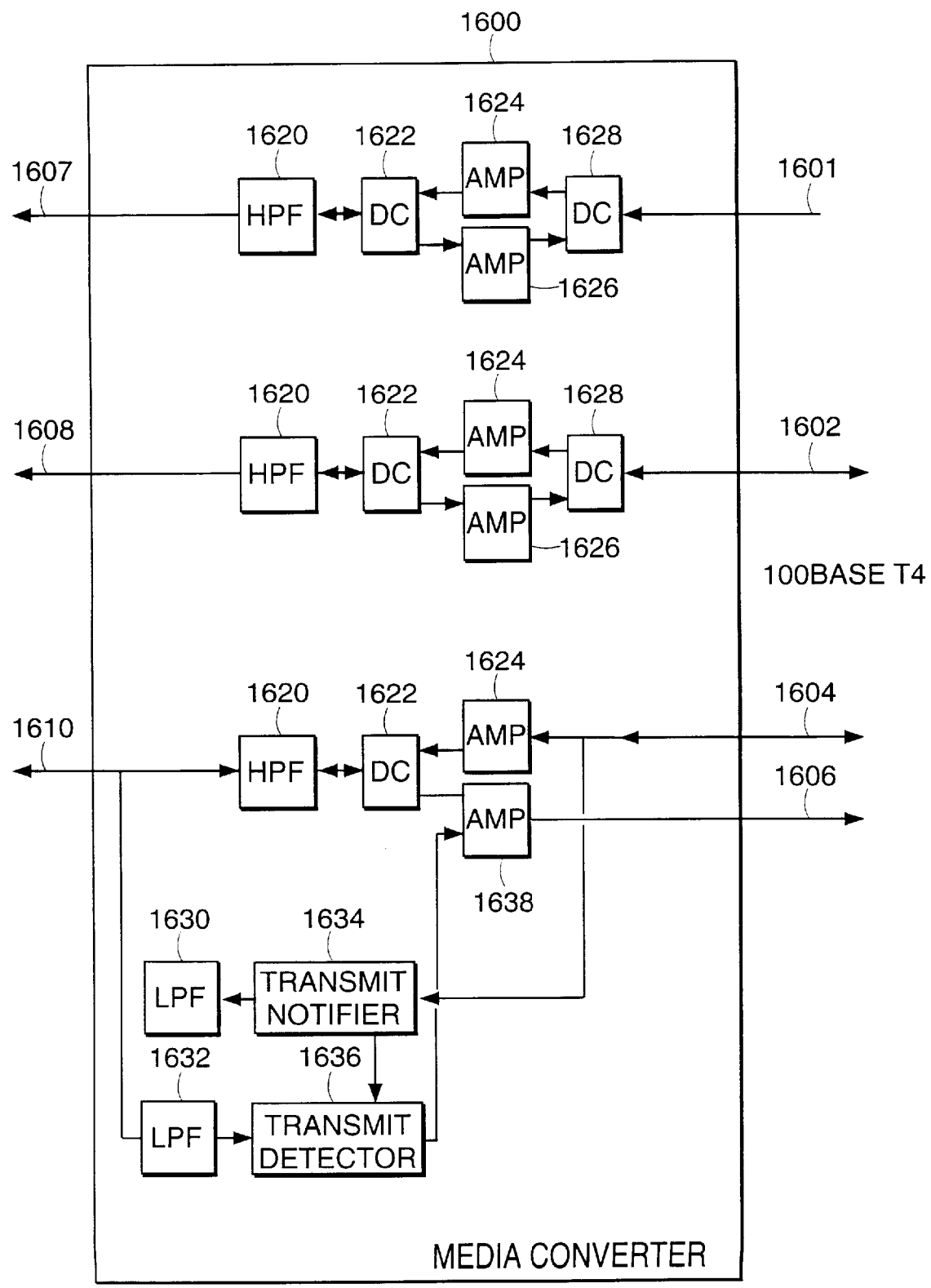
FIG. 16 shows a media converter for converting 100 BaseT4 signals to three UTP.

4.4 10 and 100 Mb/s Media Conversion to Three Active UTP (FIGS. 15–16)

4.4.1 100VG Media Converter (FIG. 15)

FIG. 15 shows a media converter 1510 used to convert a four UTP 1530, 1532, 1534, which are coupled to a standard 100VG device, to only three UTP 1540, 1542 which carry a converted data signal.

Media converter 1530 includes a transformer 1520 which couples three of the four 100VG UTP 1530, 1532 and two of the three UTP 1540. UTP 1534 passes directly through media converter 1530 to UTP 1542.

Transformer 1520 is called a "3 in—2 out" transformer. Transformer 1520 couples the differential signals on UTP 1532 to the differential components of the signals on UTP 1540. The differential signal on UTP 1530 is coupled to UTP 1540 such that the differential signal is expressed as the difference in the common mode signals of the two UTP 1540.

The 100VG signals on UTP 1530, 1532, and 1534 do not make use of the telephone band for data signaling. Therefore, the converted signals on UTP 1540 and 1542 also do not use the telephone band for data signaling. This allows all three UTP 1540 and 1542 to be active telephone lines without interference between the telephone and data signals.

An alternative to media converter 1510 also uses common mode signals to transmit data. Rather than encoding the a differential signal s(t) on two common mode signals C1(t) and C2(t) as $C1(t)=s(t)/2$ $C2(t)=-s(t)/2,$ three common modes can be used. The differential signal s(t) can be expressed as $C1(t)=s(t)/6$ $C2(t)=s(t)/6$ $C3(t)=-s(t)/3.$ This has the advantage that the maximum amplitude of the common mode signals is reduced thereby reducing the radiated energy. This allows higher signal levels to be used.

One factor to consider is that this type of common mode signaling requires termination of not only the three UTP 1540 and 1542 to prevent reflections on a transmission line, but also requires termination of the common mode transmission lines. To terminate the common modes, one can convert the signals back to four UTP and then terminate each of the four UTP separately.

4.4.2 100BaseT4 Media Converter (FIG. 16)

Referring to FIG. 16, media converter 1600 is connected to four UTP 1601, 1602, 1604, and 1606 which couple media converter 1600 to a 100BaseT4 device. Three of the four UTP 1601, 1602, 1604 are used by the 100BaseT4 device to transmit data. When transmitting, the device detects collisions by monitoring the signal on UTP 1606. The 100BaseT4 device receives data on three UTP 1601, 1602, and 1606.

In order to convert signals on the four 100BaseT4 UTP to signals on three UTP, all three UTP 1607, 1608, and 1610 are used for bi-directional data communication in the data band. In addition, UTP 1610 is used for collision detection.

Signals received by media converter 1600 over UTP 1601 and 1602 pass through directional couplers 1628, amplifiers 1624, directional couplers 1622, and HPF 1620, and are finally transmitted onto UTP 1607 and 1608.

Signals received on UTP 1607 and 1608 follow the reverse path with the exception that the signals pass through amplifiers 1626 rather than amplifier 1624.

Signals received by media converter 1600 on UTP 1604 pass though amplifier 1624, directional coupler 1622 and HPF 1620 and are then transmitted on UTP 1610.

Data signals received on UTP 1610 pass through HPF 1620 and directional coupler 1622 to amplifier 1638 and are then transmitted to the 100BaseT4 device over UTP 1606.

When media converter 1600 receives a signal from the 100BaseT4 device on UTP 1604, a transmit notifier 1634 detects the signal and applies a DC signal through LPF 1630 onto UTP 1610.

When media converter 1600 receives a signal on UTP 1607, 1608, 1610, the transmitting media converter has applied a DC signal to UTP 1610. This DC signal passes through LPF 1632 and is detected by transmit detector 1636.

When transmit detector 1636 detects a DC offset that is not due to transmit notifier 1634 applying a DC offset, it sends a signal to amplifier 1638. This signal has the characteristics of a data transmission. This data-like signal is sent on UTP 1606 which causes the attached 100BaseT4 device to detect a collision.

Figure 17:
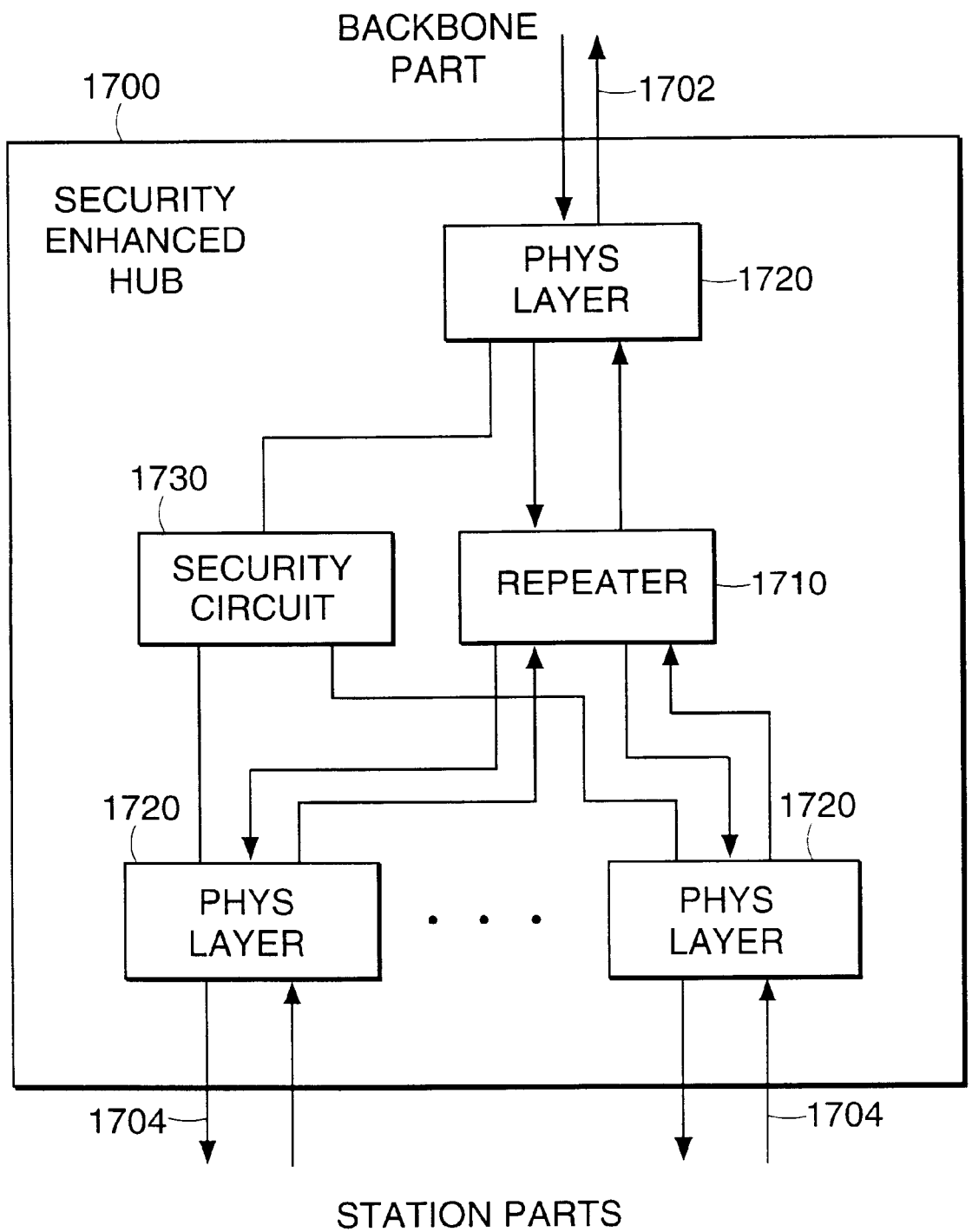
FIG. 17 shows a security hub.
Figure 18:
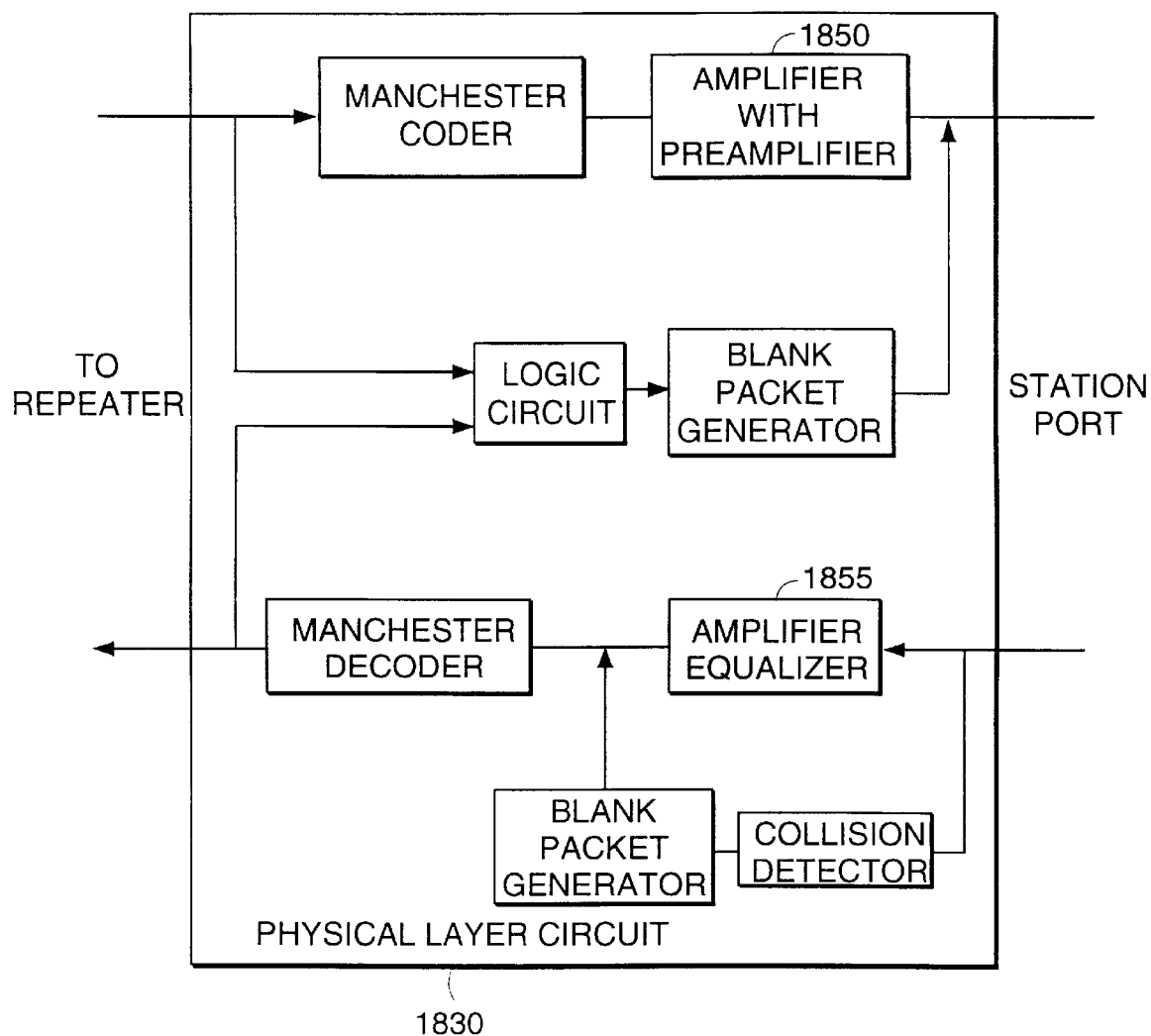
FIG. 18 shows physical layer circuitry for an extended range hub.

5 Data Hubs (FIGS. 17–18)

Referring back to FIG. 8, when a computer 144 transmits data, the data signal passes through UTP network 250 to voice, data and video hub 800 and then to data hub 815. Typical data hubs retransmit signals received on one port on all other ports, often regenerating and amplifying the signal. The transmitted signal is therefore available to other computers 144 coupled to data hub 815.

5.1 Security Hub (FIG. 17)

In many situations, communication between computers 144 and data network 122 is desired, but privacy is desired so that computers cannot intercept communication between other computers and data network 122.

Referring to FIG. 17, a security enhanced hub 1700 includes a repeater 1710 and physical layer circuits 1720, one for each port 1702, 1704 of hub 1700. Port 1702 is the "backbone" port providing a connection to data network 120 while ports 1704 provide connections to computers 144. Hub 1700 also includes security circuitry 1730 coupled to each of the physical layer circuits 1720.

The security enhanced hub 1700 functions as follows.

In order to prevent interception of signals sent by one computer 144 to other computers 144, if data is being received by the hub, security circuitry 1730 detects whether data is being received by hub 1700 through backbone port 1702 or through one of the station ports 1704. If the data is being received from a station port, security circuitry 1730 signals the physical layer circuits 1720 of the other station ports to modify the outbound signals, for example, by sending a predetermined bit pattern rather than the bitstream being received. Note that by sending a modified data signal to the other computers, collisions are avoided since these other computers know that data is being sent by another computer.

If data is being received from the backbone port, security circuitry 1730 determines the Ethernet (MAC) address of each data packet and then signals the physical layer circuits 1720 of all but one station port 1704 to blocks transmission of the packet. The port to which the addressed computer is connected sends the packet as it is received from the backbone port. Again, the signals are blocked by the physical layer circuits by sending a predetermined bit pattern or other signal rather than sending a signal encoding the data packet.

Note that in this arrangement, broadcast packets received from a computer 144 are sent only to the backbone port without modification. Broadcast packets received from the backbone port are provided to all the station ports.

5.2 Extended Range Hub

When data hub 185 is connected to computers more than 330 feet away, standard 10BaseT signaling over two UTP may not work due to a variety of factors, including signal attenuation. Also, if the distance is less than 330 feet, but there are multiple junctions on the path which attenuate the signal, this shorter but attenuated path has similar characteristics as a path that is too long.

One solution is to equip each computer 144 with a 10BaseT adapter whose minimum receive level is set to the 10Base2 standard, i.e. 6 dB less than the 10BaseT standard, and to modify the physical layer circuits in the hub in a similar manner. The drawback to this arrangement, of course, is the cost and inconvenience of providing special 10BaseT hardware in each computer. If, on the other hand, one can confine the special electronics to the hub side, the extra cost and inconvenience is much more limited.

5.2.1 Transmit and Receive Levels

Referring to FIG. 18, each physical layer circuit 1830 of an extended range hub uses an increased transmit level and a reduced minimum receive compared to a standard 10BaseT hub.

For example, in the case that the signals arriving at the hub have suffered enough attenuation to be 2 dB below the minimum level required by the 10BaseT standard, the minimum required level imposed by physical layer circuit 1830 is reduced by 3 dB. In this way, these attenuated signals are received with a reliability that is approximately the same as the reliability required by the Ethernet standards.

Now consider the level of a signal that is transmitted from physical layer circuit 1830 and received at a standard 10BaseT adapter at a computer 144. This signal will also be 2 dB below the minimum required, because the transmission loss in the opposite direction is the same. The transmit level of amplifier #1850 of the physical layer circuits is 3 dB above the 10BaseT standard. Therefore the signal received by the standard adapter will also have a 1 dB excess.

5.2.2 Spectral Tilt

Also, the attenuation suffered by a signal as it transmits across twisted pair wires is not uniform across frequencies B the higher frequencies attenuate more quickly. As a result, there is a Atilt@ in the signal spectrum, and this tilt increases as the wire length increases. As a result, the tilt when communicating across 600 feet is likely to be much greater that it is when communicating across 330 feet of wiring.

Spectral tilt can degrade the ability of an electronic receiver to reliably recover data from the signals on the transmission line. One solution to this problem is to adjust the spectrum in amplifier #1855 before decoding it into zeros and ones. This process is sometimes called equalization. The equivalent adjustment can be made at the transmit end in amplifier #1850. In that case, the challenge is to amplify the higher frequencies vis-a-vis the lower ones so that the signal spectrum will be flat when it arrives at the receive end. This is sometimes called pre-emphasis.

5.2.3 Crosstalk

Signals received by physical layer circuits will in general suffer greater amounts of crosstalk due to the increased transmit level. If the energy crossing over from the transmit line to the receive line is strong enough, the physical layer circuits will react as if they receiving a signal every time they transmit. This would cause a collision to be declared each time a transmission began, totally defeating the communication process.

The possibility of false collisions imposes a limit on the amount the transmit and minimum receive levels can be adjusted. To illustrate why this is so, consider that increasing the transmit level by 3 dB increases the crosstalk picked up by the receive part of the physical layer circuit by 3 dB. Similarly, lowering the minimum receive level by this amount decreases, by 3 dB, the level at which crosstalk energy would appear to be a genuine signal. The result is that the threat of crosstalk interference has been increased by 6 dB. In other words, if the crosstalk energy in an ordinary 10BaseT system were only 5 dB lower than the minimum necessary to create interference, then making the 3 dB adjustments, described above, would cause many false collisions.

Experiments were performed with the XL600+ product, described above, where signals were transmitted on one wire pair and received, simultaneously, on a neighboring wire pair. This product transmits at levels that are approximately the same as the standard 10BaseT transmit level, but it uses minimum receive levels that are 6 dB lower. So the crosstalk challenge of the XL600+ is 6 dB greater than the challenge faced by ordinary 10BaseT Ethernet. The experiments, however, did not show evidence of false collisions. This is evidence that 3 dB adjustments can be made to both the transmit level and the minimum receive level of ordinary 10BaseT hardware, and false collisions will not result.

Crosstalk can also create problems by reducing the signal to noise ratio at a receive port. Assume that signals are received at one physical layer circuit, and routed through to the other physical layer circuit, and transmitted out onto the associated pairs. In this situation, signals are being received at one port while they are being transmitted, with a slight delay, through other neighboring ports. If the twisted pairs connecting to these ports are all bundled together in the same cable, energy from the three transmitting pairs will cross over and be picked up by the receive port.

Experiments were performed with the XL600+ in which the transmitted signal level was left at the 10BaseT standard, yet communication succeeded over 730 feet of UTP. (The extra length was possible because the minimum acceptable receive level was reduced by 6 dB.) Thus, the SNR at the receive port was reduced, during in these experiments, by the extra attenuation suffered in transmitting over an extra 400 feet of wire. According to standard charts that indicate how energy attenuates on twisted pair wires, the extra attenuation is an average of 6 dB, approximately, over the frequency range in question.

To see how this experiment relates to an ordinary 10BaseT hub, consider the case of an ordinary hub driving signals over a wire length of 530 feet. This distance is only 200 feet greater than the 10BaseT standard, rather than 400 feet as in the forgoing experiment. The SNR level at the hub, as a result, is only 3 dB (on the average) below what it is when transmitting over wires that are 330 feet in length. If one increases the transmit level by 3 dB, then, one will experience a total SNR degradation of approximately 6 dB. This amount would, according to the foregoing experiments, still be sufficient for reliable communication. As a result, the preferred increase in signal level is 3 dB. As explained earlier, the decrease in the minimum received level should be the same.

Two additional factors reduce the effects of crosstalk. One relates to the physical proximity of UTP that may have crosstalk. The second factor relates to the effects of signal blocking, such as that used in the security hub described above.

First, in this system, the UTP cable connected to the backbone port is never bundled together with the cables connected to other ports. As a result, there is no possibility of significant crosstalk involving signals flowing into or out of the backbone port. The only possibility of crosstalk is between one local port and another.

The second factor relates to signals flowing out the station ports of the hub. In a similar approach as that used in the security hub described above, in general, a data signal only flows from a single station port at a time. In particular, if the hub receives a data packet from the backbone port, based on the MAC address, only on station port sends the packet, the other station ports send "blank" packets that allow computers attached to the other station ports to sense that the hub is busy and that if they transmitted, a collision would occur. Similarly, if the hub receives a data signal on on station port, a "blank" signal is rebroadcast on the other station ports and the data signal is retransmitted on the backbone port.

The only requirement imposed on these blank signals is that they be sufficient to indicate to the connected PC that a transmission is taking place. In particular, these blank signals are chosen to minimize the effects of crosstalk.

One technique is to eliminate, i.e. filter out, the higher frequencies of the blank signal, and to increase the energy at the lower frequencies. This reduces the crosstalk considerably, because signals are more likely to cross over at higher frequencies. Elimination of the high frequencies must still leave the blank packets with enough energy to trigger the transmission detection mechanism in the remote computer. It is easy to meet this criterion, however, because the low frequencies attenuate less, so they contribute more energy. This improves the performance of the detection mechanism in the adapter at the far end of the line.

Now consider the case of a valid signal being transmitted through a local port. The receive parts of the other local ports, in this situation, need not correctly interpret signals that were transmitted from their associated adapters at the opposite ends of the lines. Rather, they must only be able to detect the fact that the associated computer is transmitting. To this end, the signal detection circuit in the physical layer circuit is mote sensitive to lower frequencies at which less crosstalk is present.

6 Wiring Networks (FIGS. 19–28)

Figure 19:
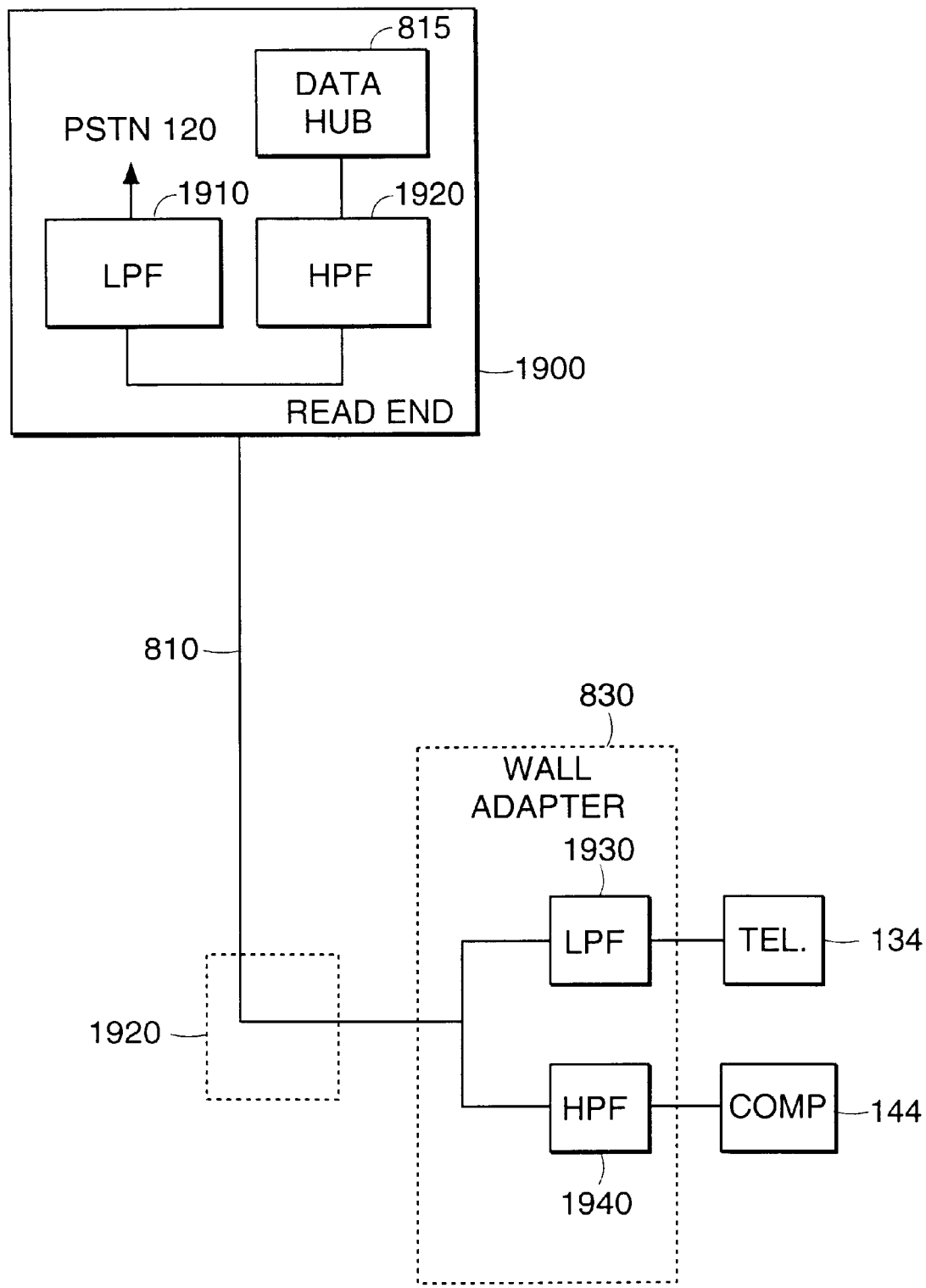
FIG. 19 shows a simple wiring network.
Figure 20:
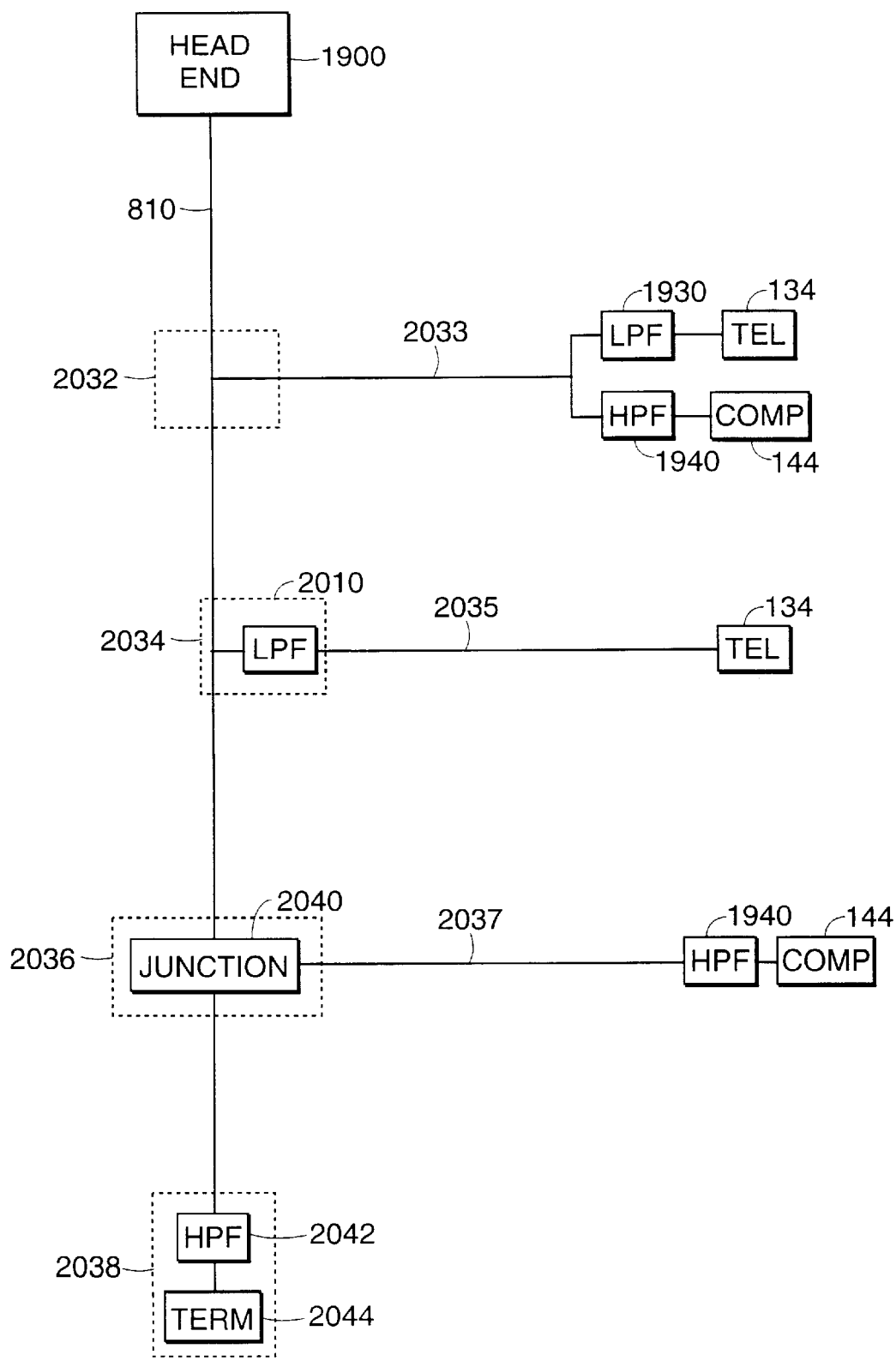
FIG. 20 shows a wiring network with splits and branches.

6.1 Splits and Termination (FIGS. 19–20)

In the previous discussion of signal transmission over UTP 810, all devices communicated by connecting to transmission lines (i.e., the UTP). The transmission line may have points at which branches are formed. We call these points "splits." A split in a transmission line introduces an impedance mismatch. As a result of the impedance mismatch, when a signal encounters a split, part of its energy reflects back to the source. This reflection can interfere with clean reception of the signals. Reflections can also occur at the end of a transmission line if the wires at the end of the line are simply left unconnected. Such an unterminated end of a transmission line can again cause reflections due to an impedance mismatch. Signal reflections occur to some extent at all frequencies. In this system, the reflections at the high frequencies of the data band or the video band are particularly important, for example, due to possible data loss or video signal degradation.

Several techniques are used to improve this high frequency transmission. These include:

Use of terminators at the ends of the main transmission line and at the end of branches which carry high frequency signals;

Use of lowpass filters to prevent high frequency transmission onto branches; and Use of junctions at splits to pass high frequencies onto branches while reducing reflections at the branch point.

Referring to FIG. 19, a telephone 134 and a computer 144 are coupled to PSTN 120 and data hub 815, respectively, over UTP 810. UTP 810 forms an unbranching transmission line from "head end" 1900 to wall adapter 830. A wall jack is located at point 1920 on the line. In this simple example, there is only a single jack on the line, and, therefore, the UTP simply passes through the jack to the wall adapter.

UTP 810 consists of either a single UTP if one of the data signaling approaches for one UTP is employed, or consists of two UTP (i.e., four wires) if two UTP signaling is employed. For example, 10BaseT signaling would use two UTP 810 while modified 10Base2 signaling would use a single UTP 810.

In wall adapter 830, a LPF 1930, which passes the telephone band, and a HPF 1940, which passes the data band, are essentially connected at a single point on the transmission line. Telephone 134 is connected to LPF 1930 and computer 144 is connected through HPF 1940. Other components of wall adapter 830, such as a media adapter that couples the HPF and the computer, are not shown.

In the discussion that follows, no video signal is transmitted on UTP 810. High-pass, rather than band-pass, filters are used to couple the computers to the transmission line. If video or other high frequency band signals were also present on the transmission line, band-pass filters would be used as in the previous discussion.

The simple wiring arrangement shown in FIG. 19 is not typical in many buildings. Referring to FIG. 20, a more typical situation involves splits and branches in UTP 810. Head end 1900 is coupled to multiple telephones 134 and computers 144. In this example, the transmission line splits at points 2032, 2034, and 2036 and terminates at a point 2038. This example shows several methods of dealing with such a branching wiring network.

One method of dealing with a split is to simply make an electrical connection. At point 2032, a simple branch 2033 in the line is formed by connecting corresponding conductors of the branch to conductors of the main line. At the end of branch 2033, a computer 144 and telephone 1034 are connected to the branch through LPF 1930 and HPF 1940, respectively, as illustrated in FIG. 19.

Since no explicit measures are taken at split point 2032, high frequency signals reaching this split point are partially reflected back toward their source. For instance, a data signal from computer 144 on branch 2033 will reach point 2032 and will both be reflected back toward the computer, as well as be sent on both the other connecting lines at point 2032. The reflected signal is attenuated and can be tolerated by computer 144. Head end 1900 receives an attenuated signal. As long as measures are take to prevent any signal directed away from head end 1900 from reflecting back to the head end, the split at 2032 does not prevent communication. A second split of this type would result in such reflections. Therefore, at most one split of this type can be used.

At point 2034, a branch 2035 is connected to the main line through a LPF 2010. High frequency reflections are eliminated by placing low pass filter (LPF) 2010 on the branch, close to the point of the split. If this technique is used at all branch points along a transmission line, then at high frequencies, the transmission line acts as if it has no branches. However, this approach prevents any adapter from communicating in the high frequency bands by connecting to the branches. A telephone 134 is shown connected to branch 2035. Signals in the telephone voice band pass between these telephones through LPF 2010 to head end 1900.

At point 2036, potential problems caused by the split are addressed by using a junction 2040 that couples branch 2037, and the two parts of the main line that converge at the split. Junction 2040 matches the impedance of the line thereby avoiding reflections of signals arriving at the split. Various types of junctions that can be used are described below. In general, passive junctions attenuate the signal by approximately 3 dB when passing through the junction. Therefore, there is a limit of how many passive junctions can be on a path joining a computer and a data hub without resulting in too much attenuation of the signal.

At point 2038, the end of the main line, a terminator (a resistor) 2044 is placed behind a HPF 2042. This terminator matches the impedance of the transmission line and prevents signals from reflecting back along the transmission line.

6.2 Junctions (FIGS. 21–23)

Various types of junctions 2040 are used at split points, such as split point 2036 in FIG. 20.

Figure 21A:
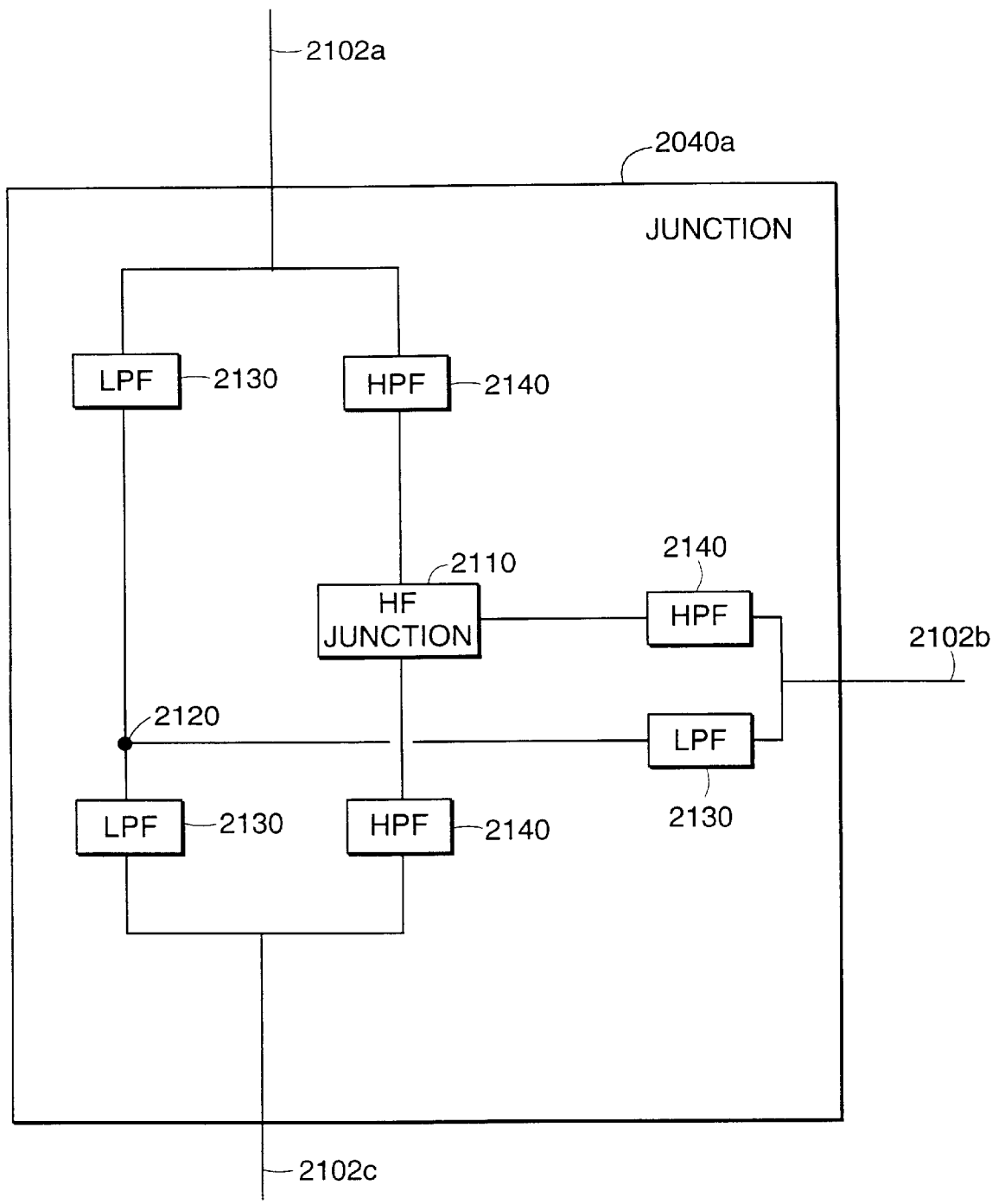
FIGS. 21a–b show a junction.

Referring to FIG. 21a, a junction 2040a couples its three input lines 2102a–c through respective LPF 2130 at a single electrical connection of corresponding conductors at point 2120. Junction 2040a also couples the input lines at a high frequency (HF) junction 2110 through high pass filters (HPF) 2140. HF junction 2110 matches the impedance of the lines and avoids reflections of signals. Various type of HF junctions can be used, as are described below.

Figure 21B:
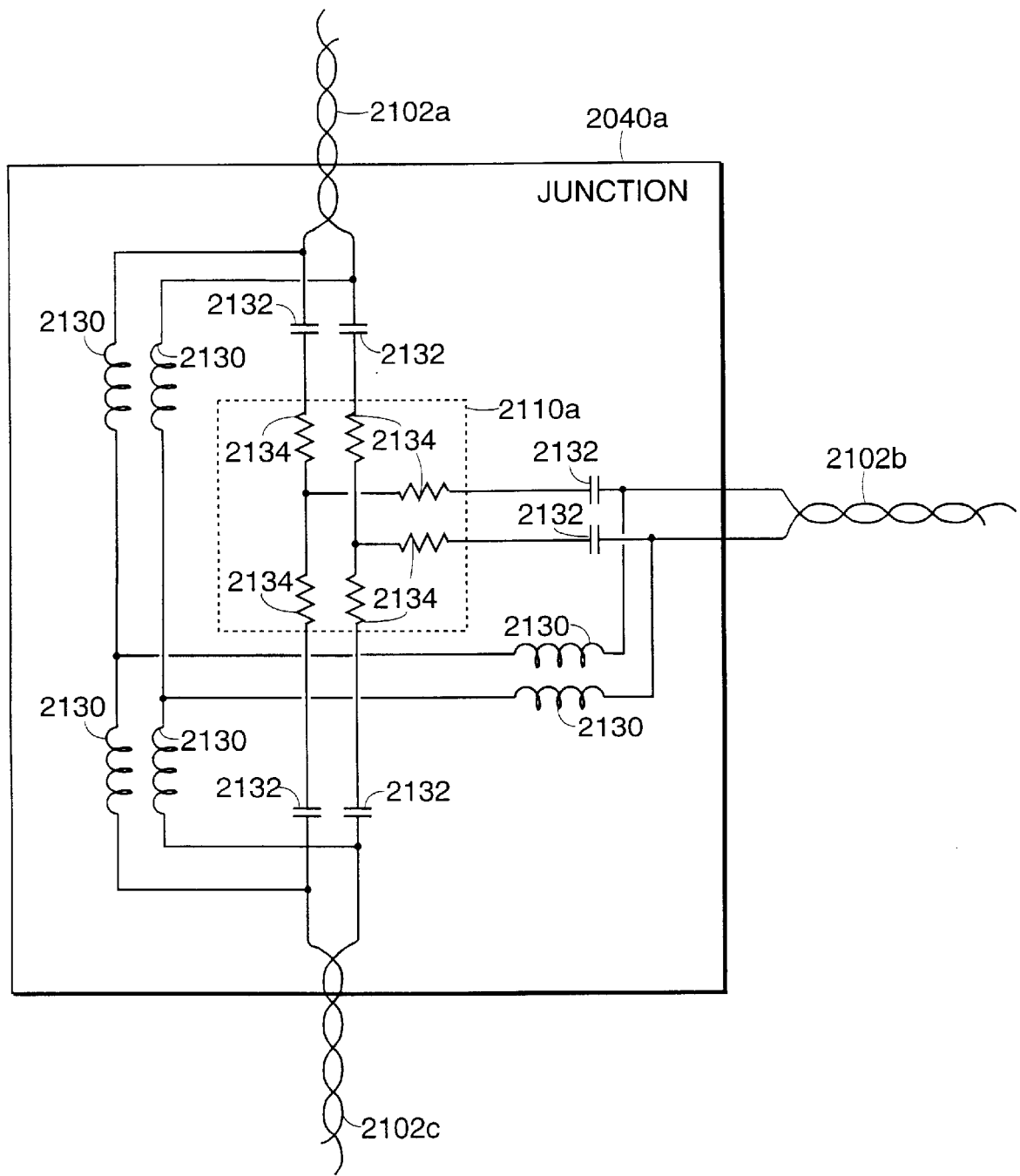

Referring to FIG. 21b, junction 2040a can be a passive circuit. Low frequency signals pass through inductors 2130, which provide low-pass filtering. High frequency signals pass through capacitors 2132, which provide high pass filtering. A value of 0.01 uF is a good choice for separating the data band from the telephone band. Resistors 2134 form the HF junction coupling the high frequency signals from the three ports. Resistors 2134 have a value of 16 ohms. The resistors work together to match the impedance of the inbound and outbound paths. High-frequency signals arriving from any one path divide cleanly and continue out on the other two paths. Each outbound signal has 6 dB less energy than the signal flowing towards the junction.

Figure 22A:
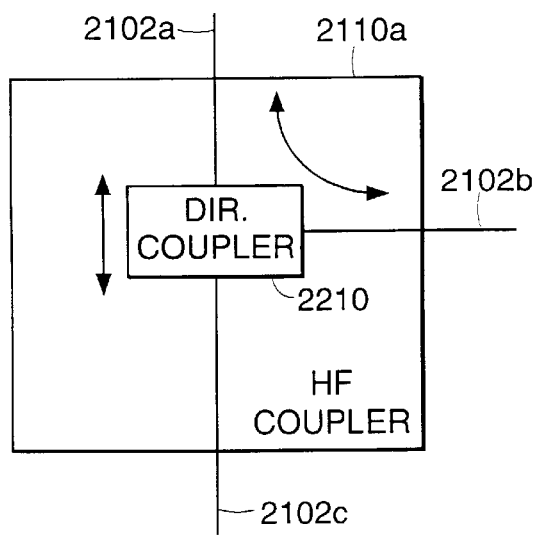
FIGS. 22a–c show passive high frequency junctions.

Referring to FIG. 22a, an alternative HF coupler 2110a uses a directional coupler 2210. In this HF coupler, high frequency signals pass between ports 2102a and 2102b and between ports 2102a and 2102c, but not between ports 2102b and 2102c. Directional coupler 2210 matches impedances of the line and attenuates signals by approximately 3 db as they pass through the coupler.

Figure 22B:
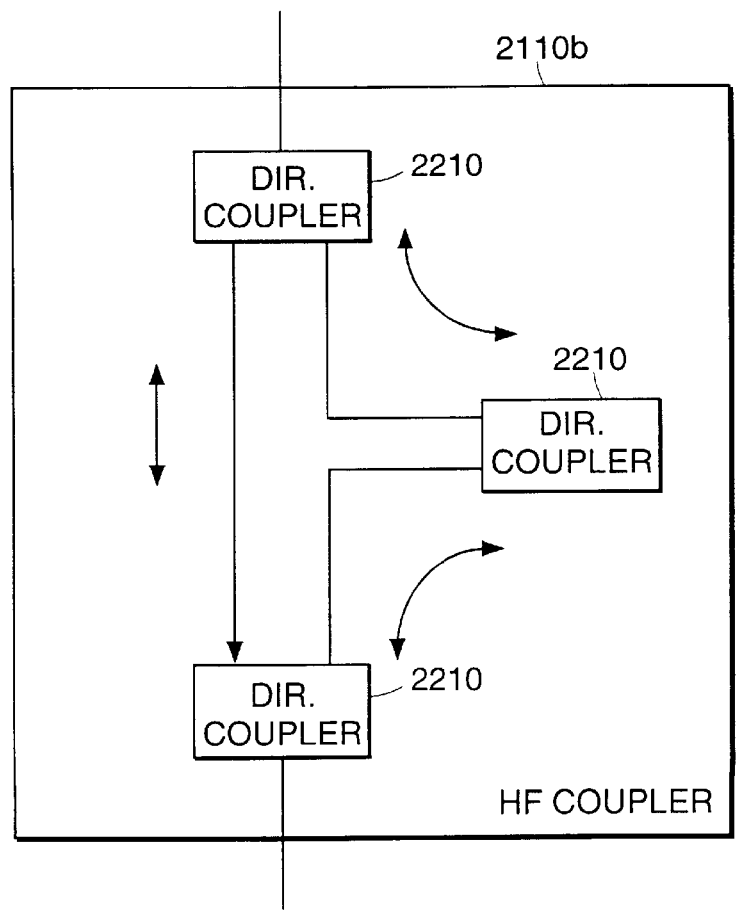

Referring to FIG. 22b, three directional couplers 2210 can be arranged in a fully connected arrangement to couple high frequency signals between each pair of ports. This arrangement matches impedances and attenuates signals by approximately 6 db as they pass through the HF coupler.

In FIGS. 21a–b and 22a–b, only a single wire pair (UTP) is shown. Since the junctions are composed of passive components, signals pass in both directions, as is needed for data signaling over one UTP. When two (or more) wire pairs are used to pass high frequency signals bi-directionally, for example when using the approaches to signaling 100 Mb/s over three UTP described above, each pair uses an equivalent junction.

When two UTP are used for 10BaseT signaling, each pair is used for unidirectional communication in the data band a different arrangement is needed for certain types of junctions.

A junction composed of a parallel arrangement of the coupler shown in FIG. 22a forms a two UTP junction in which each branch can communicate with the main line. If however, communication is desired between each of the pairs of ports, as it is in the junction shown in FIG. 22b for a single UTP system, a different arrangement of couplers is needed.

Figure 22C:
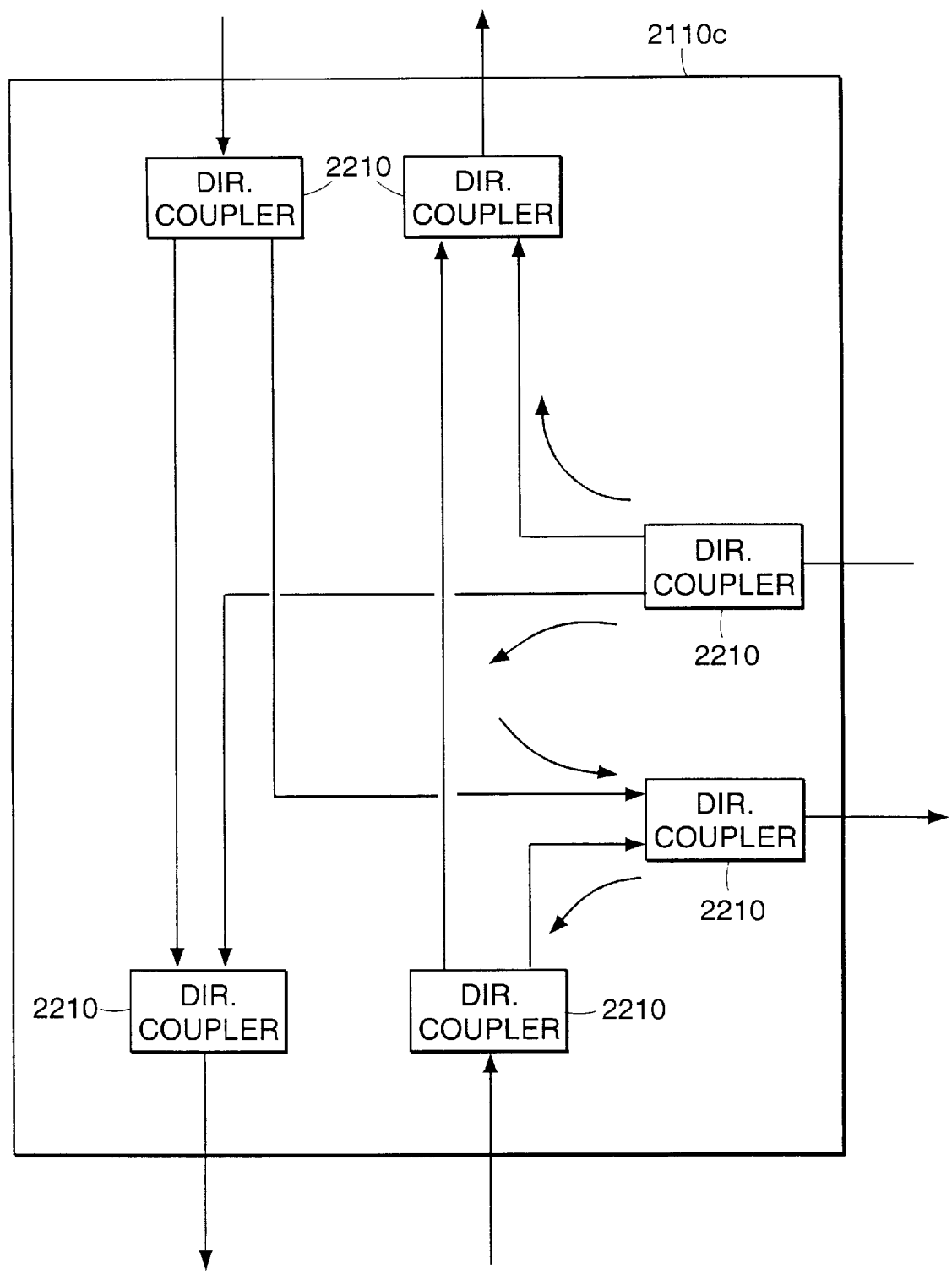

Referring to FIG. 22c, a high frequency junction 2110c has three ports each with two UTP. On each of the ports, two directional couplers 2210 split and merge signals to and from the other two ports. The couplers are arranged so that a signal received on the inbound UTP on one port is sent to the outbound UTP on each of the other two ports. In this way, HP junction 2110c effectively forms a passive 3-way hub for splitting the 10BaseT signals sent in the data band on two UTP.

Figure 23A:
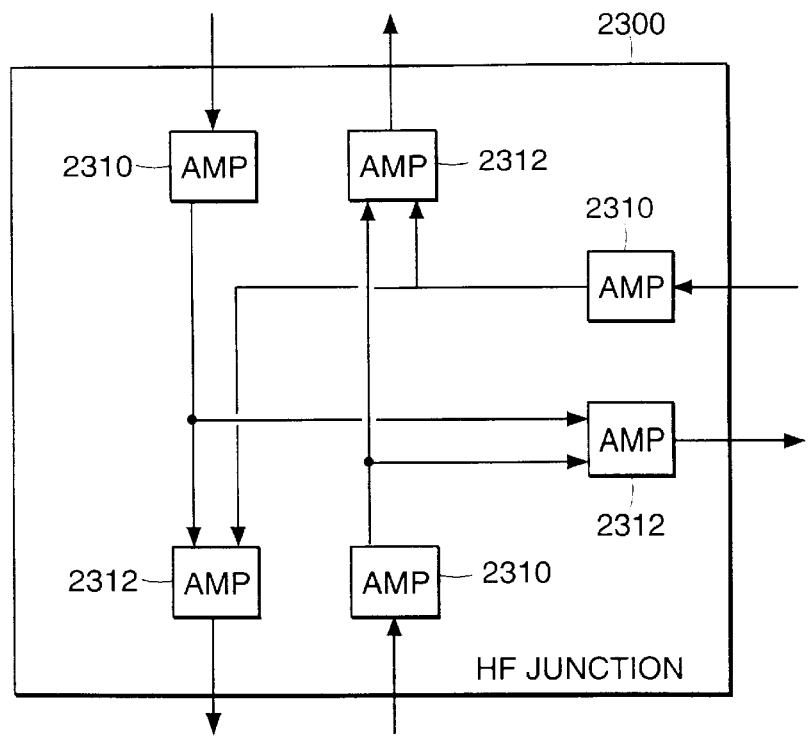
FIGS. 23a–b show active high frequency junctions.

Active junctions can also be used. Referring to FIG. 23a, an active HF junction 2300 which accepts two unidirectional lines at each port is shown. For example, this junction would be useful for a system using 10BaseT signaling in the data band. Amplifiers 2310, 2312 are arranged to amplify the high frequency signals. These amplifiers have input and output impedances that match the transmission line, thereby avoiding reflections. The inputs and outputs of the amplifiers is arranged so that a signal on an inbound UTP on one of the three ports is amplified and transmitted on the outbound UTP on each of the other two ports.

Figure 23B:
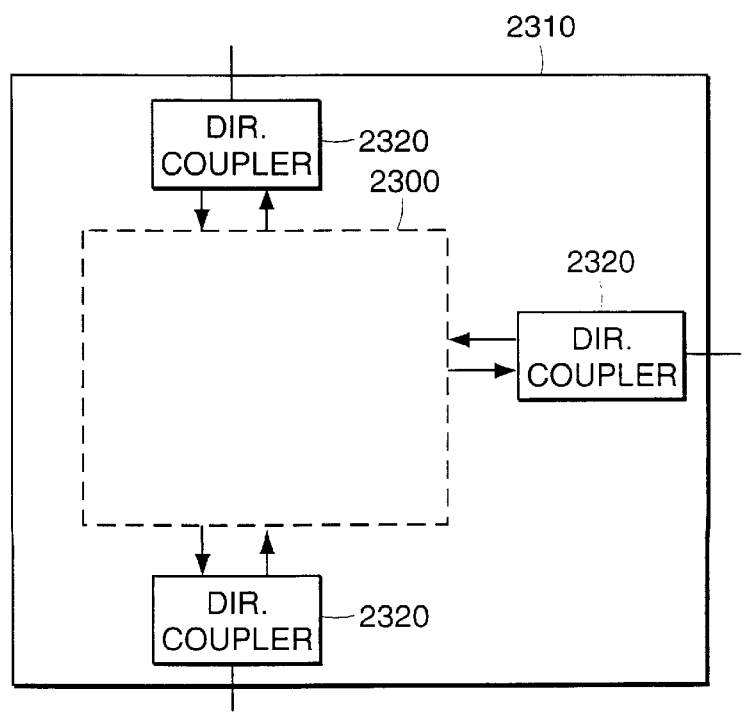

Referring to FIG. 23b, when a single bi-directional transmission line is used, directional couplers 2320 are used to separate and then combine the two directions and active HF junction 2300 is used to amplify the signals. This arrangement is useful, for example, when using one of the modified 10Base2 signaling approaches on a single UTP that are described above.

6.3 Connectors

According to the invention, the devices and signal paths can be easily introduced into an existing wiring system in a building using particular types of connectors and wiring arrangements. These include a method of attaching the voice, data and video hub, as well as various types of wall jacks that house signal junctions.

6.3.1 Connecting Voice, Data and Video Hub 800 (FIG. 24)

Referring back to FIG. 8, in this version of the system, voice, data and video hub 800 is housed in single chassis and has five industry-standard RJ-21 connectors. Each RJ-21 provides up to 25 UTP connections. One RJ-21 connector is used to connect UTP cable 121, which consists of 24 UTP, to the chassis. Two of the connectors are used to connect 24 transmit and 24 receive UTP cables 802 and 804 from data hub 815. The fifth connector connects 24 UTP cables 806 to video source 820. One connector provides a connection to wiring block 805 coupling hub 800 to 24 UTP cables 810 of UTP network 250.

In some applications, one cannot find a point where the UTP 121 from PSTN 120 converge into a 25-pair RJ-21 connector that can be connected to voice, data and video hub 800.

While 25-pin connectors are not always present, one can nearly always find a point where UTP 121 are punched down onto wiring blocks. It might be easier, in these situations, to add the voice together the other signals right at these blocks.

FIGS. 24a–d illustrates one technique of doing this. Connecting block 2410 is designed according to a very popular style called "66," as embodied by part no. 343569, of the Siemens Corporation of Westbury Conn. The model shown in FIG. 24b consists of one column with 50 rows. There are two connection opportunities on each row, and they are metalicly connected.

A twisted pair connected to PSTN 120 punches down on the first connection opportunity on the first two rows. The two punch down opportunities to the right are used by a twisted pair that leads to a subscriber, thereby providing telephone service. Because the telephone signals are provided in this manner, the port on hub 800 to which UTP cables 121 normally connects is left open.

A special adapter connects on top of the punch-down opportunity on the right of each row. This provides a third connection opportunity for that row. (Use of such adapters has been a common practice in the telephone industry for some time.) Each wire pair 2412 leading from hub 800 connects to the third punch down opportunity, thereby adding the data, video, and control signals to the conductive path.

Figure 24A:
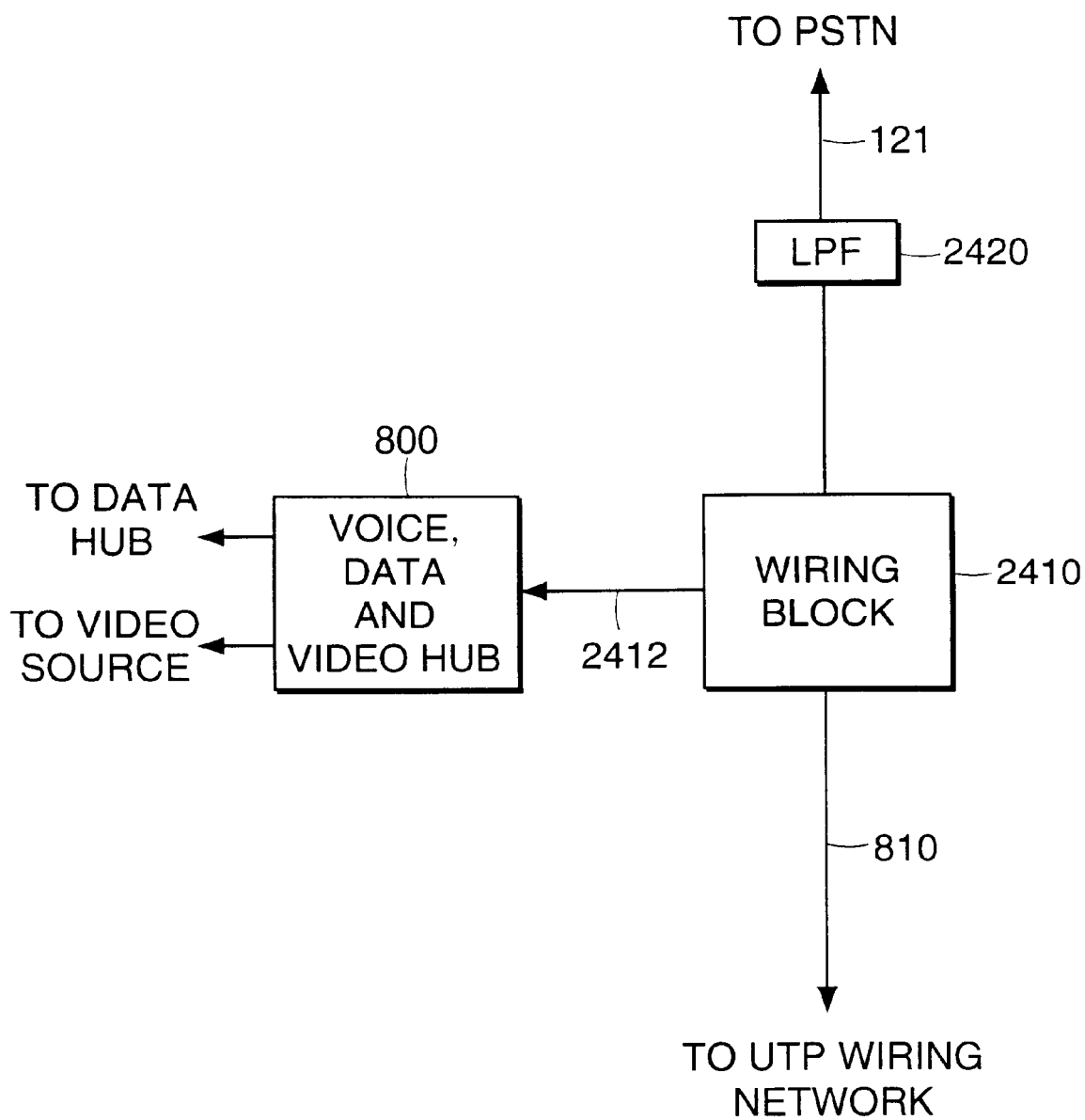
FIGS. 24a–d show an alternative approach to connecting a voice, data and video hub to a wiring network.
Figure 24B:
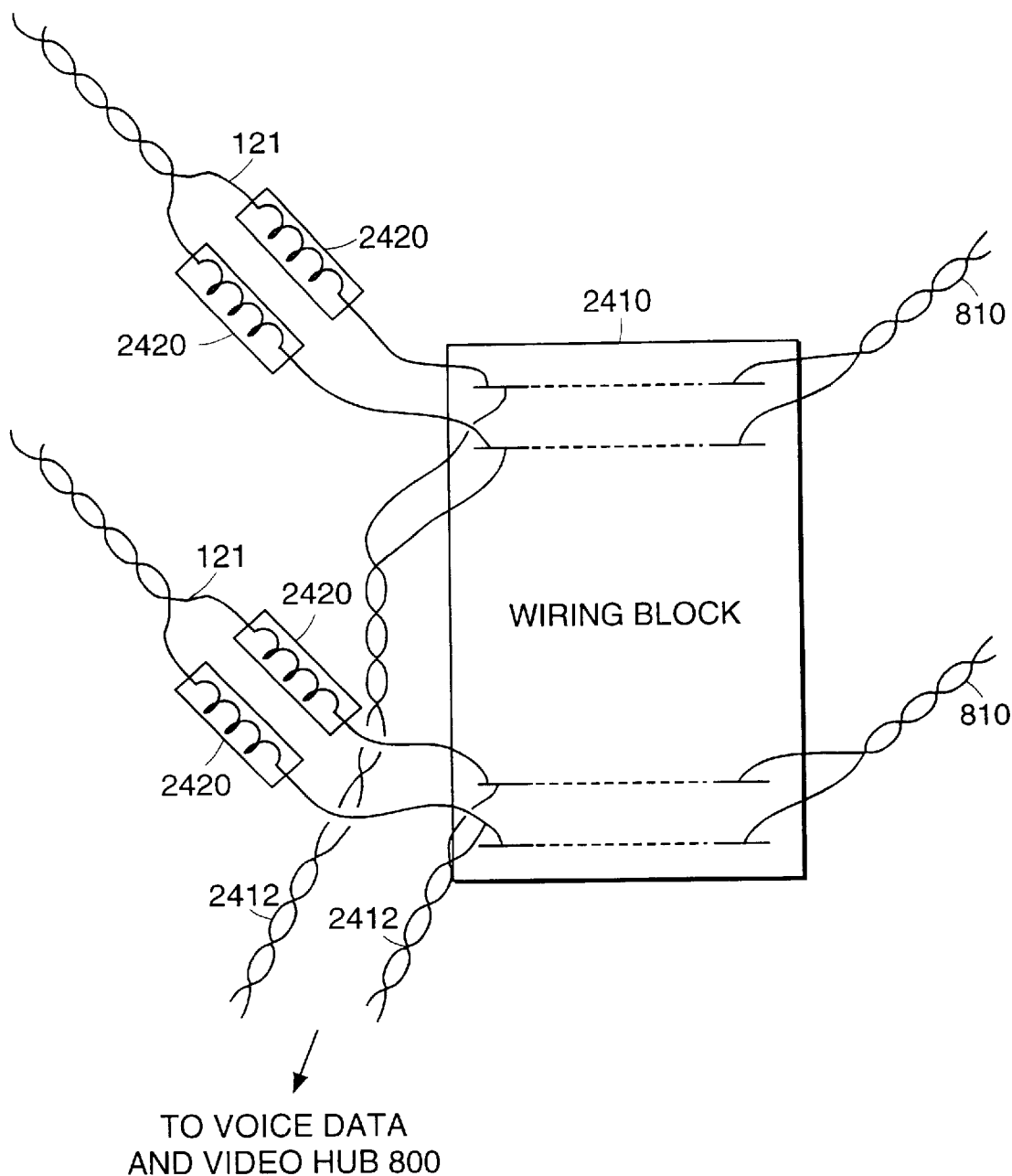

Referring to FIG. 24a, LPF 2420 prevents high frequency signals from flowing to PSTN 120. Referring to FIG. 24b, LPF 2420 consists of individual filters applied to each wire of UTP 121.

Figure 24C:
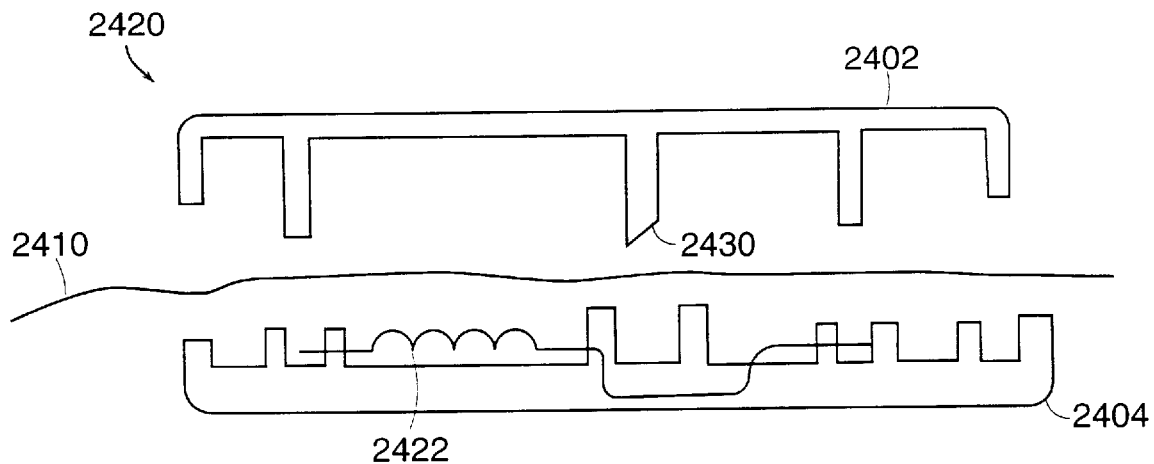
Figure 24D:
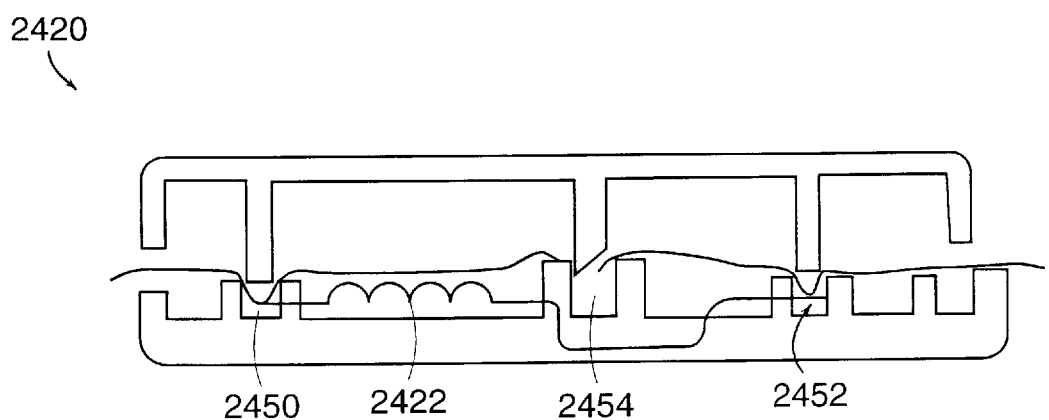

Referring to FIGS. 24c–d, each filter 2420 can consists of a 100 uH inductor 2422 enclosed in a very small plastic enclosure that has a slot through the middle through which one can lay a 22 or 24 gauge copper wire 2410. The enclosure includes contacts 2450 and 2452, and is designed according to the same principles as the ScotchLock twisted pair connectors manufactured by the 3M company of Minnesota. After inserting the conductor, the two halves of the enclosure are snapped together. This creates connections between the conductor and contacts 2450 and 2452, and effectively inserts the inductor in series with the wire.

It remains to eliminate the short circuit around the inductor created by the connection of the wire to contacts 2450 and 2452. This is accomplished by knife-edge 2430. Because of the way it is positioned, edge 2430 severs the conductor at a point in between the two contact points, eliminating the short circuit.

6.3.2 Wall Jacks

Various types of wall jacks provide connection points for wall adapters and provide points at which wiring networks split. Typically, a telephone wiring network splits at the wall jacks and therefore these points are accessible to introduce particular types of junctions to improve communication.

Figure 25A:
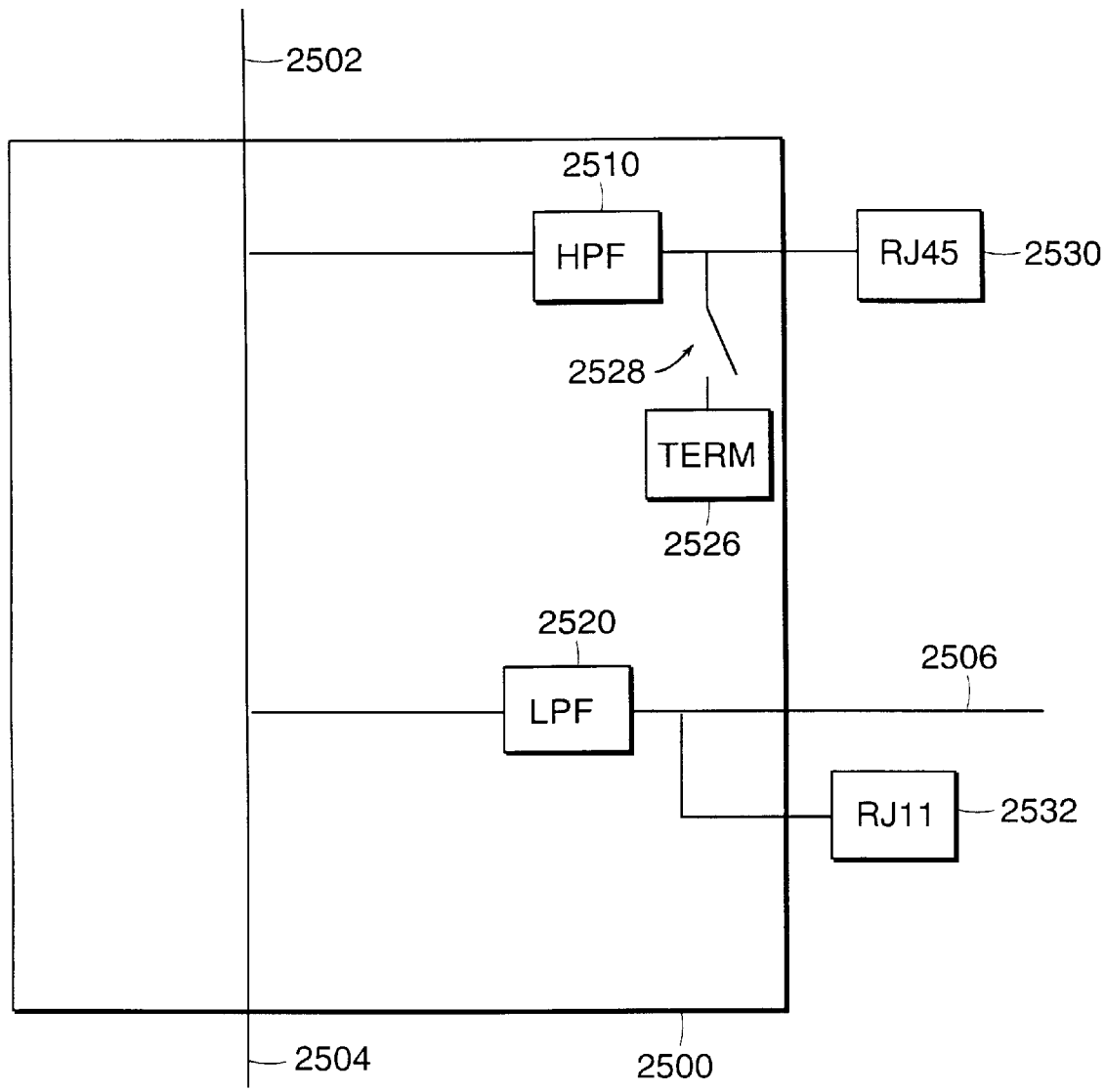
FIGS. 25a–b show a wall jack.

Referring to FIG. 25a, a schematic view of a wall jack 2500 shows an RJ-11 jack 2532 for connecting one or two telephones and an RJ-45 jack 2530 for connecting a wall adapter (or a computer directly if no wall adapter is needed). Jack 2500 has a connection to two UTP 2502 (four wires) which lead to the head end of the system. It also has a connection to two UTP 2504 which extend the main line. All signals received from UTP 2502 are passed through to UTP 2504.

Jack 2500 has a third connection to four UTP 2506 for attaching a branch behind a low pass filter 2520. This branch does not receive high frequency signals from the main line but can be used to attach telephones to the system. An RJ-11 jack 2532 is connected in parallel to UTP 2506 for direct attachment of one or two telephones.

Jack 2500 has an RJ-45 jack 2530 connected to the main line through a high pass filter 2510. A computer attaches to RJ-45 jack 2530 for data communication.

If jack 2500 is at the end of the transmission line, a terminator 2526 can be attached to the line using a manual switch 2528 in the jack.

Figure 25B:
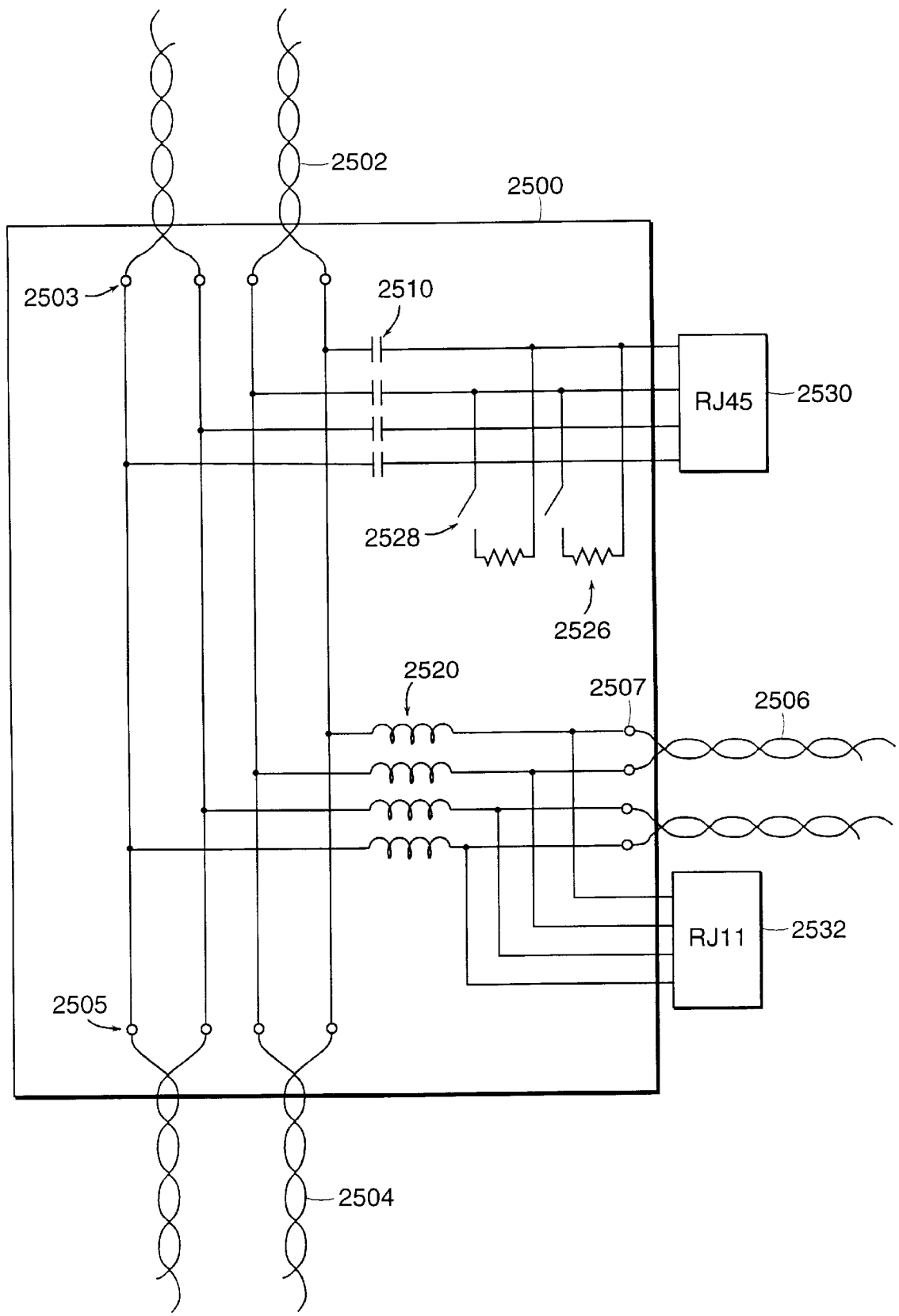

Referring to FIG. 25b, a wiring diagram of jack 2500 shows three attachment points 2503, 2505, 2507 for attaching UTP 2502, 2504, and 2506 respectively. Note that in FIG. 25b, each line represents a single wire while in FIG. 25a, each line represents a pair of wires. HPF 2510 is composed of four capacitors and LPF 2520 is composed of four inductors.

Figure 26A:
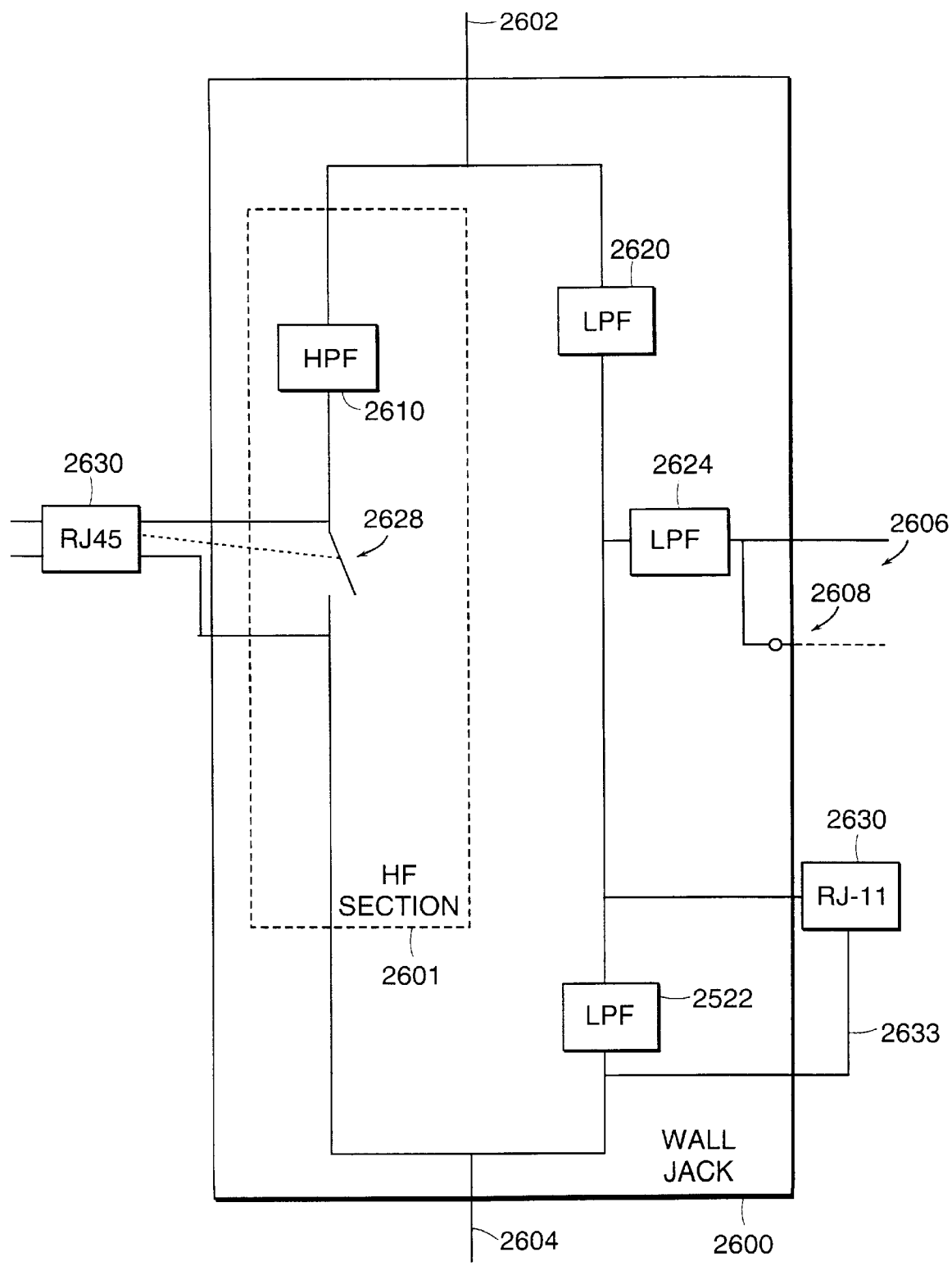
FIGS. 26a–c show an alternative wall jack.
Figure 26B:
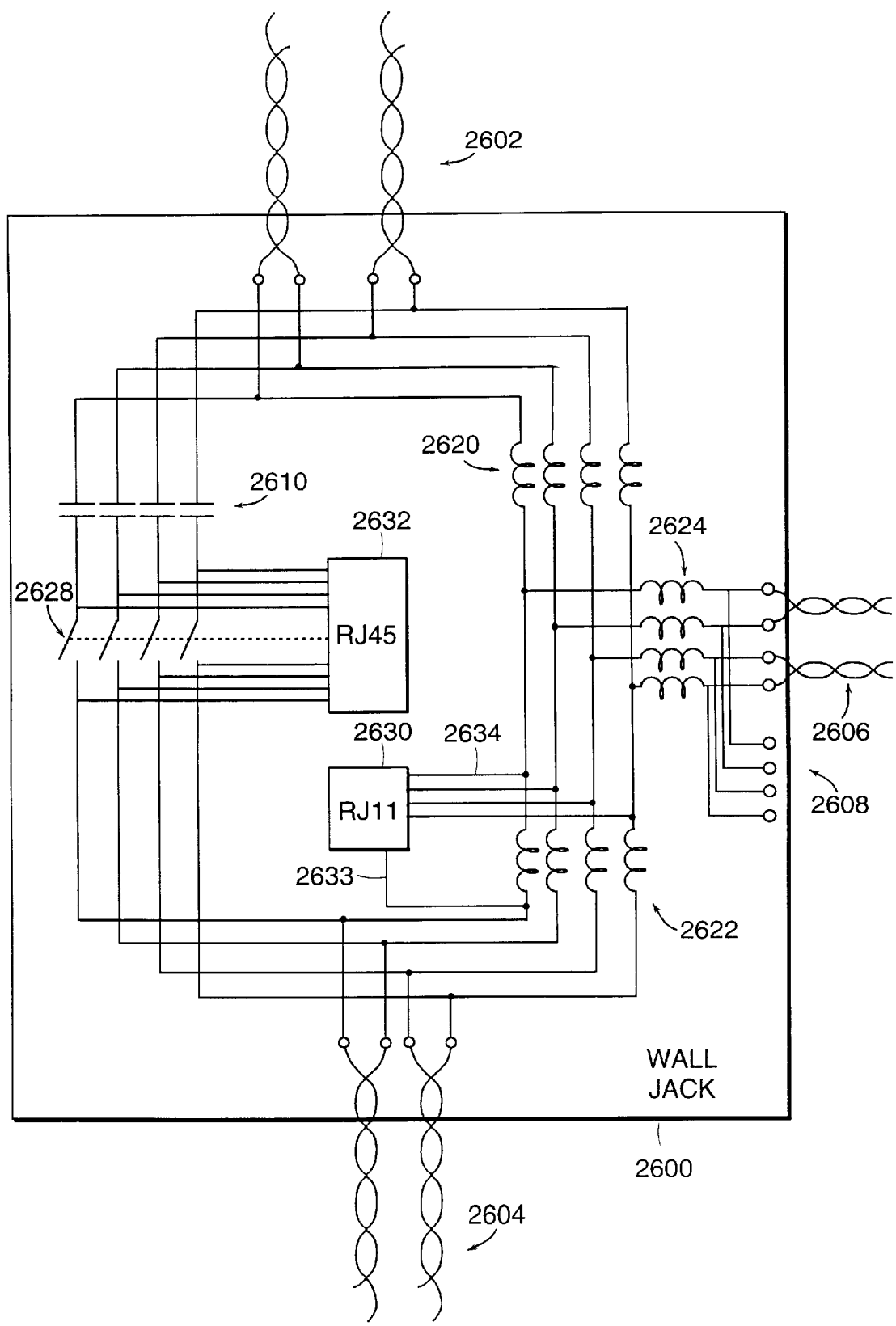

A second jack is shown in FIGS. 26a–b. Note that each line in FIG. 26a represents two UTP, that is, four wires, while in FIG. 26b, each line represents a single wire. Two UTP 2602 provide a connection to the head end, two UTP 2604 continue the main line, and two UTP 2606 are a branch.

Referring to FIG. 26a, the low frequency path flows from UTP 2602 through LPF 2620 and 2522 to UTP 2604, the continuation of the main line. Another low frequency path flows through LFP 2620 and through LPF 2624 to UTP 2606, the branch line. RJ-11 jack 2630 is also connected on a low frequency path for connecting a telephone to the wall jack.

If nothing is plugged into the RJ-45 jack 630, switch 2628 is closed and the high frequency path flows from UTP 2602 through HPF 2610, switch 2628, HPF 2612, and then to UTP 2604.

RJ-45 jack 2630 includes two sets of connections, on set connected to each side of switch 2628. If a device is plugged into RJ-45 jack 2630, switch 2628 is open and a device plugged into the RJ-45 jack has to possibility of bridging the switch.

When a device is connected to the RJ-45 jack, the high frequency path passes through HPF 2610 and then through one of the set of the connections in RJ-45 jack 2630. A computer can be connected in this way to RJ-45 jack 2630.

There is also a high frequency path for the other set of connections in RJ-45 jack 2630 to UTP 2604. Therefore, a device plugged into RJ-45 jack 2630 can "bridge" the high frequency path that is broken by switch 2628.

In addition, a fourth connection 2608 to jack 2600 is provided. This connection can be used to provide a high frequency signal to branch UTP 2606. Use of these two features is described below.

Referring to FIG. 26b, an implementation of wall jack 2600 using single pole lowpass and highpass filters each consisting of a single capacitor or inductor on each wire is shown.

Another feature of the jack involve RJ-11 jack 2630. Only four of the available six connectors are used for telephone lines. An additional connection 2633 is made to the RJ-11 connector. This connection and connection 2634 that is used for telephone connections provide connections to the two sides of one of the inductors of LPF 2622. Since DC current is in general flowing from PSTN 120 through UTP 2602 and the low frequency path leading through the inductor, the voltage between connections 2634 and 2633 can be used to determine whether the jack is properly installed, or if ports 2602 and 2604 are reversed.

Figure 26C:
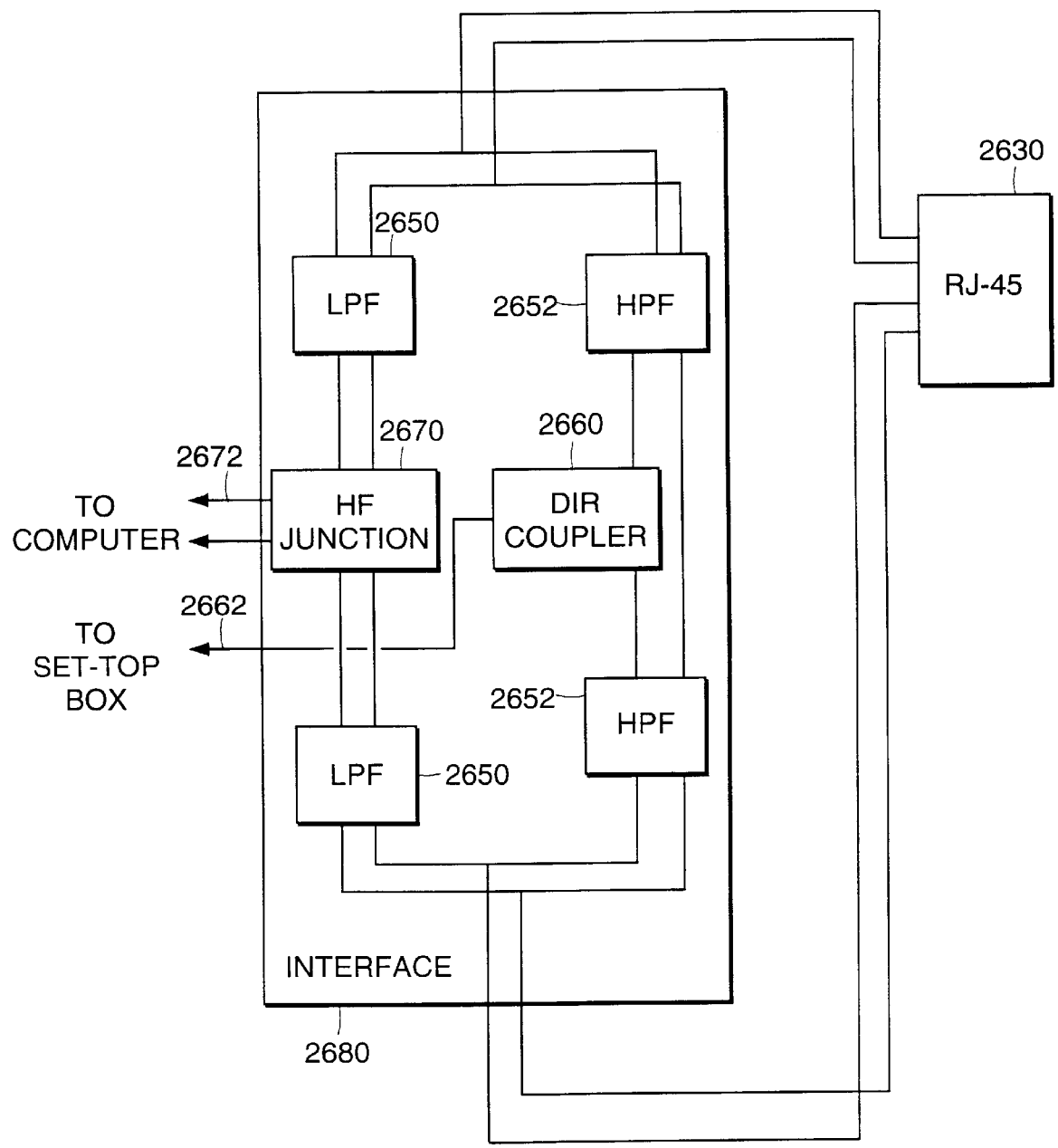

Referring to FIG. 26c, an interface #2680 can be plugged into RH-45 jack #2630 in order to provide a connection to a computer and a set-top box. In interface #2630, a LPF 2650 passes the data band and blocks the video band. In the preferred allocation of frequencies, the transition band of this filter is from 13 MHz to 15 MHz. A HPF 2652 passes the video band. Data signals flow to HF junction #2670, such as a passive 10BaseT hub, which provides a connection #2672 to a computer. The data signal also passes through HF junction #2670 an LFP #2650 back through RJ-45 jack. Separate video signal can pass through HPF 2652 on each of the wire pairs. One signal is split in directional coupler 2660 and provided to a set-top box over UTP 2662. In this way, video and control signals can be handled separately from data signals by splitting the high frequency band into separate signals.

Figure 27:
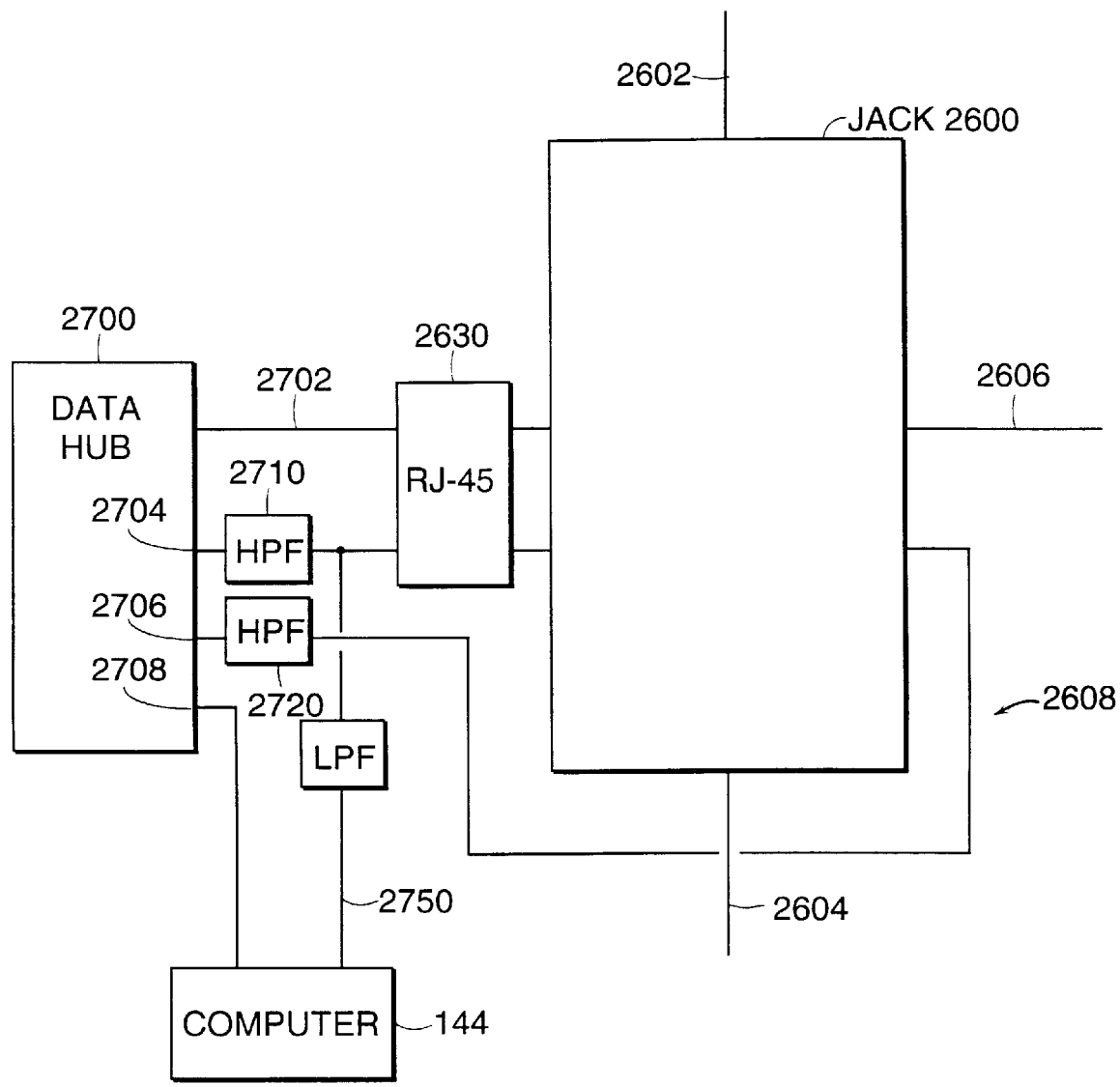
FIG. 27 shows a data hub attached to a wall jack.

Referring to FIG. 27, an example of the use of jack 2600 shown in FIGS. 26a–b uses RJ-45 jack 2630 to attach an active four-port 10BaseT hub 2700. Hub 2700 is connected through its port 2702 through RJ-45 jack 2630 to UTP 2602. Hub 2700 is connected through a second port 2704 to UTP 2604 and provides communication services to the continuation of the main line. Note that a HPF 2710 is included in the connection between hub 2700 and RJ-45 jack 2630 in order to block telephone band signals from interfering with the hub. Through its connections through RJ-45 jack 2630, hub 2700 acts as an active repeater of the 10BaseT signal passing through jack 2600.

A computer 144 can then also be connected to hub 2700 to communicate with computers attached to either UTP 2602 or UTP 2604.

An additional port 2706 of hub 2700 can optionally be used to provide data communication service to branch 2606. In particular, port 2706 is connected at point 2608 of the jack. HPF 2720 blocks telephone band signals coming from branch 2606.

Finally, referring still to FIG. 27, computer 144 can optionally provide a gateway service between data signals coupled through data hub 2700 and telephone devices coupled to UTP 2602, 2604 and 2606. An example of such a gateway service is an "Internet phone" service in which telephone calls can be routed through data network 122 rather than PSTN 120. Computer 144 has a telephone connection 2750 to RJ-45 jack 2630 such that a telephone band signal path goes through the RJ-45 jack to UTP 2602, 2604, and 2606.

6.3.3 Intermediate Wiring Nodes

Referring back to FIG. 5, in certain buildings, wiring to each unit passes through an intermediate distribution interface 520, also known as an intermediate distribution frame (IDF). These intermediate distribution interfaces provide a point at which high frequency signals can be coupled to particular units. For example, a data hub can be located at each of the intermediate interfaces. One reason to locate the hub at this location is to reduce the distance between the hub and computers.

Figure 28:
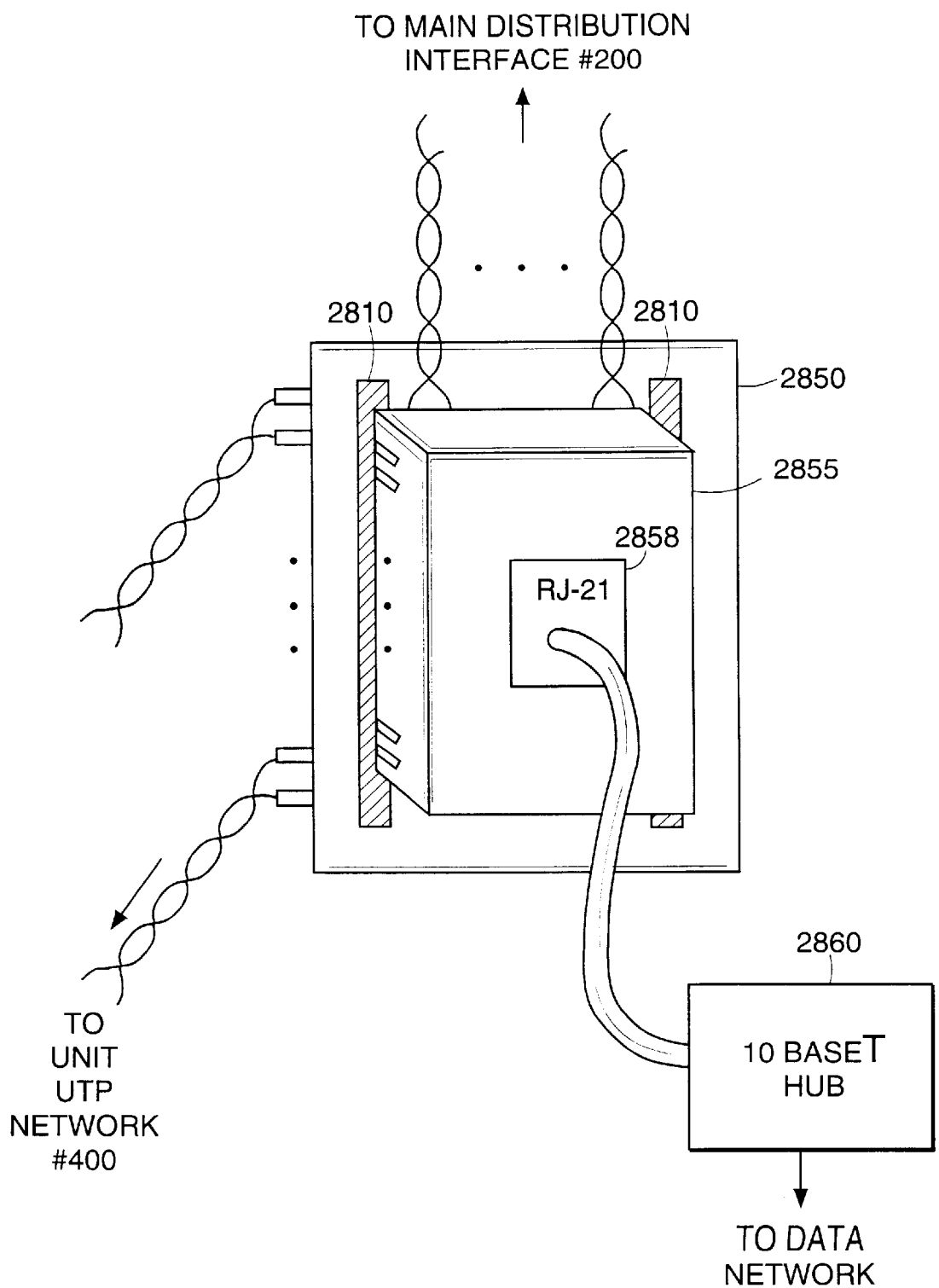
FIG. 28 shows an a data hub in an intermediate distribution interface.

FIG. 28 shows a system of electronics and connectors located at an intermediate distribution interface. Video signals applied at the main distribution interface 200 flow upwards to the IDF 520. As described above, video signals transmit over the single UTP, each of which provides one line of telephone service to the subscriber at the end of the wire. Control signals flow in the opposite direction. In the IDF, 10BaseT signals are added to the wire pairs, in harmony with the video signals. Special connectors are provided to facilitate the connection process, thereby reducing cost.

Key to the IDF is connecting block 2850 and cover 2855. Connecting block 2850 consists of four columns of A110@ twisted pair connectors. Each column consists of 50 rows. Because a twisted pair requires two connectors, a total of 25 twisted pairs can connect to each column.

A slot 2810 in between the first and second columns of contacts, and in between the third and fourth columns of contacts. There are 50 contacts on each edge of this slot. Each contact on the left of the slot is electrically connected to the 110 connector to its left. The same holds true for the contacts on the right of the slot.

Normally, opposing contacts on the right and left of the slot remain pressed together, establishing a conductive connection between the connectors to the right and left. The purpose of the slot, however, is to allow insertion of a printed circuit board. Such a board can be designed to insert, with a certain level of pressure, into the slot, thereby breaking the connection between the contacts. The board can also have electrical contacts aligned so that they match up, exactly, with the 50 contacts on the right and left sides of each slot, thereby establishing an electrical connection. When such a PC board is inserted, signals can now flow from the first column of connectors to the second column of connectors under complete control of the electronics on the board. An example of block 150 is part ST-9877 from the Siemens Corporation, of Westbury, Conn., USA.

Cover 2855 is made of PC board material shaped like a rectangular box with one of the faces removed. Four edges are created, as a result. Two of these edges are the exact same size as the slots in connecting block 110, and can insert as described above. Metallic contacts on these edges, moreover, are arranged, as described above, to coordinate with the contacts on the right and left of the slot. These contacts put the electronics, mounted on cover 2855, in metallic contact with all of the 200 connectors on block 2850. As a result, one can mount electronics and electrical paths on cover 2855 so as to implement many different varieties of signal processing and switching.

Another set of wire pairs also converges at block 2850. There are the wire pairs leading from 10BaseT hub 2860 to an RJ-21 connector 2858 on cover 2855.

One port on hub 2860 is dedicated to each of the 12 subscribers connected to block 2850. Conductive pathways on cover 2855 complete the route between hub 2860 and the contacts on block 2850 where the other wire pairs dedicated to the same subscriber are connected. Cover 2855 includes electronics needed to couple data signals from hub 2860 onto the wire pairs leading to each of the units.

7 Exemplary Embodiment

An exemplary embodiment of the system provides signal distribution in a multiple floor building with a wiring arrangement shown in FIG. 5. The main information interface 200 might be located in the building and an intermediate distribution interface 520 located on each floor serving unit UTP networks 400 on that floor.

In this example the distance between the main information interface 200 and at least some of the intermediate distribution interfaces 520 may be greater than 330 feet, the range of standard 10BaseT signaling.

7.1.1 Signal Distribution

Figure 29A:
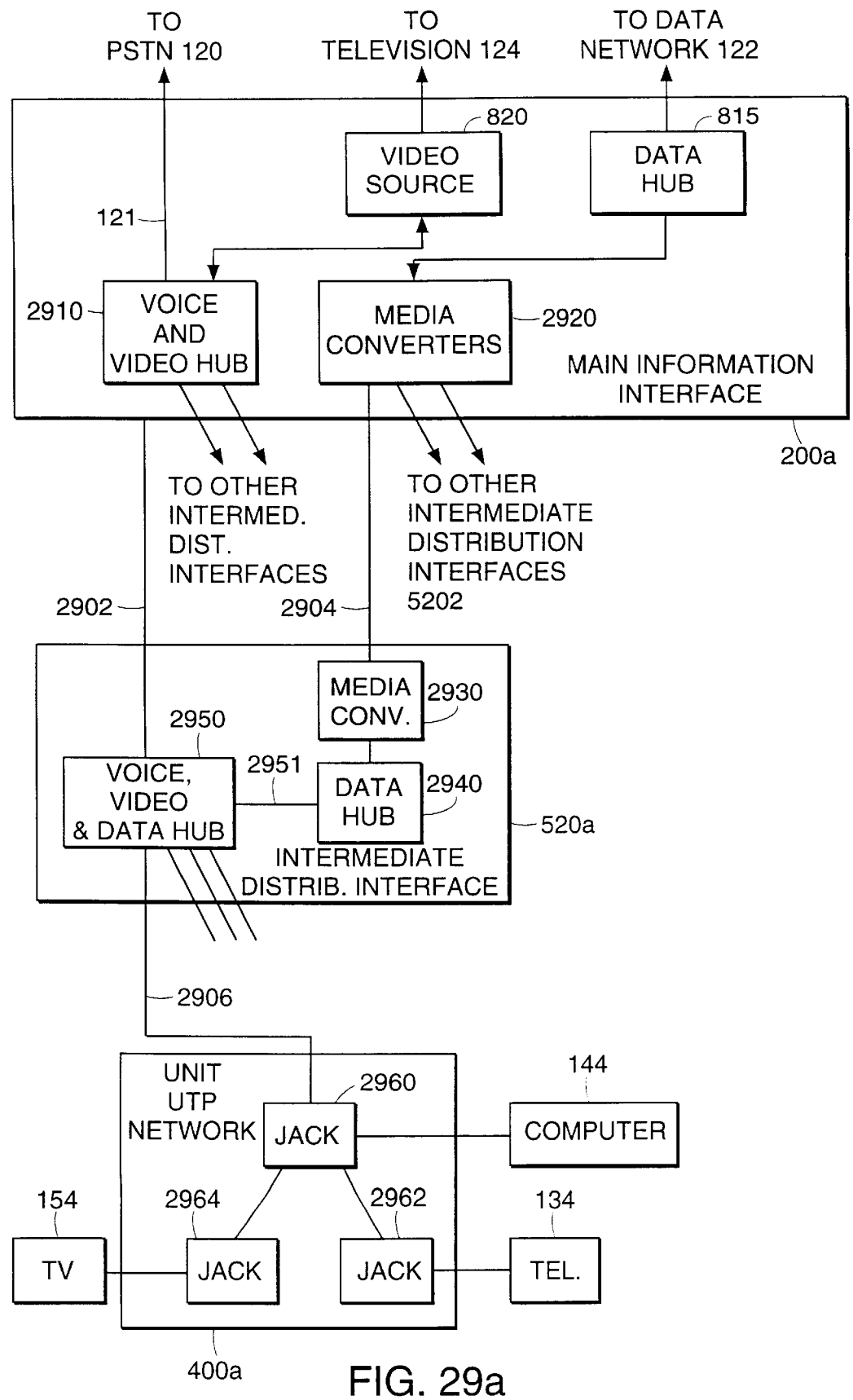
FIGS. 29a–b illustrate an embodiment which includes data hubs at intermediate distribution interfaces.

Referring to FIG. 29a, in this embodiment, each unit UTP network 400a is wired with two UTP, one of which provides telephone service to the unit. The unit UTP network 400a has a branching structure. Junctions and terminators are incorporated in the jacks to reduce reflections.

Multiple unit UTP networks 400a, such as those on a single floor of the building, are served by an intermediate distribution interface 520a. Intermediate distribution interface 520a includes a voice, video, and data hub 2950 which provides multiplexed signals on two UTP 2906 to each unit.

For each unit, voice, video, and data hub 2950 is connected to one UTP 2902 carrying telephone and video signals to the unit. Due to the distance between the main information interface 200a and the intermediate distribution interface 520, data signals are distributed to each intermediate distribution interface separately.

In the intermediate distribution interface 520, a 10BaseT hub 2940 is coupled to voice video and data hub 2950 providing data signals that are carried over UTP 2906 to the unit. 10BaseT hub 2940 is a security hub as shown in FIG. 17. Therefore, a computer in one unit cannot intercept data passing between a computer in another unit and the data network.

Main information interface 200a includes a video source 820 coupled to television distribution system 124 and a 10BaseT data hub 815 coupled to data network 122. One UTP 121 provides telephone service for each unit. Voice and video hub 2910 couples each UTP 2902 to video source 820.

Data hub 815 is coupled through media converters 2920 to corresponding media converters 2930 in the intermediate distribution interfaces 520a. The media converters convert each 10BaseT UTP pair to a bi-directional signal carried over a single UTP 2904 to each intermediate distribution interface 520a. In this instance, the media converters have the structure shown in FIG. 12 in which transmit tone signals are used for collision detection.

Figure 29B:
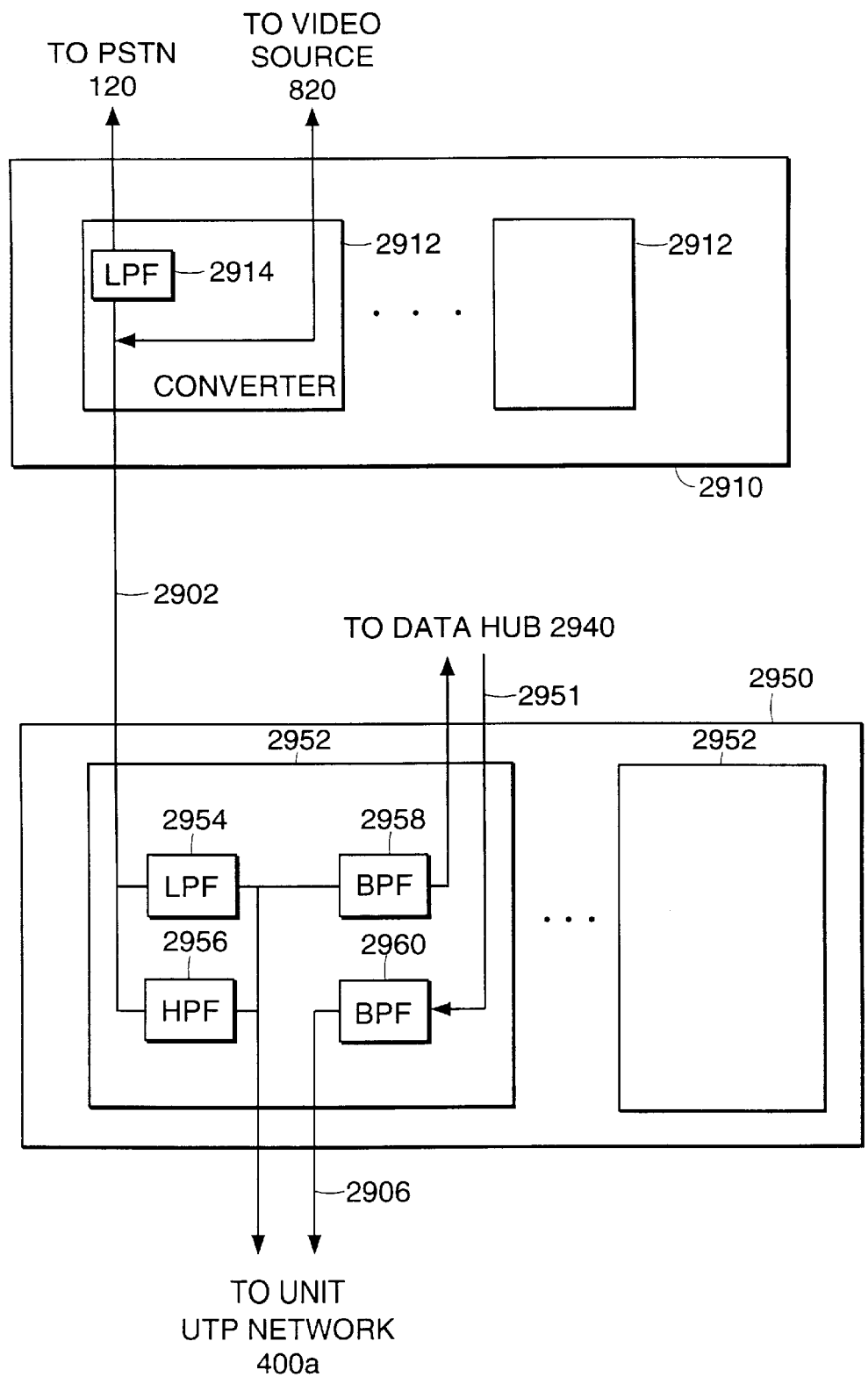

Referring to FIG. 29b, voice and video hub 2910 includes one converter 2912 for each unit. Each converter 2912 includes a LPF 2914 that passes only the telephone band. Each converter 2912 also provides a connection to video source 2912.

Voice video and data hub 2950 includes one converter 2952 for each unit. A UTP 2902 coupled converter 2952 to a corresponding converter 2912 in voice and video hub 2910. This UTP is coupled to one of the two UTP 2906 through a LPF 2954 which passes DC and the telephone band, and a HPF 2956 which passes the video band. This UTP 2906 is also coupled to one of the two UTP 2951 which couple converter 2952 to the corresponding port or data hub 2940. The other UTP 2951 from data hub 2951 is coupled to the other of the two UTP 2906.

The unit UTP network 400a includes a transmission path that consists of two UTP. One UTP carries telephone and data signals, as well as one direction of 10BaseT data signals, which the other UTP carries the other direction of the 10BaseT signal. The transmission path forms a branch at jack 2960. Therefore, jack 2960 includes a high-frequency junction made up of two parallel directional couplers that couples high frequency data and video signals on the two branches leading to jacks 2964 and 2962. Jacks 2964 and 2962 include terminators to reduce reflections of high frequency signals.

A standard 10BaseT adapter in computer 144 is connected to jack 2960 by two UTP providing a connection to UTP 2906 through a two bandpass filters that pass only the data band. Telephone 134 is coupled to one of UTP 2906 through a lowpass filter that passes the telephone band. Television 154 is coupled through jack 2964 to one of the UTP through bandpass and highpass filters that pass the control band and the video band respectively.

In operation, data communication from computer 144 passes through UTP 2906, data hub 2940 and data hub 815 to read data network 122. Data hub 2940 provides security by not transmitting data send by computer 144 to the other units, and by not sending data arriving from data network 122 addressed to computer 144 to the other units.

Television 154 (and a corresponding remote control) communicate with video source 820 through video, voice and data hub 2950 and voice and video hub 2910.

Telephone 134 communicates with PSTN 120 through video, voice and data hub 2950 and voice and video hub 2910.

7.1.2 Video Selector

Figure 30A:
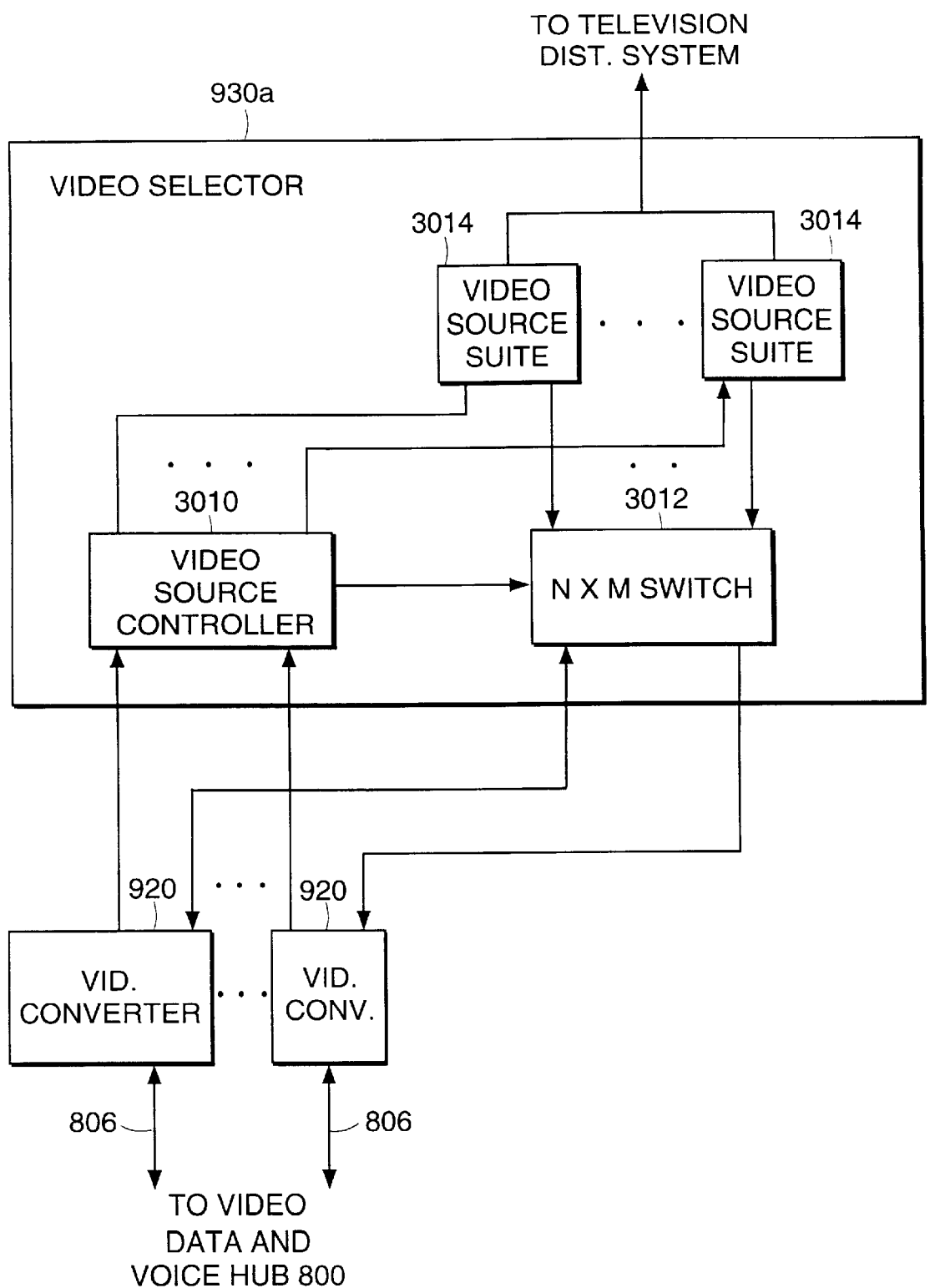
FIGS. 30a–c illustrate an embodiment of a video selector which includes a WebTV interface.

Referring to FIG. 30a, in the exemplary embodiment, video source 820 includes a video selector 930. Video selector 930a includes s set of video source suites 3014 which generate video signals that may be sent to the units, and a switch 3012 which connects appropriate source suites to video converters 920 for transmission of video signals to the units. This arrangement allows there to be fewer video source suites than units served by this video selector.

A video source controller 3010 receives control signals from each of the video converters 920. Based on these control signals, video source controller 3010 selects one of the video source suites 3014 to match to the requesting unit, and commands switch 3012 to connect the selected source suite to the video converter.

Figure 30B:
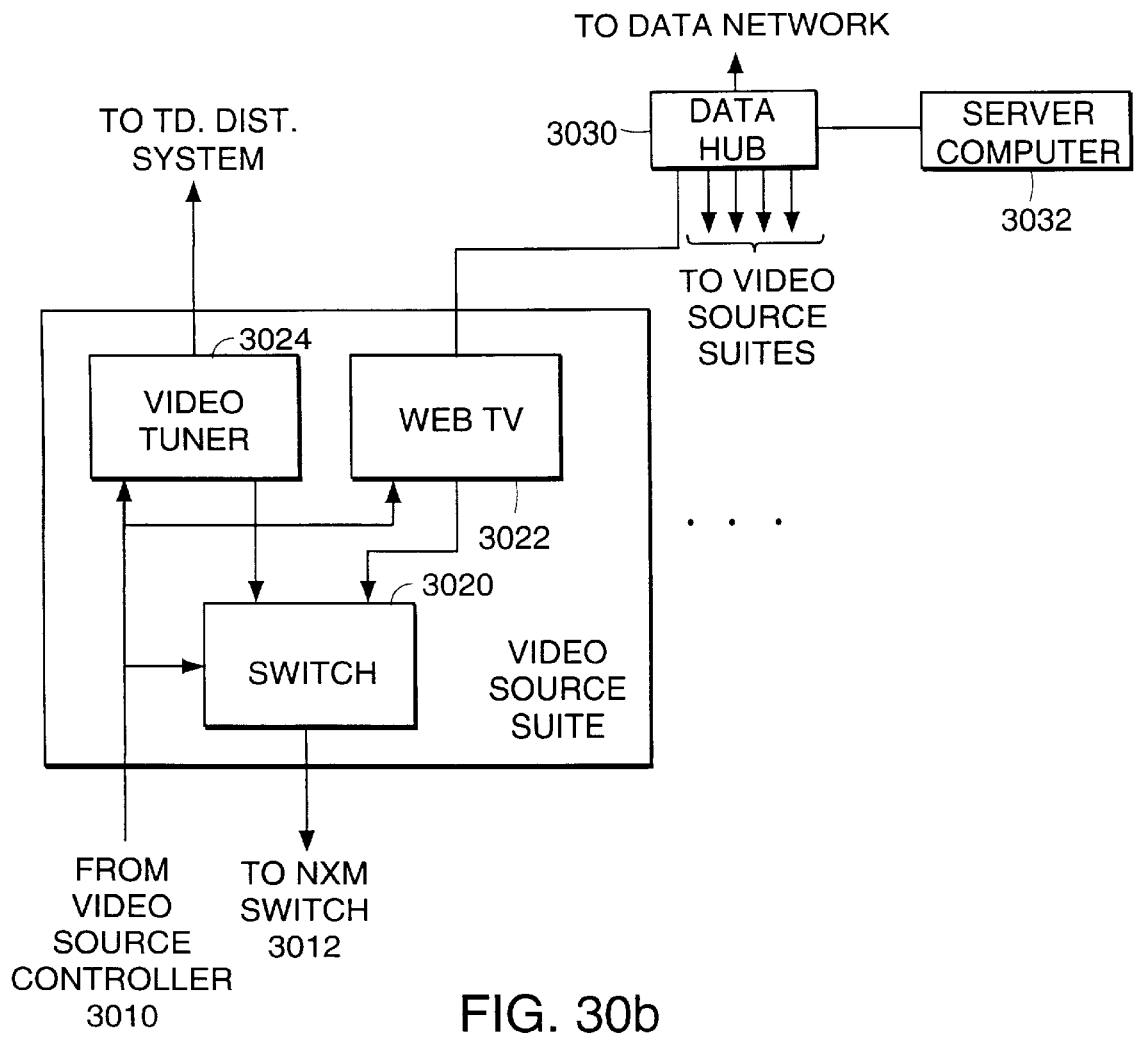

A variety of video source suites can be used. In this exemplary embodiment, each source suite 3014 includes a video tuner 3024 and a "WebTV" 3022 as shown in FIG. 30b. Tuner 3024 selects particular programming available from television distribution network 124 based on a command signal received from video source controller 3010. Video source controller also controls a switch 3020 to select between video source 3024 and WebTV 3022.

Figure 30C:
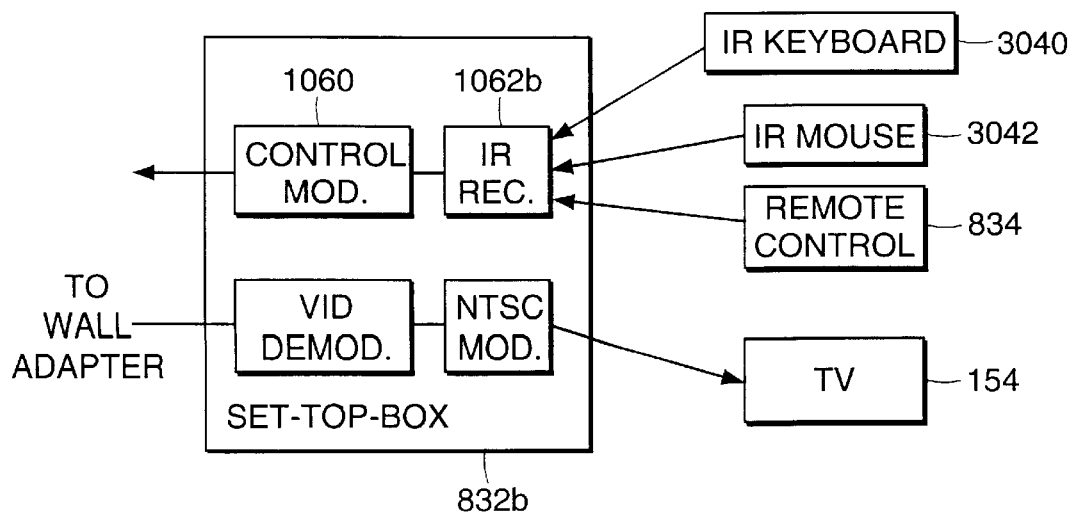

WebTV is a device that connects to data network 122 and provides audio-video output based on content available on data network 122. WebTV is controlled by a viewer using an interface such as a mouse or a keyboard. Referring to FIG. 30c, in this embodiment, set-top box 832 not only receives control input from remote control 834, but also from IR keyboard 3040 and IR mouse 3042. These signals are coupled through IR receiver 1062b and control modulator 1060 to video source controller 3010. Video source controller 3010 passes the input from keyboard 3040 and mouse 3042 to WebTV 3022.

Multiple WebTVs 3022 are connected to a data hub 3030 that couples the WebTVs to the data network. Also coupled to the data hub is a server computer 3022. Server computer 3032 can provide services that are accessed by a user in a unit through the WebTV interface.

8 Alternative Embodiments of the System

Alternative embodiments of the system include various combinations of elements described above.

For example, in a system in which multiple computers in each unit are to communicate using 10BaseT interfaces, passive couplers such as that shown in FIG. 22c are used at each jack. This allows a computer connected at the jack to both communicate with the data network and other computers in the unit that may be either upstream or downstream.

Other types of information services can incorporate into a system of the type described above. For example, a satellite TV system can provide television programming rather than a cable television system.

Other elements of the invention can also be used independently. For instance, the security hub has application in other circumstances than simply in communication over twisted pair. Distribution of power and data signals over a single wire pair to a hub or other interface is also generally useful.

Other types of hubs or data concentrators can also be used in place of the hubs described above. For example, "switching" hubs can be used in which signals are only sent to ports to which an addressed computer is connected. Other types of interfaces to a data network can also be used.

Although described above in terms of direct connections to a public telephone network, the system can equivalently be connected to a private switch (PBX) that provides the functionality of PSTN in terms of providing telephone services to a set of telephones connected to a wiring network.

What is claimed is:

1. A communication system for passing communication between a plurality of terminal devices, including telephones and computers, and a plurality of information services, including a telephone network and a data network, comprising:

a twisted pair wiring network coupled to the terminal devices including a plurality of separate twisted pair wiring networks for passing voice signals in a telephone voice frequency band between the telephone network and the one or more telephones on each of said separate twisted pair wiring networks, wherein each separate twisted pair wiring network includes a two-conductor network; and circuitry for combining telephone and data signals including a first data hub coupled to the data network and including a plurality of data ports each associated with a different one of the separate twisted pair wiring networks, wherein the first data hub includes circuitry for inhibiting transmission of data received from the data network and addressed to a computer coupled to one of the data ports from being transmitted on other of the data ports, and for each of the data ports, circuitry coupled to the telephone network and to said data port, coupled to the separate twisted pair wiring network associated with said data port, and configured to combine on said separate twisted pair wiring network (a) telephone voice signals in the telephone voice frequency band passing between the telephone network and the one or more telephones on said separate network, and (b) high frequency signals in a high band of frequencies higher that those of the telephone voice frequency band passing information between said data port and one or more of the computers coupled to said separate twisted pair wiring network, wherein the circuitry coupled to the telephone network and to said data port further includes a first media adapter including circuitry for communicating with the first data hub over more than two conductors and for communicating with the one or more computers on said separate twisted pair wiring network over the two-conductor network and configured to communicate with the first data hub using Ethernet signals over four conductors, and wherein the first media adapter further includes circuitry coupled to the two-conductor network for transmitting a first control signal in a first frequency band to indicate that it is transmitting data onto the two-conductor network in the high band of frequencies and for detecting a second control signal in a second frequency band while transmitting said first control signal, said second control signal indicative of another device transmitting data onto the two-conductor network in the high band of frequencies, whereby the signals in the first and second frequency band provide information for detecting data collisions on the two-conductor network.

2. The system of claim 1 wherein the signal in the first frequency band is a tone at a first frequency above the telephone voice frequency band, and the signal in the second frequency band is a tone at a second frequency different from the first frequency and above the telephone voice frequency band.

3. A communication system for passing communication between a plurality of terminal devices, including telephones and computers, and a plurality of information services, including a telephone network and a data network, comprising:

a twisted pair wiring network coupled to the terminal devices including a plurality of separate twisted pair wiring networks for passing voice signals in a telephone voice frequency band between the telephone network and the one or more telephones on each of said separate twisted pair wiring networks; and circuitry for combining telephone and data signals including a first data hub coupled to the data network and including a plurality of data ports each associated with a different one of the separate twisted pair wiring networks, wherein the first data hub includes circuitry for inhibiting transmission of data received from the data network and addressed to a computer coupled to one of the data ports from being transmitted on other of the data ports, for each of the data ports, circuitry coupled to the telephone network and to said data port, coupled to the separate twisted pair wiring network associated with said data port, and configured to combine on said separate twisted pair wiring network (a) telephone voice signals in the telephone voice frequency band passing between the telephone network and the one or more telephones on said separate network, and (b) high frequency signals in a high band of frequencies higher that those of the telephone voice frequency band passing information between said data port and one or more of the computers coupled to said separate twisted pair wiring network, a wiring block having a plurality of corresponding pairs of contacts, wherein for each pair, one contact is coupled to the telephone network, and the other contact is coupled to the separate twisted pair wiring network, said wiring block being configured to accept a connector between the pairs of contacts such that in the absence of an inserted connector, each pair of contacts are directly electrically coupled, and a connector inserted between the pairs of contacts, wherein the connector includes a plurality of low-pass filters, each associated with a different of the pairs of contact and providing signal path in the telephone voice frequency band between the contacts of said pair of contact.

4. The system of claim 3 wherein the connector is coupled to first data hub and includes circuitry for providing a signal path in the high band of frequencies between the first data hub and the separate twisted pair wiring network and for providing a signal path in the telephone voice frequency band between the telephone exchange and the separate telephone wiring network.

5. The system of claim 4 wherein the wiring block includes a telephone 110 wiring block, and the connector forms a cover over a face of the wiring block.

6. The system of claim 5 wherein the connector includes an RJ-21 jack for attaching a cable that couples the connector to the first data hub.

7. A device for connecting to a twisted pair wiring block having a plurality of corresponding pairs of contacts, wherein said wiring block is configured to accept a connector between the pairs of contacts such that in the absence of an inserted connector, each pair of contacts are directly electrically coupled, said device comprising:

a first connector for insertion between the pairs of contacts, including contacts for mating with a first contact and a second contact of each of the pairs of contacts;

a second connector providing a plurality of contacts, each of said contacts corresponding to a different one of the pairs of contacts of the wiring block;

circuitry for providing a signal path in a first band of frequencies between the first contact and the second contact of each of the pairs of contacts of the wiring block;

circuitry for providing a signal path in a second band of frequencies higher than the frequencies of the first band of frequencies between the each of the contacts on the second connector and the first contact of the corresponding pair of contacts on the wiring block.

8. The device of claim 7 wherein the wiring block includes a telephone 110 wiring block, and the device forms a cover over a face of the wiring block.

9. The device of claim 8 wherein the second connector includes an RJ-21 jack.

* * * * *